United States Patent
Varerkar et al.

(10) Patent No.: US 11,178,373 B2
(45) Date of Patent: Nov. 16, 2021

(54) ADAPTIVE RESOLUTION OF POINT CLOUD AND VIEWPOINT PREDICTION FOR VIDEO STREAMING IN COMPUTING ENVIRONMENTS

(71) Applicant: Intel Corporation, Santa Clara, CA (US)

(72) Inventors: Mayuresh Varerkar, Folsom, CA (US); Stanley Baran, Chandler, AZ (US); Michael Apodaca, Folsom, CA (US); Prasoonkumar Surti, Folsom, CA (US); Atsuo Kuwahara, Portland, OR (US); Narayan Biswal, Folsom, CA (US); Jill Boyce, Portland, OR (US); Yi-Jen Chiu, San Jose, CA (US); Gokcen Cilingir, San Jose, CA (US); Barnan Das, Newark, CA (US); Atul Divekar, Folsom, CA (US); Srikanth Potluri, Folsom, CA (US); Nilesh Shah, Folsom, CA (US); Archie Sharma, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/050,322

(22) Filed: Jul. 31, 2018

(65) Prior Publication Data

US 2020/0045285 A1 Feb. 6, 2020

(51) Int. Cl.
*H04H 60/33* (2008.01)
*H04N 13/111* (2018.01)
(Continued)

(52) U.S. Cl.
CPC .......... *H04N 13/111* (2018.05); *G06F 3/012* (2013.01); *G06F 9/3877* (2013.01); *G06N 20/00* (2019.01); *H04N 19/597* (2014.11)

(58) Field of Classification Search
CPC .... H04N 13/111; H04N 19/597; G06N 20/00; G06F 3/012; G06F 9/3877
See application file for complete search history.

(56) References Cited

U.S. PATENT DOCUMENTS

| 5,619,256 A | 4/1997 | Haskell et al. |
| 5,768,122 A | 6/1998 | Motoc |

(Continued)

FOREIGN PATENT DOCUMENTS

| CN | 110784703 A | 2/2020 |
| CN | 110784714 A | 2/2020 |

(Continued)

OTHER PUBLICATIONS

Achanta, Radhakrishna, et al. "SLIC Superpixels Compared to State-of-the-Art Superpixel Methods." IEEE transactions on pattern analysis and machine intelligence 34.11 (2012): 2274-2282.

(Continued)

*Primary Examiner* — Mulugeta Mengesha
(74) *Attorney, Agent, or Firm* — Jaffery Watson Mendonsa & Hamilton LLP

(57) ABSTRACT

A mechanism is described for facilitating adaptive resolution and viewpoint-prediction for immersive media in computing environments. An apparatus of embodiments, as described herein, includes one or more processors to receive viewing positions associated with a user with respect to a display, and analyze relevance of media contents based on the viewing positions, where the media content includes immersive videos of scenes captured by one or more cameras. The one or more processors are further to predict portions of the media contents as relevant portions based on the viewing positions and transmit the relevant portions to be rendered and displayed.

14 Claims, 38 Drawing Sheets

(51) Int. Cl.
*H04N 19/597* (2014.01)
*G06F 9/38* (2018.01)
*G06F 3/01* (2006.01)
*G06N 20/00* (2019.01)

(56) References Cited

U.S. PATENT DOCUMENTS

| | | |
|---|---|---|
| 5,781,194 A | 7/1998 | Ponomarev et al. |
| 5,966,672 A | 10/1999 | Knupp |
| 6,476,803 B1 | 11/2002 | Zhang et al. |
| 6,785,640 B1 | 8/2004 | Lu et al. |
| 7,003,136 B1 | 2/2006 | Harville |
| 7,831,087 B2 | 11/2010 | Harville |
| 8,106,924 B2 | 1/2012 | Aliprandi et al. |
| 8,619,082 B1 | 12/2013 | Ciurea et al. |
| 9,164,874 B1 | 10/2015 | Tomay et al. |
| 9,483,868 B1 | 11/2016 | Tang |
| 9,819,879 B2 | 11/2017 | Kim et al. |
| 9,852,351 B2 | 12/2017 | Perez et al. |
| 10,685,476 B2 | 6/2020 | Kaufman et al. |
| 10,762,394 B2 | 9/2020 | Distler et al. |
| 10,762,592 B2 | 9/2020 | Xiao et al. |
| 10,783,698 B2 | 9/2020 | Mishaev et al. |
| 10,819,968 B2 | 10/2020 | Raziel et al. |
| 10,839,589 B2 | 11/2020 | Cilingir et al. |
| 10,846,814 B2 | 11/2020 | Boyce et al. |
| 10,887,574 B2 | 1/2021 | Ruhm et al. |
| 10,893,299 B2 | 1/2021 | Boyce et al. |
| 10,911,799 B2 | 2/2021 | Boyce et al. |
| 10,922,832 B2 | 2/2021 | Tanner et al. |
| 2003/0218606 A1 | 11/2003 | Zhirkov et al. |
| 2004/0027259 A1 | 2/2004 | Soliman et al. |
| 2007/0103464 A1 | 5/2007 | Kaufman et al. |
| 2007/0206008 A1 | 9/2007 | Kaufman et al. |
| 2008/0152191 A1 | 6/2008 | Fujimura et al. |
| 2009/0027391 A1 | 1/2009 | Burley et al. |
| 2009/0135191 A1 | 5/2009 | Azar et al. |
| 2009/0262206 A1 | 10/2009 | Park |
| 2010/0034457 A1 | 2/2010 | Berliner et al. |
| 2010/0195716 A1 | 8/2010 | Gunnewiek et al. |
| 2010/0231689 A1 | 9/2010 | Bruls et al. |
| 2010/0296750 A1 | 11/2010 | Castelnuovo |
| 2011/0202538 A1 | 8/2011 | Salemann |
| 2012/0042209 A1 | 2/2012 | Brock et al. |
| 2012/0044476 A1 | 2/2012 | Earhart et al. |
| 2012/0242796 A1 | 9/2012 | Ciurea et al. |
| 2012/0275702 A1 | 11/2012 | Tuzel et al. |
| 2013/0089259 A1 | 4/2013 | Cha et al. |
| 2013/0127837 A1 | 5/2013 | Hyodo et al. |
| 2014/0267243 A1 | 9/2014 | Venkataraman et al. |
| 2014/0300775 A1 | 10/2014 | Fan et al. |
| 2014/0334541 A1 | 11/2014 | Nakanishi et al. |
| 2015/0016712 A1 | 1/2015 | Rhoads et al. |
| 2015/0070355 A1 | 3/2015 | Clarberg et al. |
| 2015/0145966 A1 | 5/2015 | Krieger et al. |
| 2015/0154232 A1 | 6/2015 | Ovsjanikov et al. |
| 2015/0154467 A1 | 6/2015 | Feng et al. |
| 2015/0156473 A1 | 6/2015 | Bennett et al. |
| 2015/0264404 A1 | 9/2015 | Hannuksela |
| 2015/0341663 A1 | 11/2015 | Zhang et al. |
| 2015/0371110 A1 | 12/2015 | Hwang et al. |
| 2016/0005234 A1 | 1/2016 | Boivin et al. |
| 2016/0035124 A1 | 2/2016 | Sinha et al. |
| 2016/0071325 A1 | 3/2016 | Callaghan |
| 2016/0104294 A1 | 4/2016 | Gandolph et al. |
| 2016/0109284 A1 | 4/2016 | Hammershøi et al. |
| 2016/0110910 A1 | 4/2016 | Obert et al. |
| 2016/0154999 A1 | 6/2016 | Fan et al. |
| 2016/0232703 A1 | 8/2016 | Duan et al. |
| 2016/0266256 A1 | 9/2016 | Allen et al. |
| 2016/0299661 A1 | 10/2016 | Alpert et al. |
| 2017/0109611 A1 | 4/2017 | Luo |
| 2017/0150150 A1 | 5/2017 | Thirumalai et al. |
| 2017/0177954 A1 | 6/2017 | Micks et al. |
| 2017/0184721 A1 | 6/2017 | Sun et al. |
| 2017/0244956 A1 | 8/2017 | Stiglic et al. |
| 2017/0310945 A1 | 10/2017 | Juang et al. |
| 2017/0339391 A1 | 11/2017 | Zhou et al. |
| 2017/0339392 A1 | 11/2017 | Forutanpour et al. |
| 2017/0347120 A1 | 11/2017 | Chou et al. |
| 2017/0347122 A1 | 11/2017 | Chou et al. |
| 2017/0374379 A1 | 12/2017 | Chen et al. |
| 2018/0035134 A1 | 2/2018 | Pang et al. |
| 2018/0075320 A1 | 3/2018 | Zermas et al. |
| 2018/0075635 A1 | 3/2018 | Choi et al. |
| 2018/0108151 A1 | 4/2018 | Hemmer et al. |
| 2018/0117897 A1 | 5/2018 | Zeng et al. |
| 2018/0124419 A1 | 5/2018 | He |
| 2018/0144458 A1 | 5/2018 | Xu et al. |
| 2018/0150994 A1 | 5/2018 | Foutzitzis et al. |
| 2018/0184000 A1 | 6/2018 | Lee et al. |
| 2018/0189647 A1 | 7/2018 | Calvo et al. |
| 2018/0225515 A1 | 8/2018 | Jiang et al. |
| 2018/0232583 A1 | 8/2018 | Wang et al. |
| 2018/0268570 A1 | 9/2018 | Budagavi et al. |
| 2018/0300937 A1 | 10/2018 | Chien et al. |
| 2018/0352207 A1 | 12/2018 | Kern et al. |
| 2019/0007679 A1 | 1/2019 | Coban et al. |
| 2019/0104324 A1* | 4/2019 | Han .................. G06F 3/04815 |
| 2019/0156520 A1 | 5/2019 | Mammou et al. |
| 2019/0159868 A1 | 5/2019 | Chen et al. |
| 2019/0197739 A1 | 6/2019 | Sinharoy et al. |
| 2019/0251673 A1 | 8/2019 | Kim et al. |
| 2019/0313199 A1* | 10/2019 | Laaksonen .............. H04S 7/303 |
| 2020/0021847 A1 | 1/2020 | Kim et al. |
| 2020/0042834 A1 | 2/2020 | Distler et al. |
| 2020/0043121 A1 | 2/2020 | Boyce et al. |
| 2020/0043122 A1 | 2/2020 | Xiao et al. |
| 2020/0043182 A1 | 2/2020 | Janus et al. |
| 2020/0043190 A1 | 2/2020 | Tanner et al. |
| 2020/0043217 A1 | 2/2020 | Cilingir et al. |
| 2020/0043220 A1 | 2/2020 | Mishaev et al. |
| 2020/0043221 A1 | 2/2020 | Kaufman et al. |
| 2020/0045288 A1 | 2/2020 | Boyce |
| 2020/0045289 A1 | 2/2020 | Raziel et al. |
| 2020/0045290 A1 | 2/2020 | Ruhm et al. |
| 2020/0045292 A1 | 2/2020 | Boyce |
| 2020/0045343 A1 | 2/2020 | Boyce et al. |
| 2020/0045344 A1 | 2/2020 | Boyce et al. |
| 2020/0045348 A1 | 2/2020 | Boyce et al. |
| 2020/0059668 A1 | 2/2020 | Ikonin |
| 2020/0134857 A1 | 4/2020 | Khatoonabadi et al. |
| 2020/0169716 A1* | 5/2020 | Horvitz .............. H04N 21/816 |
| 2020/0364514 A1 | 11/2020 | Distler et al. |

FOREIGN PATENT DOCUMENTS

| | | |
|---|---|---|
| CN | 110784720 A | 2/2020 |
| CN | 110784738 A | 2/2020 |
| CN | 110796589 A | 2/2020 |
| CN | 110796720 A | 2/2020 |
| CN | 110796724 A | 2/2020 |
| CN | 110853125 A | 2/2020 |
| DE | 102019114970 A1 | 2/2020 |
| DE | 102019117485 A1 | 2/2020 |
| DE | 102019117495 A1 | 2/2020 |
| DE | 102019117514 A1 | 2/2020 |
| DE | 102019117585 A1 | 2/2020 |
| DE | 102019119058 A1 | 2/2020 |
| DE | 102019119085 A1 | 2/2020 |
| EP | 3301931 A1 | 4/2018 |
| GB | 2553892 B | 6/2019 |
| WO | 2018009746 A1 | 1/2018 |
| WO | 2019079093 A1 | 4/2019 |

OTHER PUBLICATIONS

J. Sell and P. O'Connor, "The Xbox One System on a Chip and Kinect Sensor," IEEE Micro, vol. 34, No. 2, pp. 44-53, 2014.

Khaled Mammou et al., "Point Cloud Compression: Test Model Category 2 version 0.0," International Organization For Standardization ISO/IEC JTC/SC29/WG11, Oct. 2017, pp. 1-7.

(56) References Cited

OTHER PUBLICATIONS

Khaled Mammou et al., "Working draft of Point Cloud Coding for Category 2 (Draft 1), "ISO/IEC JTC1/SC29/WG11 N17534, Apr. 2018, pp. 1-34.
Khaled Mammou, "PCC Test Model Category 2 v1," ISO/IEC JTC1/SC29/WG11 N17348, Jan. 2018, pp. 1-11.
Mason A. Porter, Small-World Network, [online] [retrieved from https://web.archive.org/web/20120320234139/http://scholarpedia.org/article/Small-world_network on Oct. 24, 2019 1:05:01 PM][captured date Mar. 20, 2012].
Notice of Publication for CN Application No. 201910567293.4, dated Mar. 12, 2020, 69 pages.
Notification of CN Publication for application No. 201910553782.4, 5 pages, dated Mar. 9, 2020.
Notification of CN Publication for CN Application No. 201910553919.6, dated Mar. 9, 2020, 5 pages.
Notification of CN Publication for CN201910575114.1 (Pub. No. 110784702), 71 pages, dated Feb. 11, 2020.
Notification of DE Publication for 102019117218.7 (Pub. No. 102019117218), dated Mar. 15, 2020, 67 pages.
Notification of DE Publication for DE Application No. 102019117469.4, dated Mar. 15, 2020, 71 pages.
Notification of Publication of CN Application No. 201910575159.9, Publication No. 110784765, 76 pages, dated Feb. 11, 2020.
Notification of Publication of DE Application No. 10 2019 117 593.5, Publication No. 10 2019 117 692, 73 pages, dated Feb. 6, 2020.
Notification of the Publication for Application No. DE102019120554.9, 67 pages, dated Feb. 20, 2020.
Papon, Jeremie et al. "Voxel cloud connectivity segmentation-supervoxels for point clouds." Proceedings of the IEEE conference on computer vision and pattern recognition. 2013.
Sebastian Schwarz et al., "Nokia's response to CfP for Point Cloud Compression (Category 2)," ISO/IEC JTC1/SC29/WG11 M41779, Oct. 2017, pp. 1-22.
Telesford, Qawi K., et al. "The Ubiquity of Small-World Networks." Brain Connectivity 1.5 (2011): 367.
Thanou, Dorina, Philip A. Chou, and Pascal Brossard. "Graph-based compression of dynamic 3D point cloud sequences." IEEE Transactions on Image Processing 25.4 (2016): pp. 1765-1778. (Year: 2016).
Wang, L.—"Point-cloud Compression Using Data Independent Method—A 3D Discrete Cosine Transform Approach"—ICIA—Jul. 18-20, 2017—pp. 1-6 (Year: 2017).
Notice of Allowance issued in U.S. Appl. No. 16/050,153 dated Aug. 25, 2021.

\* cited by examiner

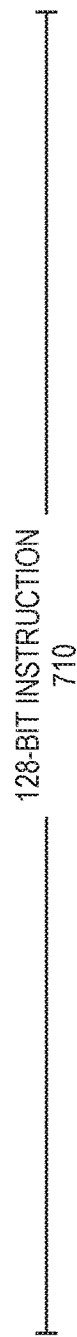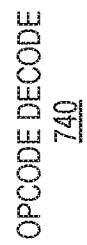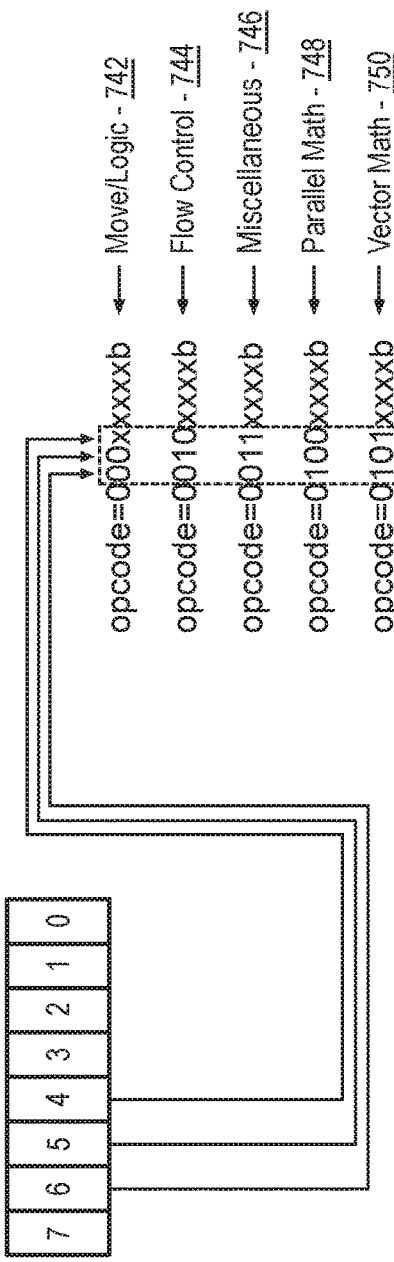
FIG. 7

ADAPTIVE RESOLUTION OF POINT CLOUD AND VIEWPOINT PREDICTION FOR VIDEO STREAMING IN COMPUTING ENVIRONMENTS

RELATED APPLICATION

This application relates to commonly assigned U.S. patent application Ser. No. 16/050,153, entitled REDUCED RENDERING OF SIX-DEGREE OF FREEDOM VIDEO, by Jill Boyce, filed Jul. 31, 2018, the entire contents of which are incorporated herein by reference.

FIELD

Embodiments described herein generally relate to computers. More particularly, embodiments are described for facilitating adaptive resolution of point cloud and view point prediction for video streaming in computing environments.

BACKGROUND

Graphics processing has evolved from two-dimensional (2D) views to three-dimensional (3D) views. Continued evolution of graphics processing envisions the further development of 360-degree video and the development of three degree-of-freedom (3DoF) video and six degree of freedom (6DoF) video for the presentation of immersive video (IV), augmented reality (AR), and virtual reality (VR) experiences.

Six degree of freedom video is an emerging immersive video use case, which provides a viewer an immersive media experience where the viewer controls the viewpoint of a scene. The simpler 3DoF video (e.g. 360 degree or panoramic video) allows a viewer to change orientation around the X, Y, and Z axes, described as yaw, pitch, and roll, from a fixed position, where 6DoF video enables the viewer to change position through translational movements along the X, Y, and Z axes.

It is contemplated that 6DoF video can be represented using point clouds. However, the rendering of point cloud data is computationally expensive, making it difficult to render point cloud video containing large numbers of points at high frame rates. Furthermore, point cloud data rates are large, requiring a large capacity for storage or transmission. Conventional techniques are known for transmitting too much data, including irrelevant and unnecessary data as such systems are known to operate without any knowledge of the user's perspective or relevance of the data being streaming.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor instruction formats according to some embodiments.

DETAILED DESCRIPTION

Figure 1:
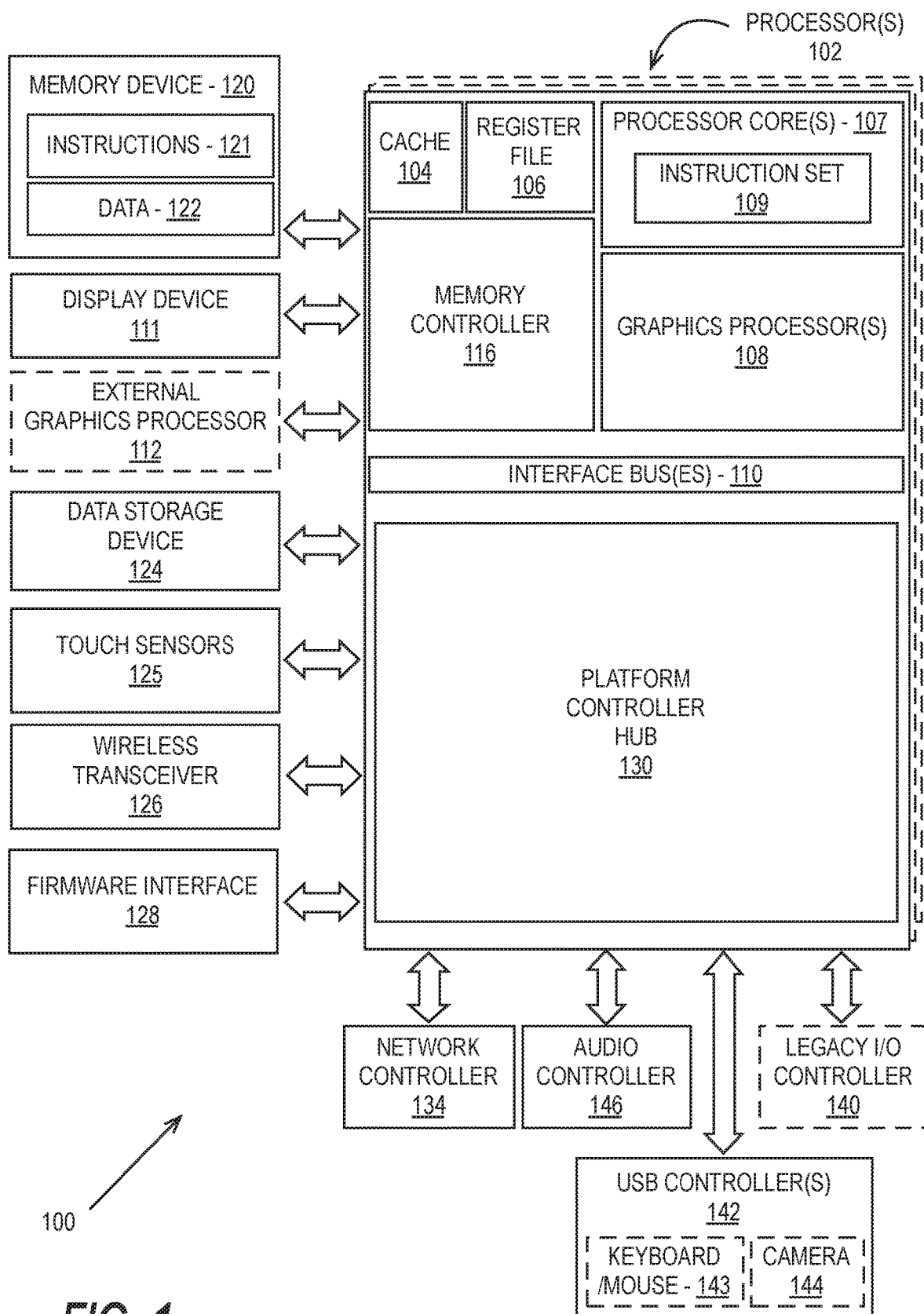
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for adaptive resolution of point cloud, viewpoint prediction to ensure only relevant data is steamed, predicting viewer's motion for subsequent frames, and viewport-dependent 6DoF video streaming. For example, in one embodiment, this novel technique provides for efficient streaming of only the relevant data based on the knowledge of the user's perspective, which allowed for saving of resources, such as reducing the user of bandwidth and sending the highest possible fidelity content based on throughput restrictions.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), Open Computing Language (OpenCL®), CUDA®, DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor (s) 102.

Figure 2:
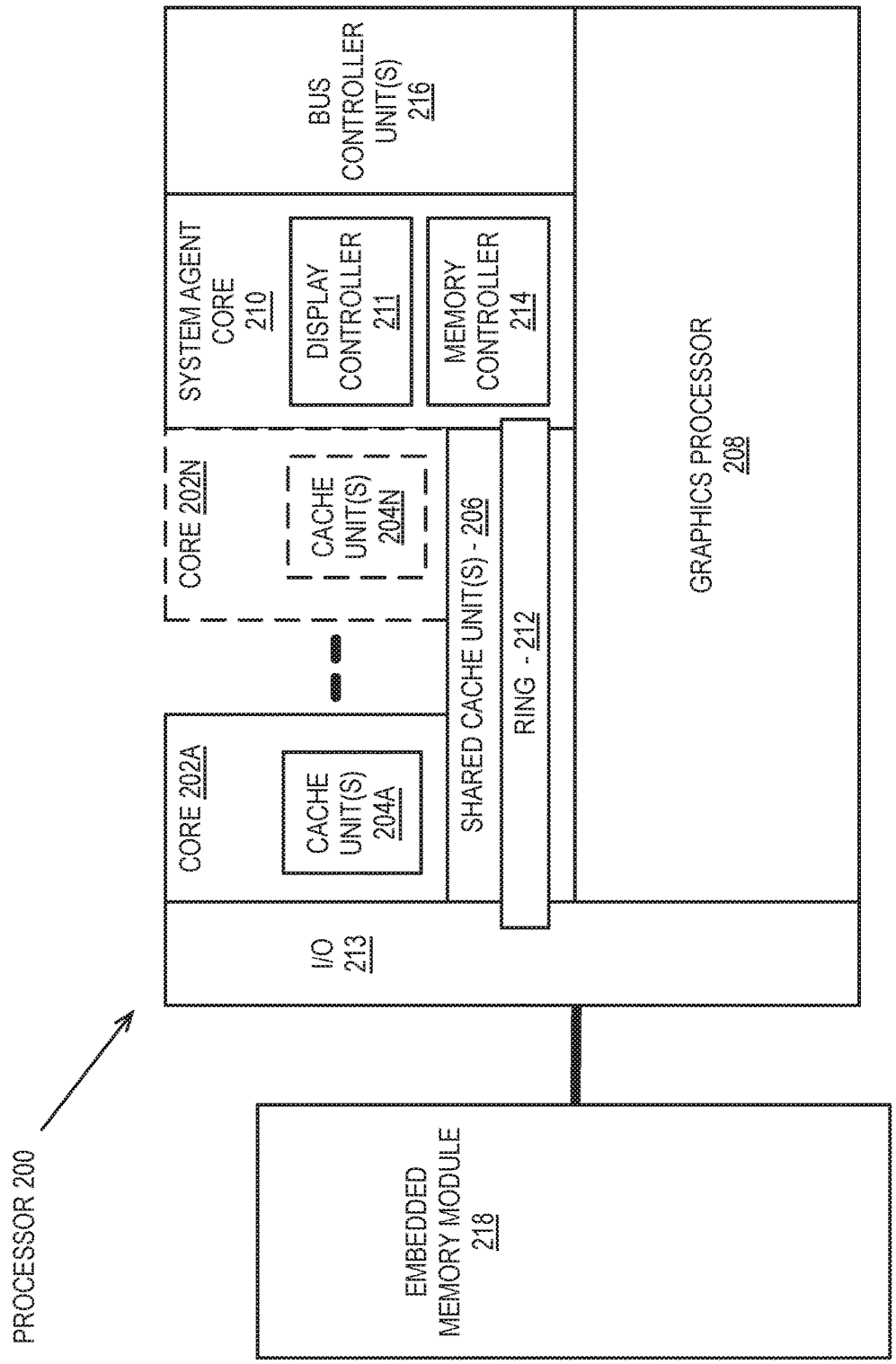
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
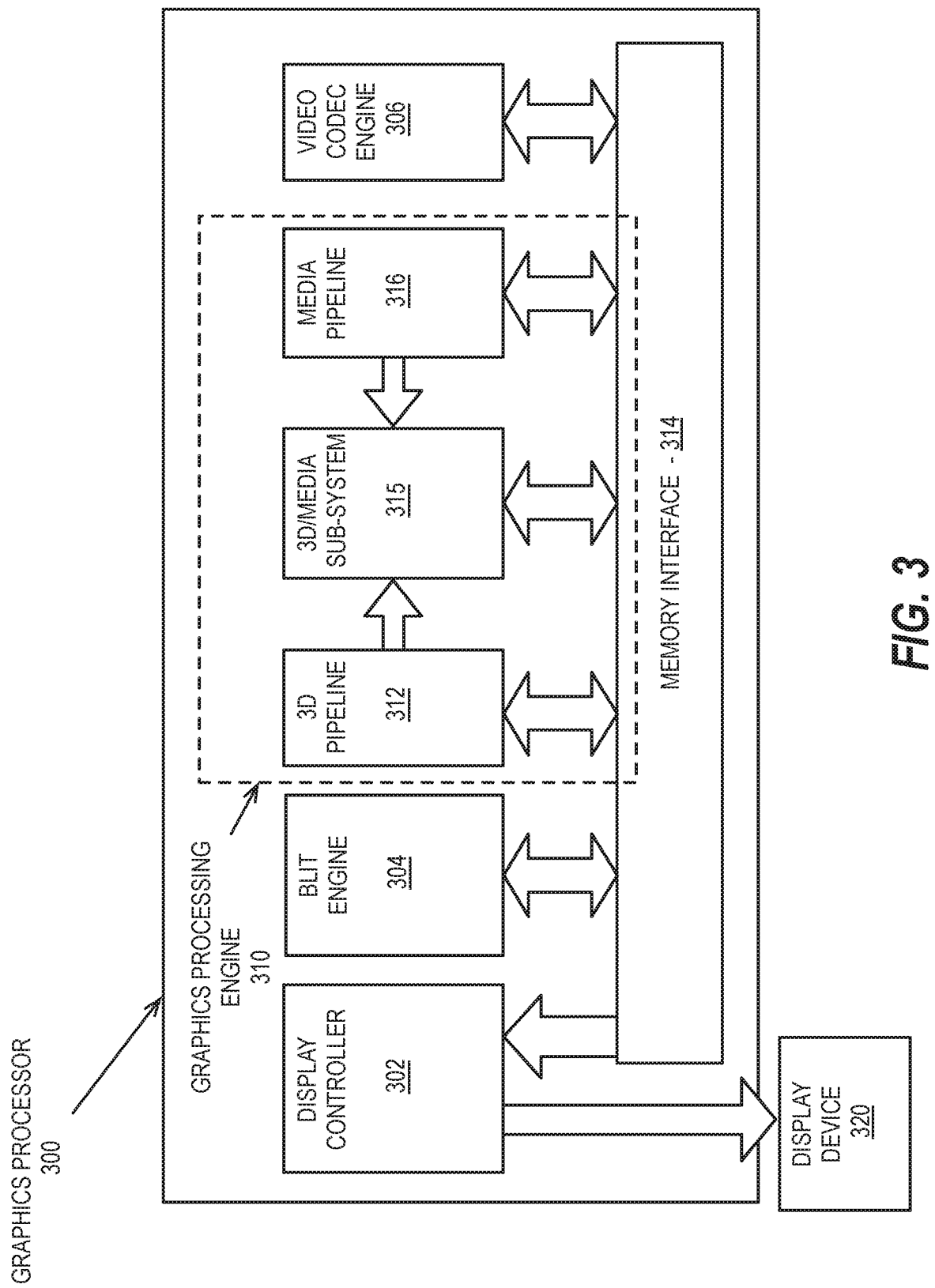
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
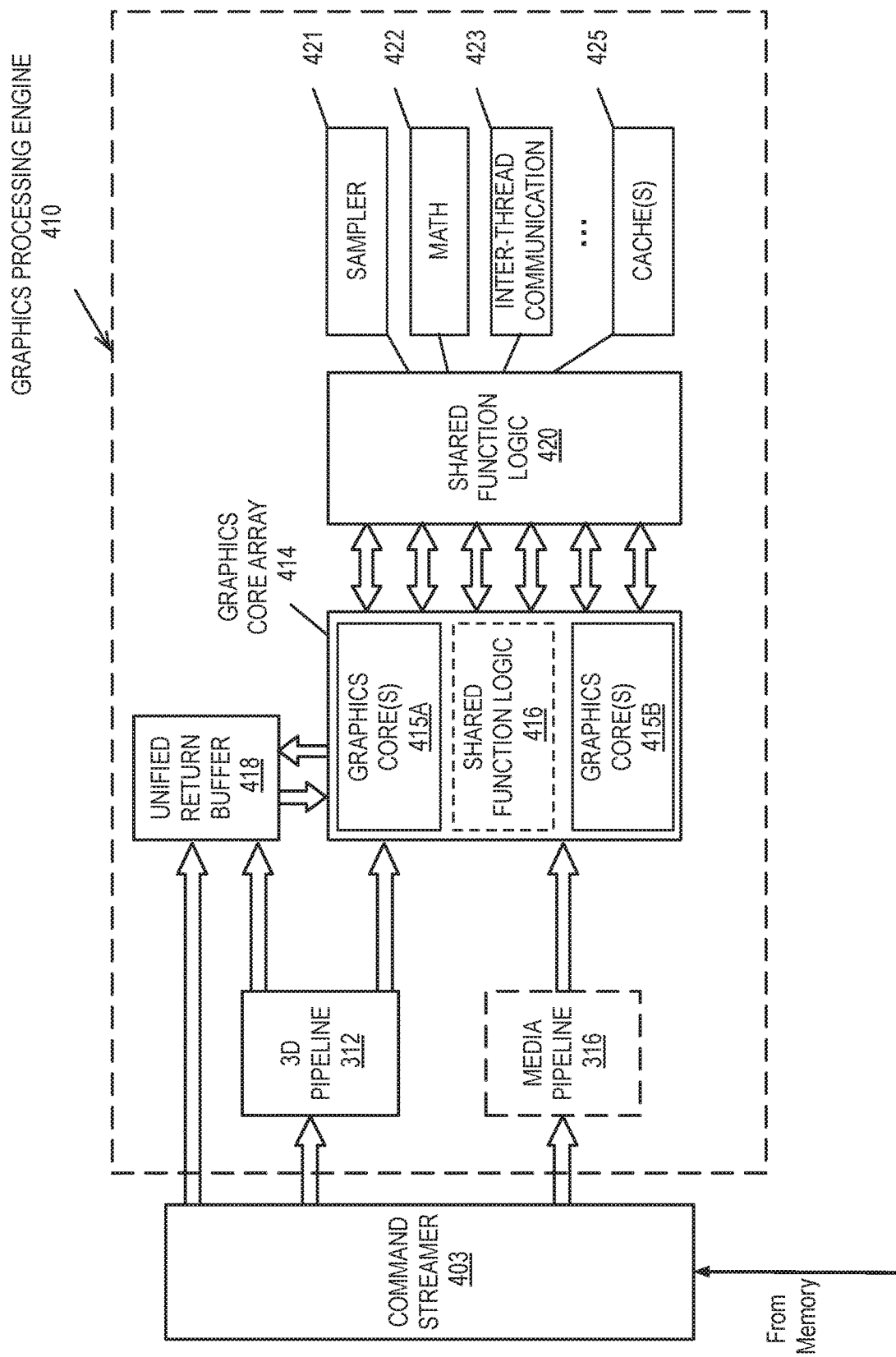
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
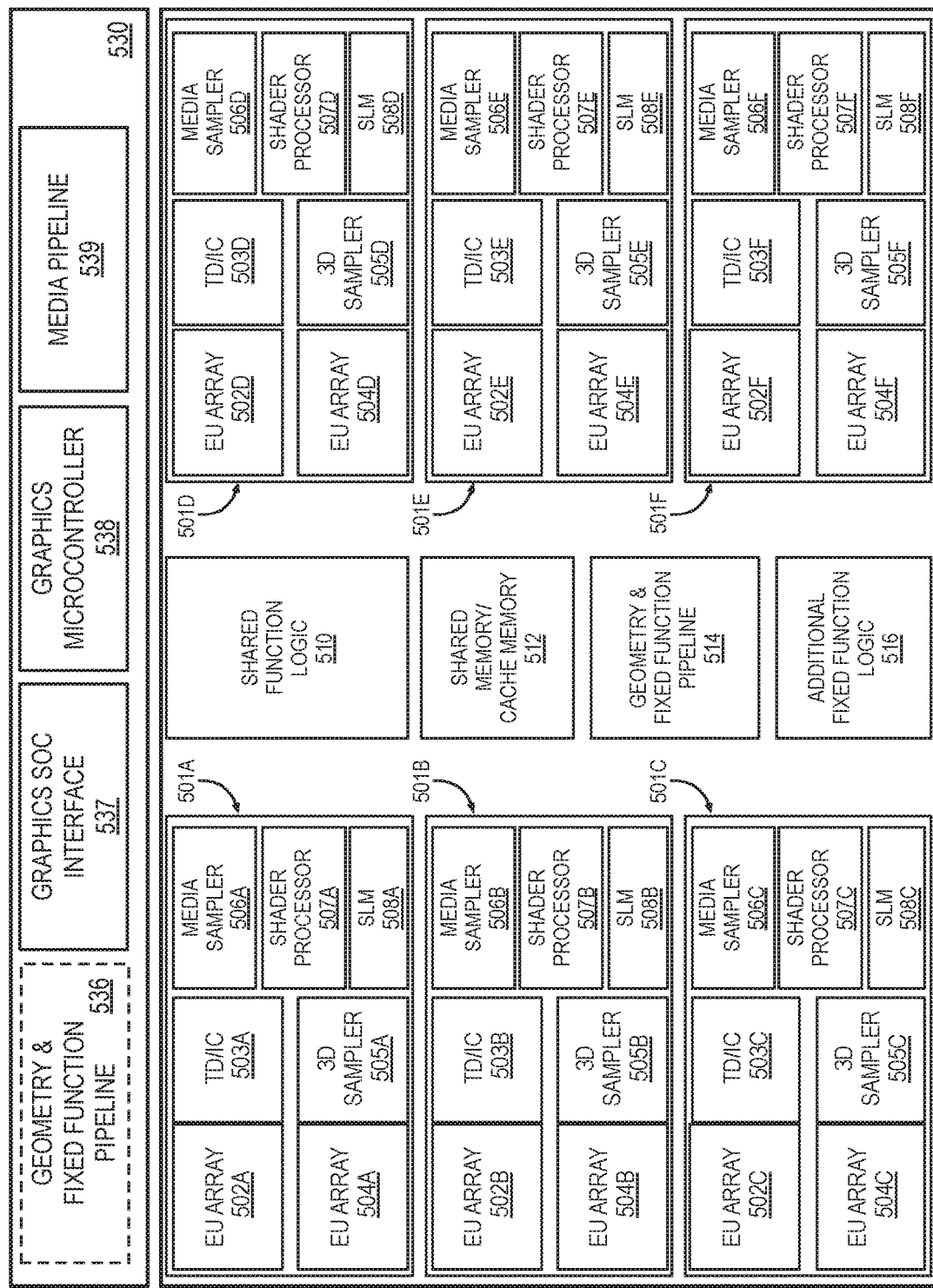
FIG. 5 is a block diagram of hardware logic of a graphics processor core according to some embodiments.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example, and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
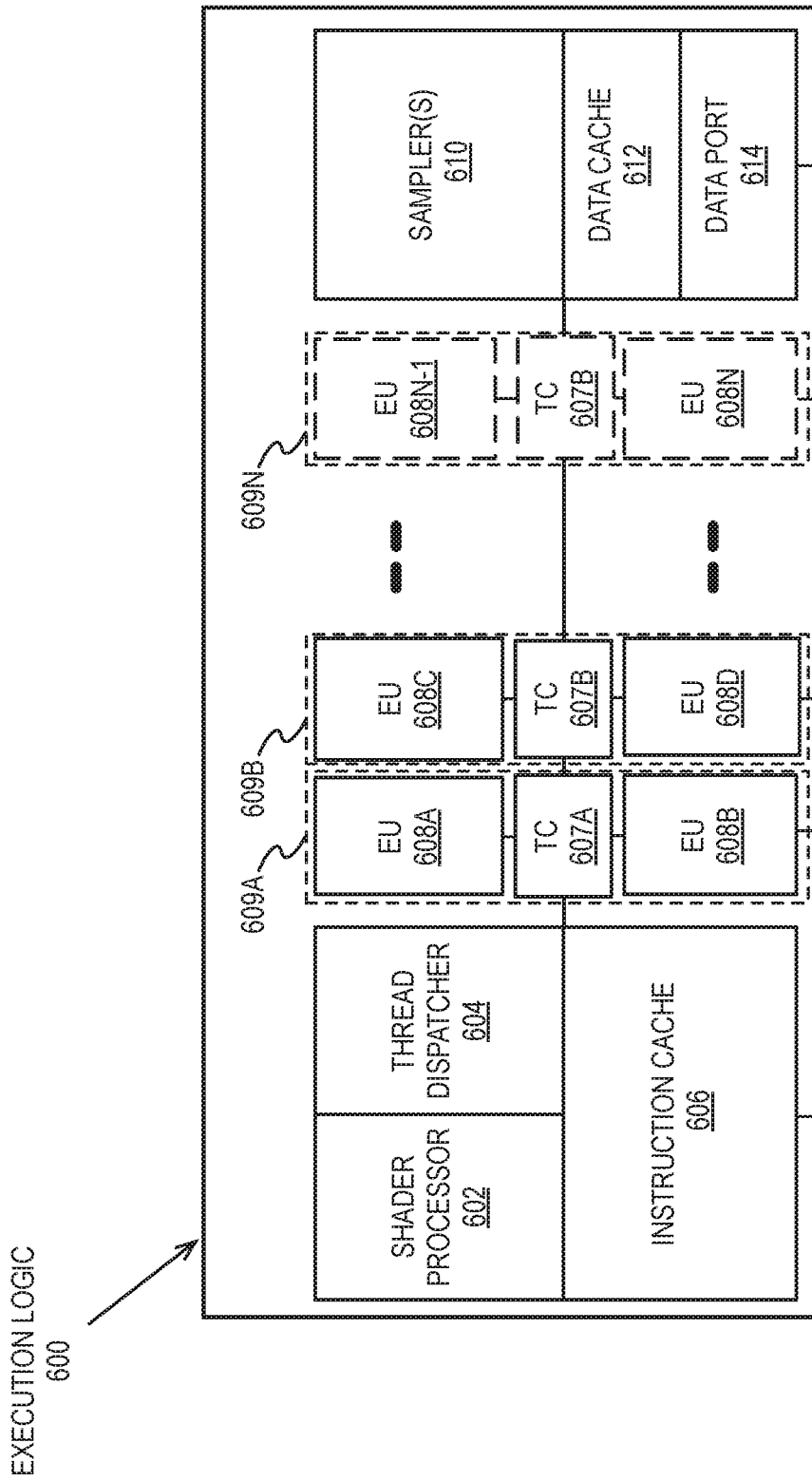
FIG. 6A-6B illustrate thread execution logic including an array of processing elements employed in a graphics processor core according to some embodiments.
Figure 6B:
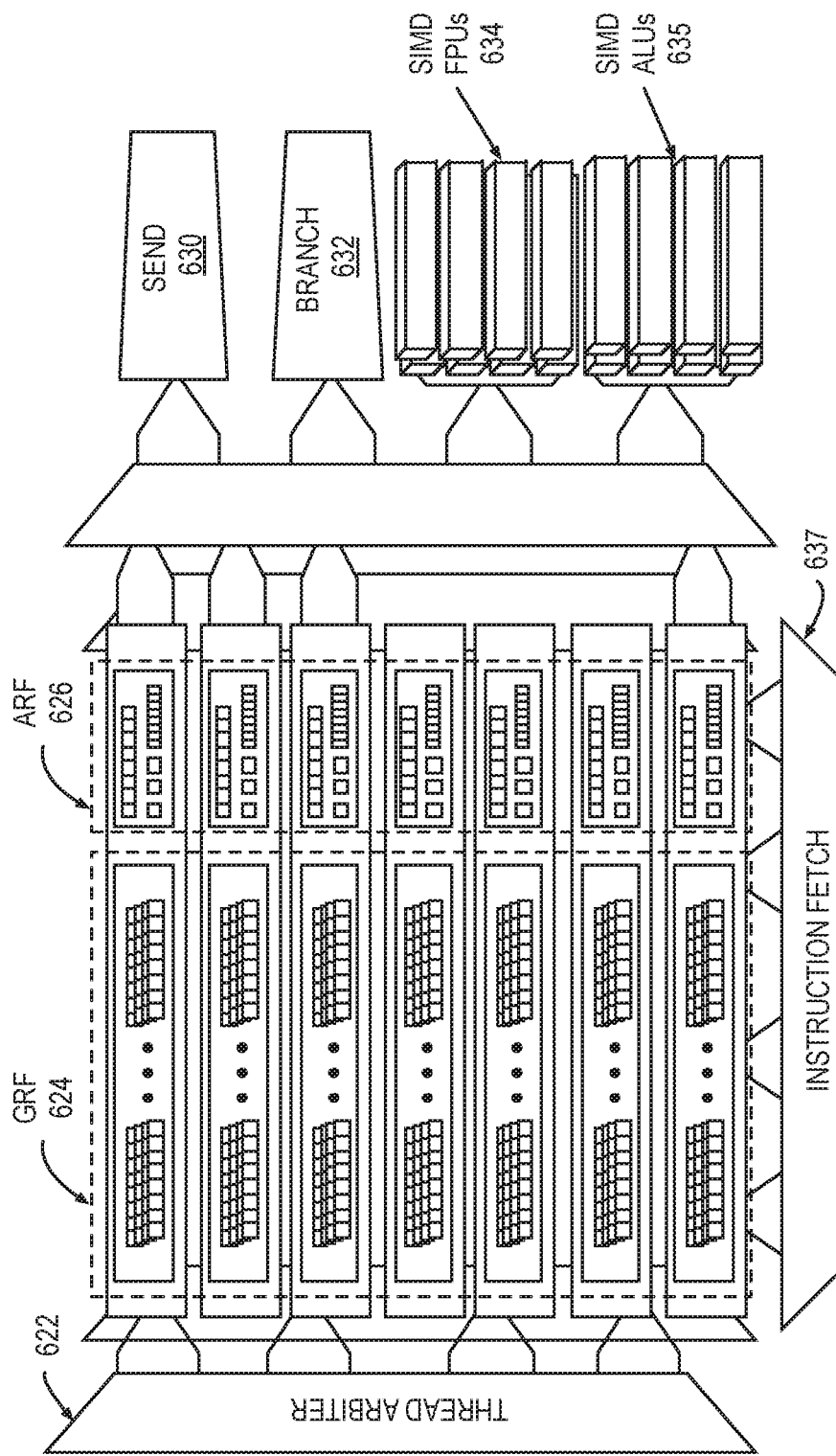

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
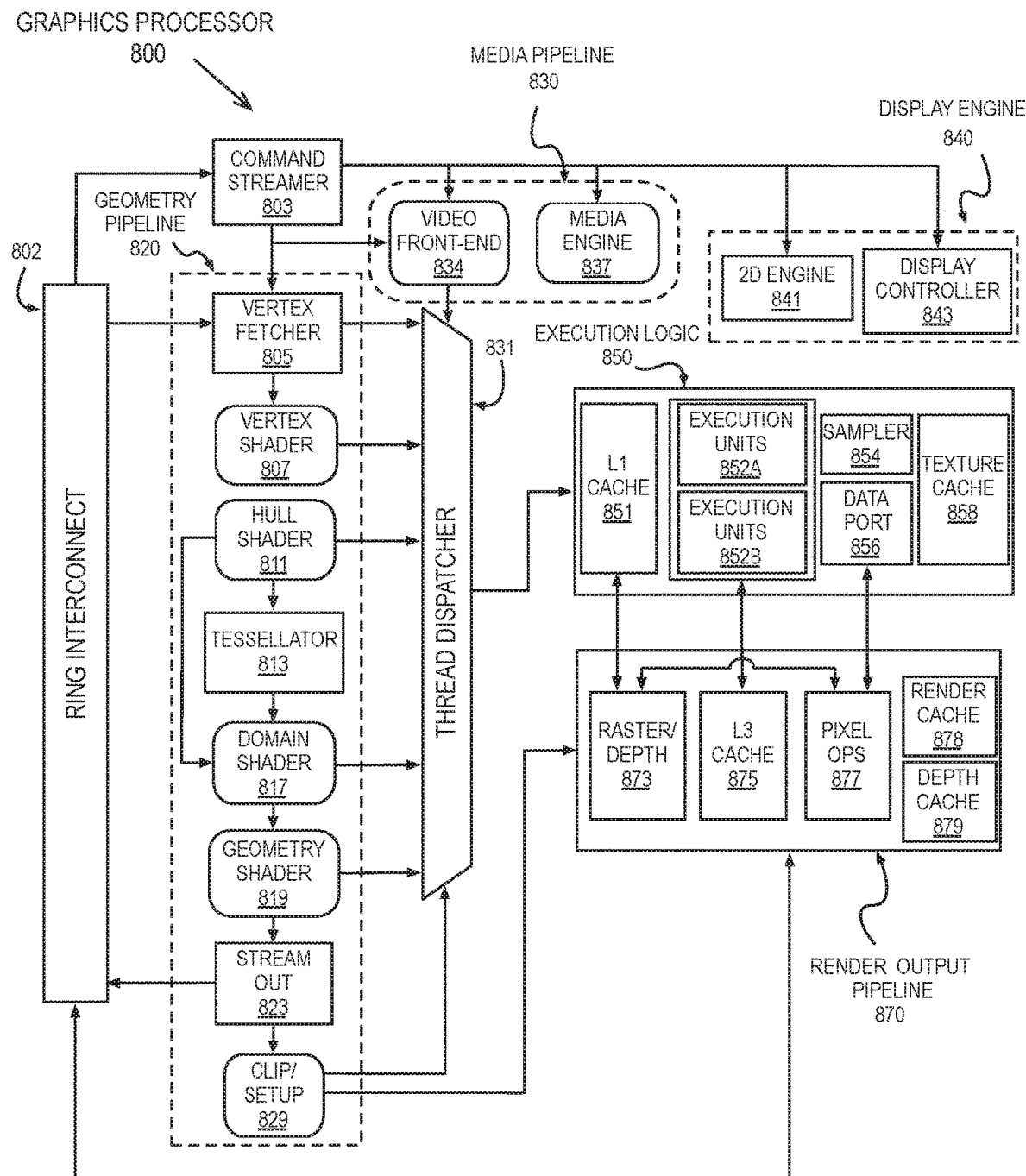
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
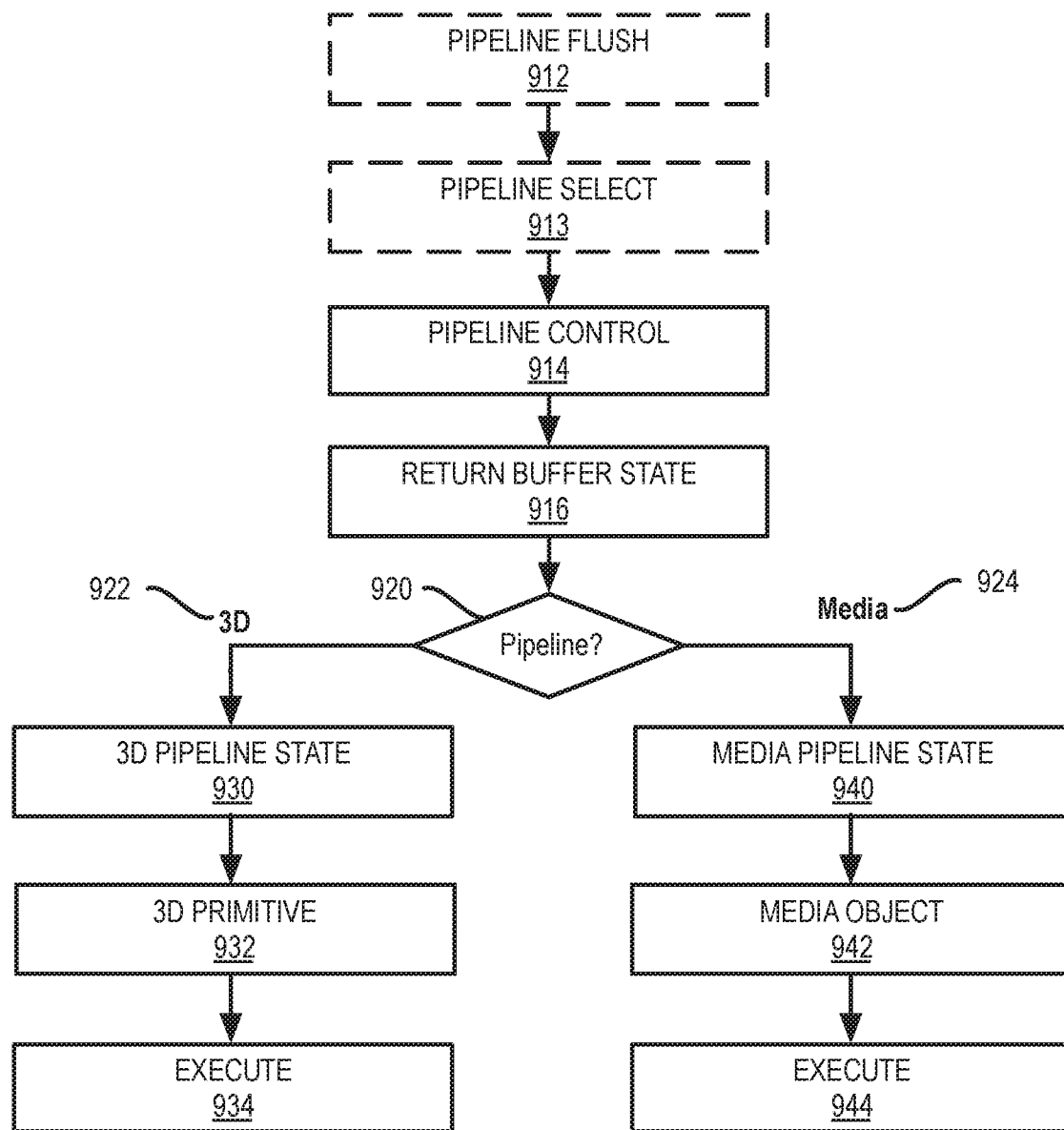
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
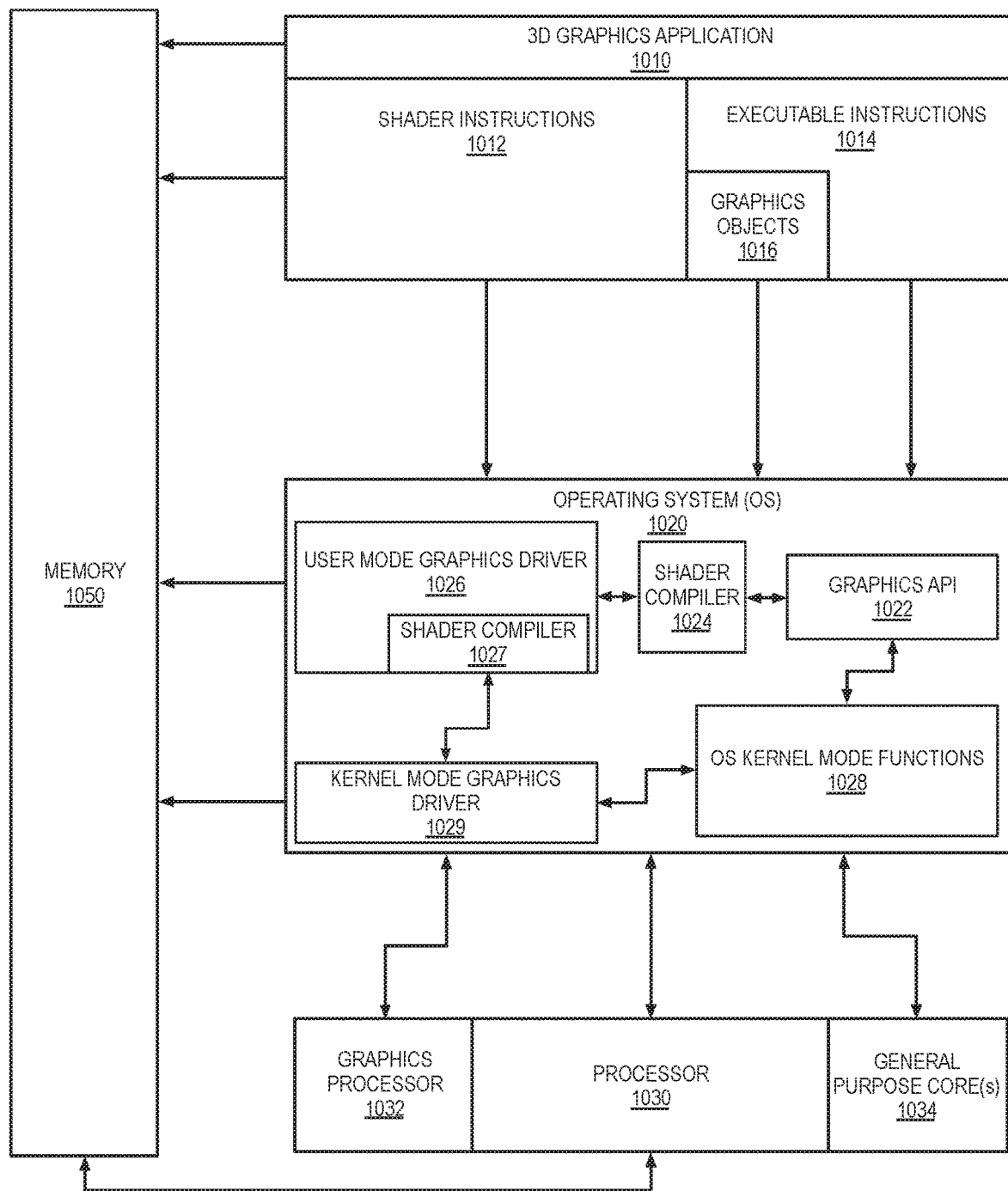
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
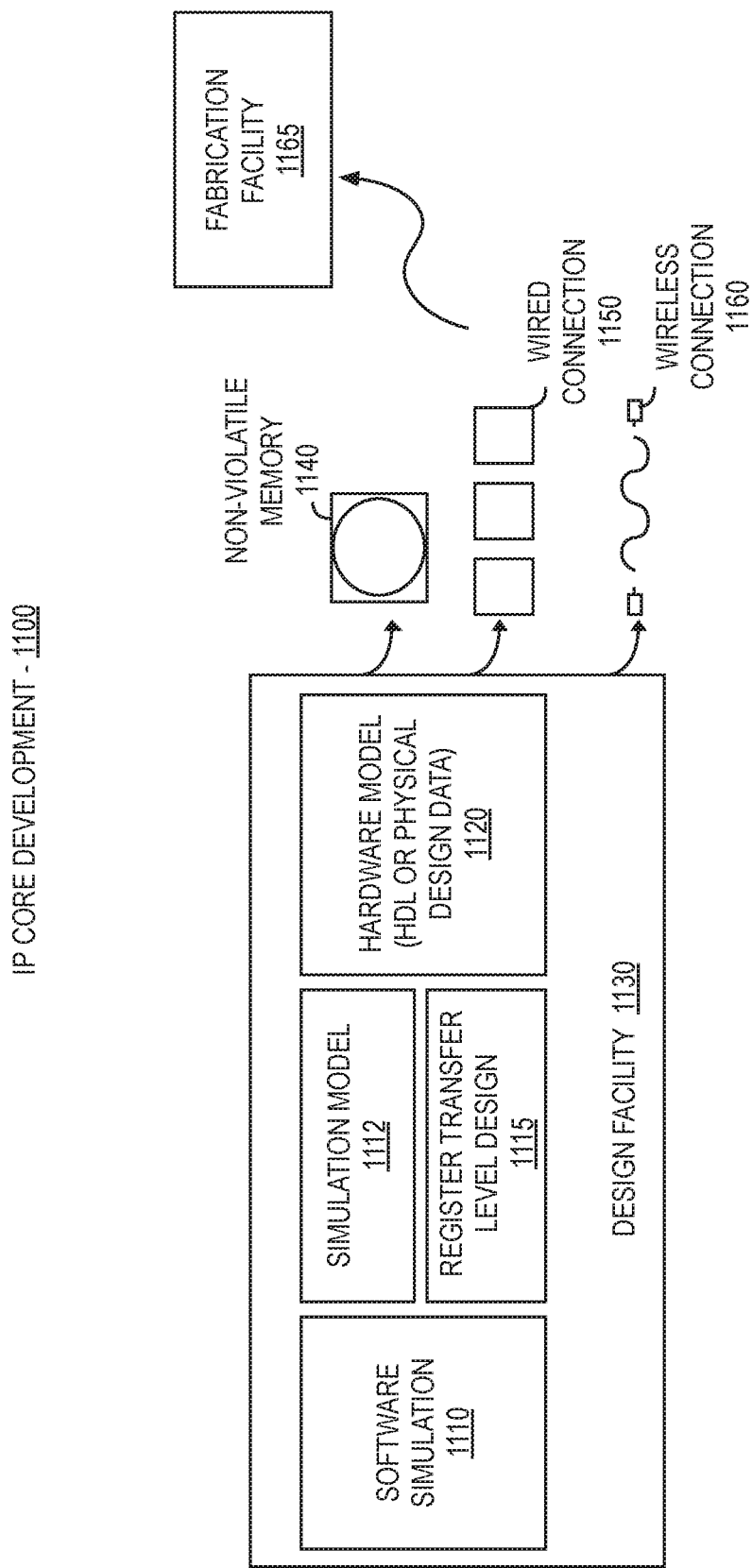
FIG. 11A is a block diagram illustrating an IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
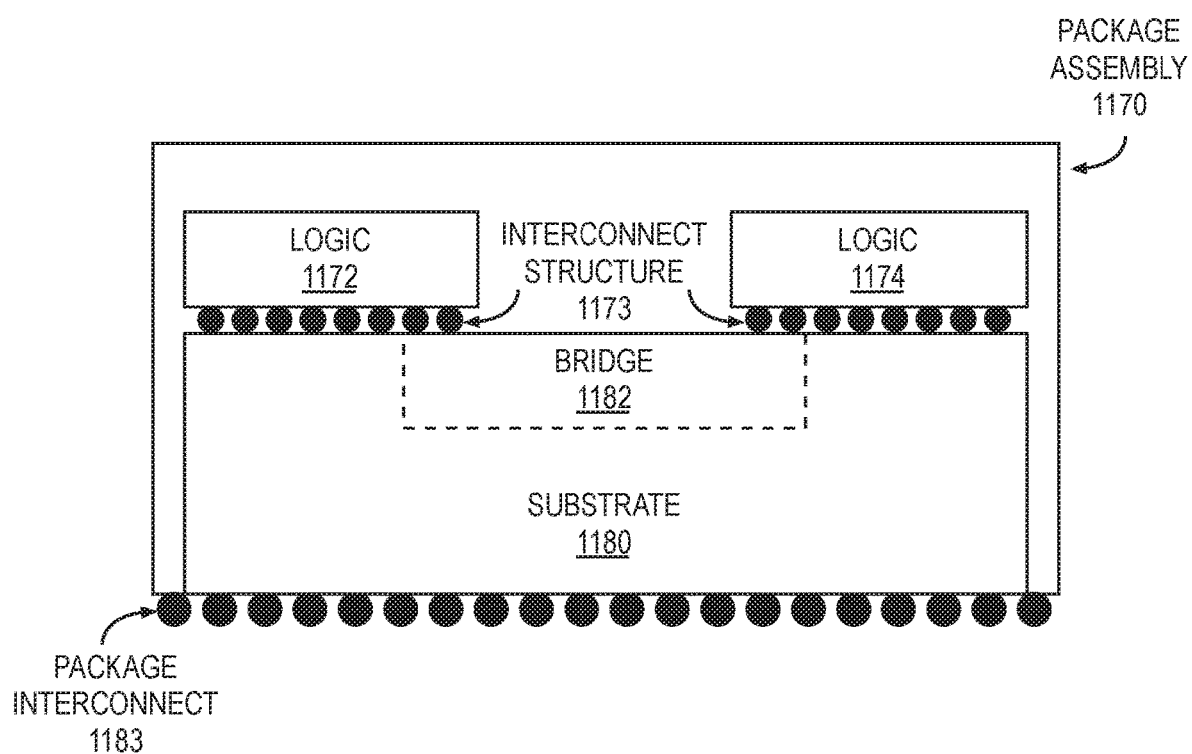
FIG. 11B illustrates a cross-section side view of an integrated circuit package assembly according to some embodiments.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package assembly 1170 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
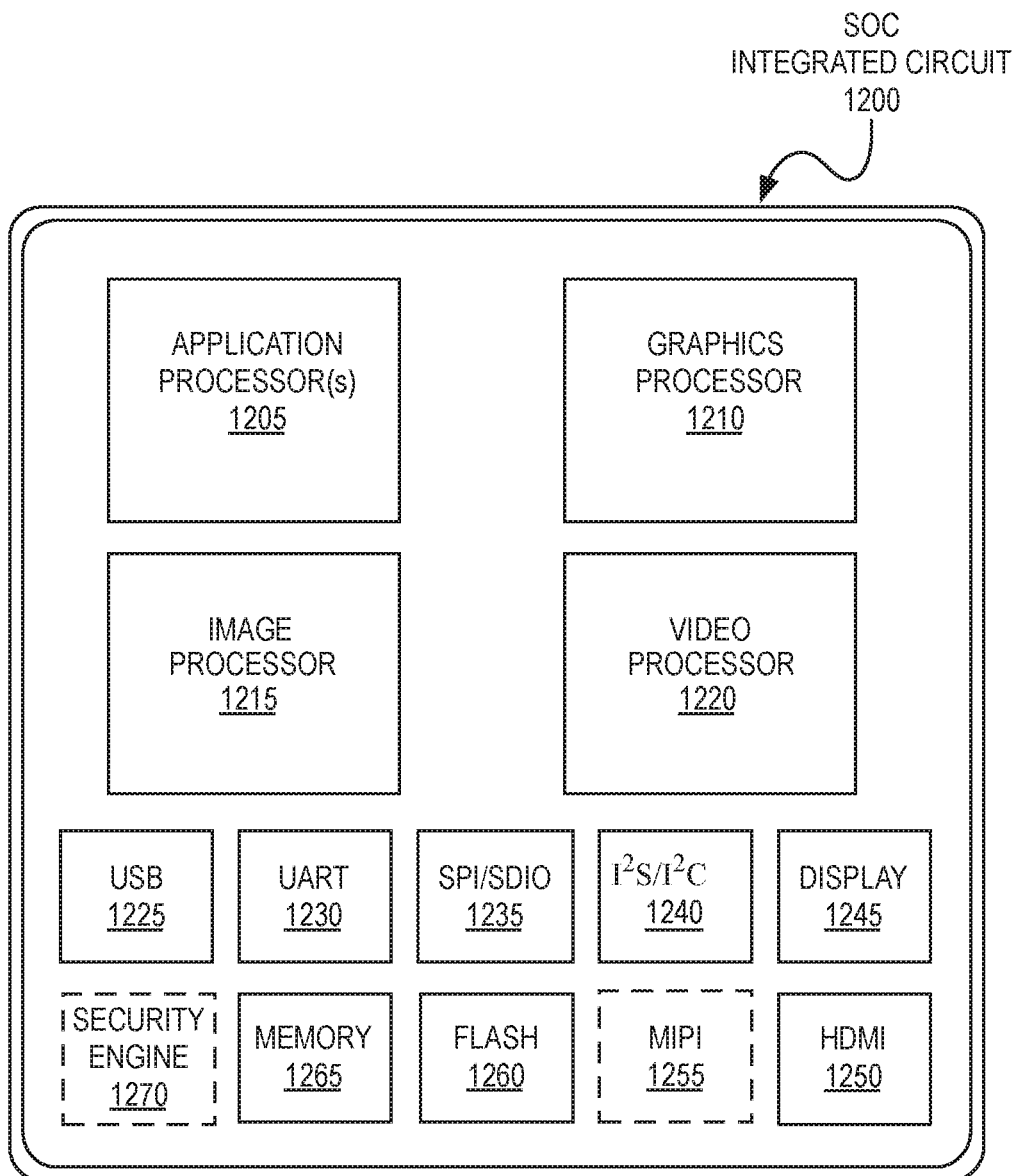
FIG. 12 is a block diagram illustrating an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
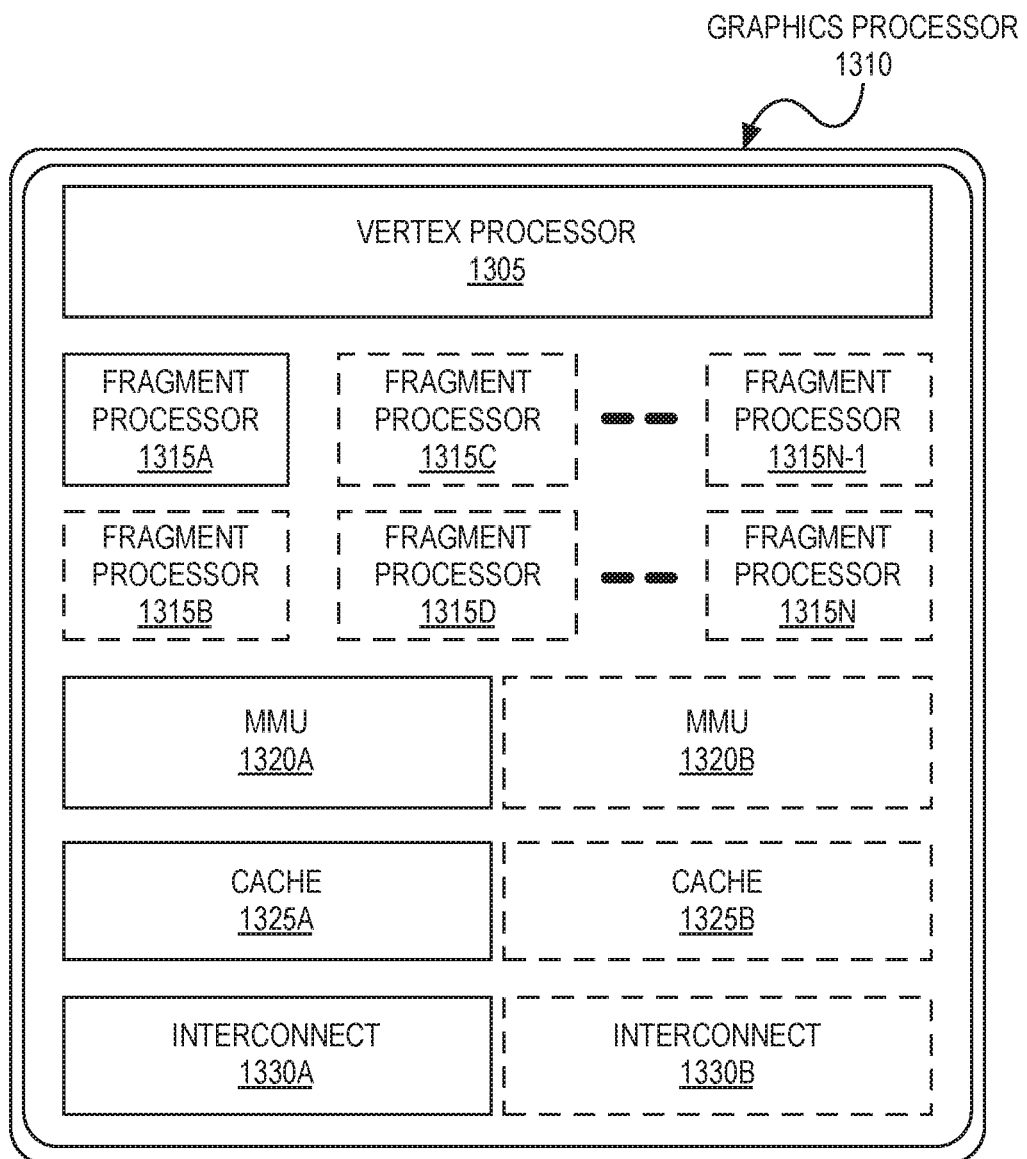
FIGS. 13A-13B are block diagrams illustrating exemplary graphics processors for use within an System on Chip (SoC), according to embodiments described herein.
Figure 13B:
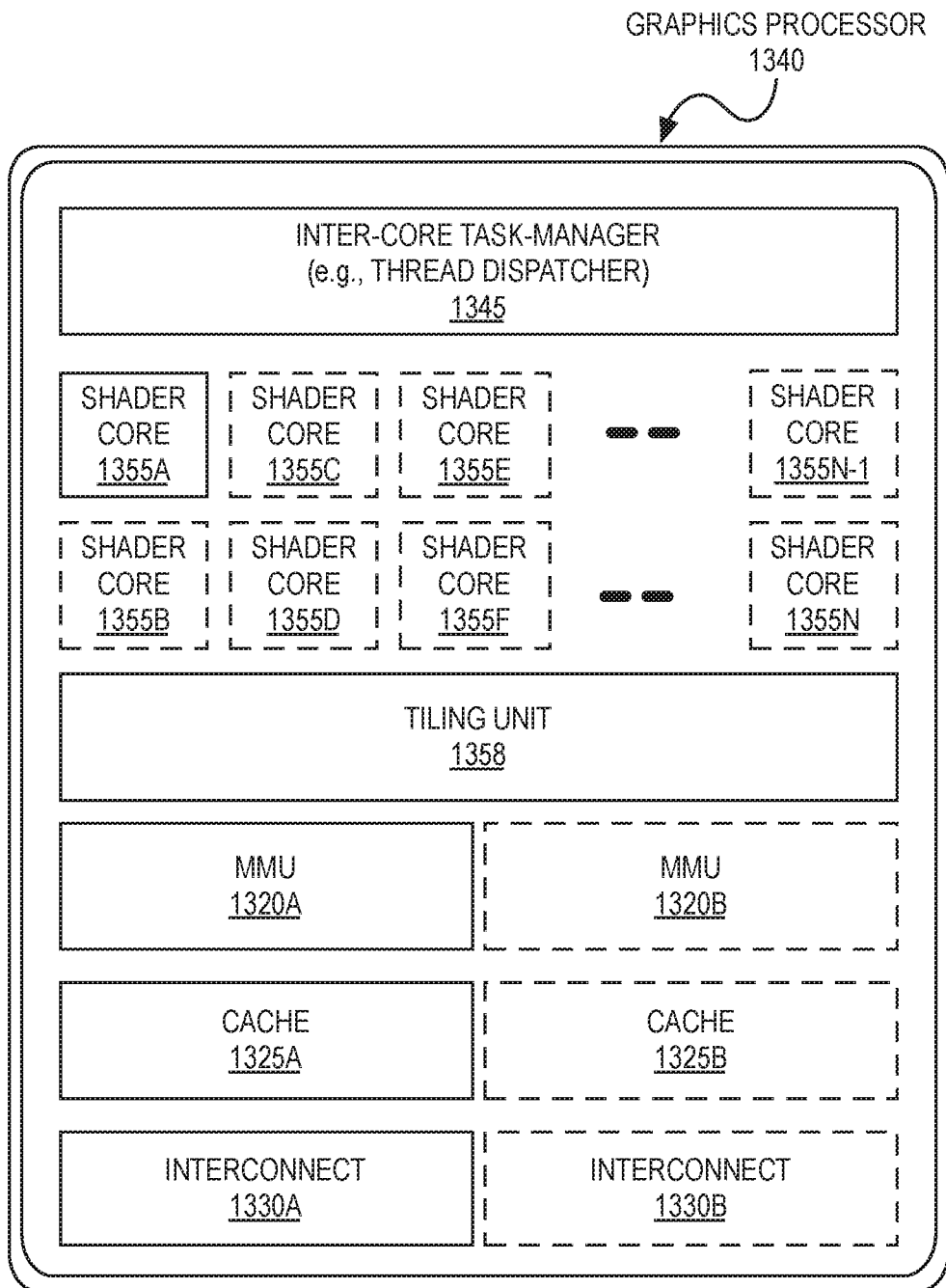

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor (s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
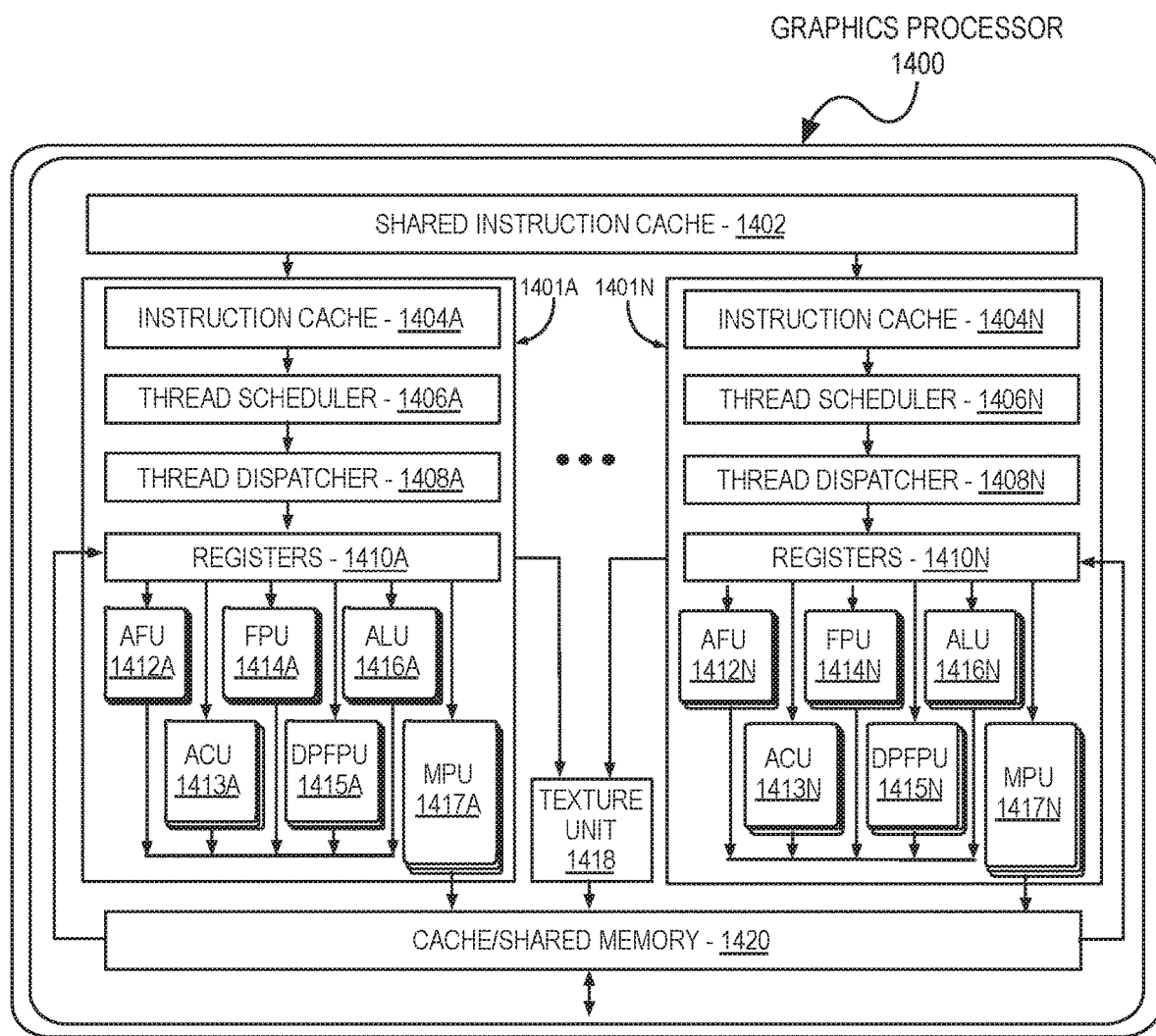
FIGS. 14A-14B illustrate additional exemplary graphics processor logic according to embodiments described herein.
Figure 14B:
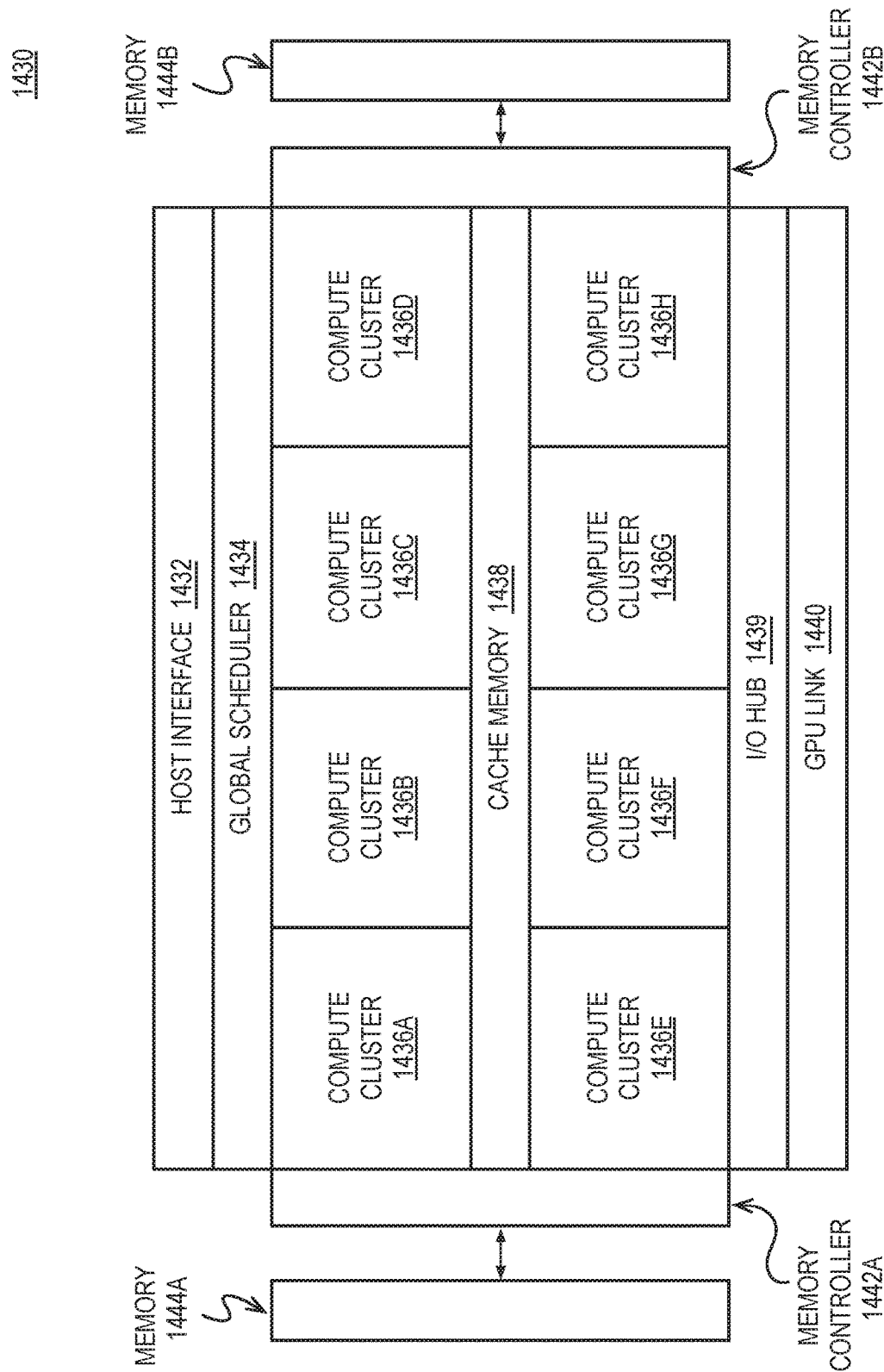

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random-access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example, and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Immersive Video Overview

Figure 15A:
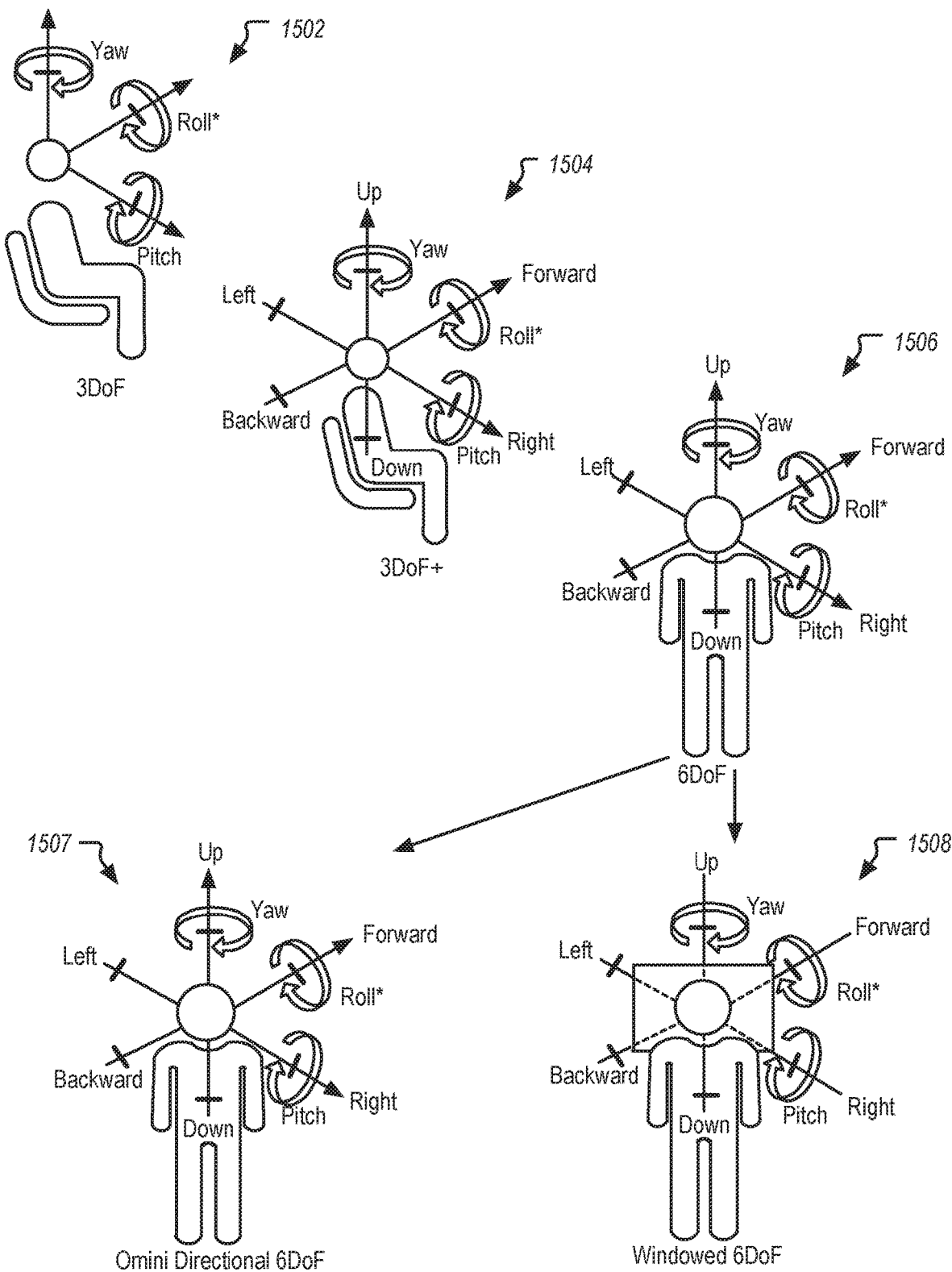
FIG. 15A illustrates multiple forms of immersive video.

FIG. 15A illustrates multiple forms of immersive video. Immersive video can be presented in multiple forms depending on the degrees of freedom available to a viewer. Degrees of freedom refers to the number of different directions that an object can move in three-dimensional (3D) space. Immersive video can be viewed via a head mounted display that includes tracking for position and orientation. Example forms of immersive video include 3DoF 1502, 3DoF Plus 1504, and full 6DoF 1506. In addition to immersive video in full 6DoF 1506, 6DOF immersive video includes omni-directional 6DoF 1507, and windowed 6DoF 1508.

For video in 3DoF 1502 (e.g., 360-degree video), a viewer can change orientation (e.g., yaw, pitch, roll) but not position. For video in 3DoF Plus 1504, a viewer can change orientation and make small change to changes to position. For video in 6DoF 1506, a viewer can change orientation and change position. More limited forms of 6DoF video are also available. Video in omni-directional 6DoF 1507 enables a viewer being able to take multiple steps in the virtual scene. Video in windowed 6DoF 1508 allows a viewer to change orientation and position, but the viewers is constrained to a limited view area. Increasing the available degrees of freedom in an immersive video generally includes increasing the amount and complexity of data involved in video generation, encode, decode, and playback.

Figure 15B:
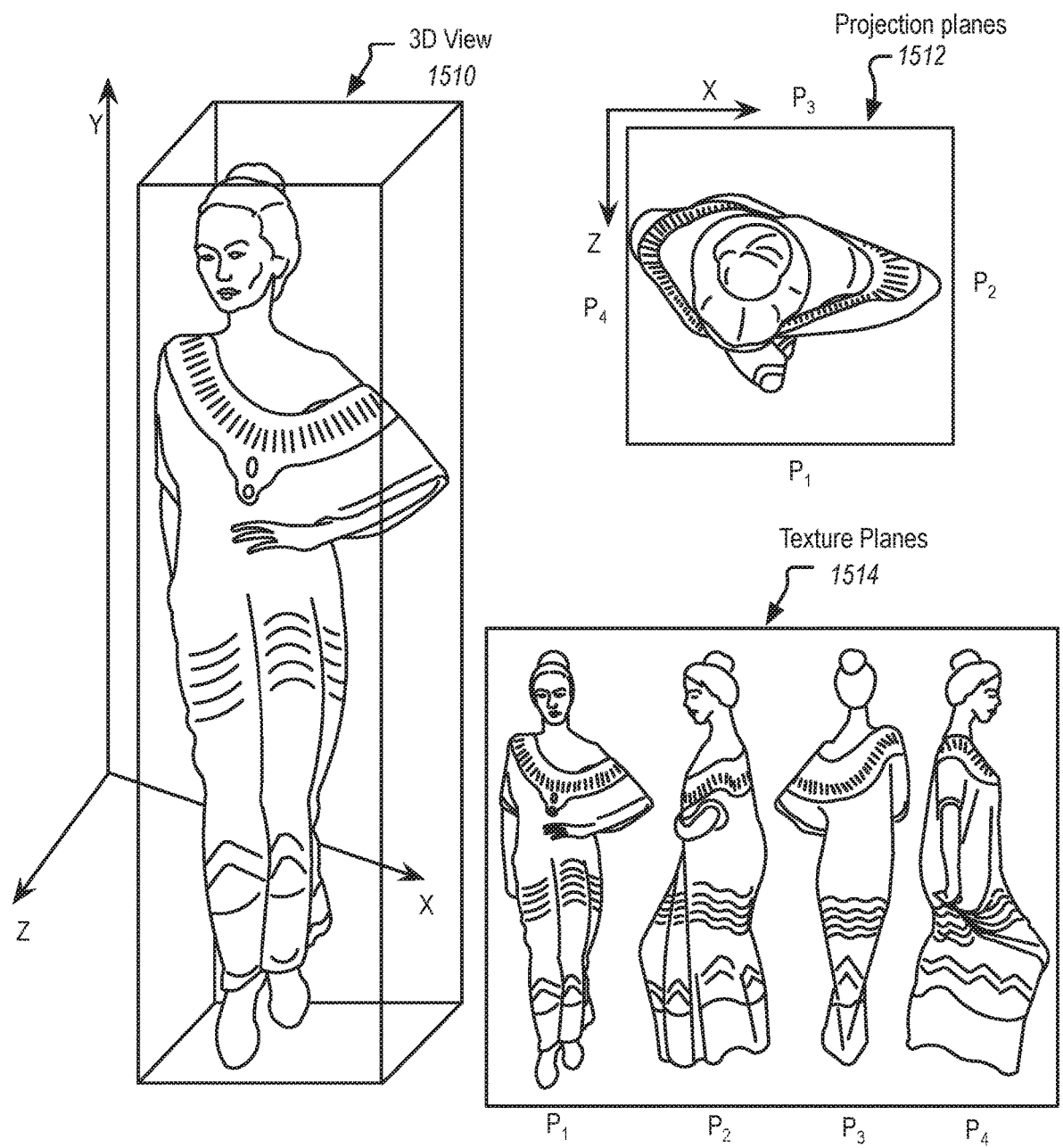
FIG. 15B illustrates image projection and texture planes for immersive video.

FIG. 15B illustrates image projection and texture planes for immersive video. A 3D view 1510 of video content can be generated using data from multiple cameras. Multiple projection planes 1512 can be used to generate geometry data for video content. Multiple texture planes 1514 can be derived for the projection planes 1512 used to generate the geometry data. The texture planes 1514 can be applied to 3D models that are pre-generated or generated based on a point cloud derived from video data. The multiple projection planes 1512 can be used to generate multiple two-dimensional (2D) projections, each projection associated with a projection plane.

Figure 16:
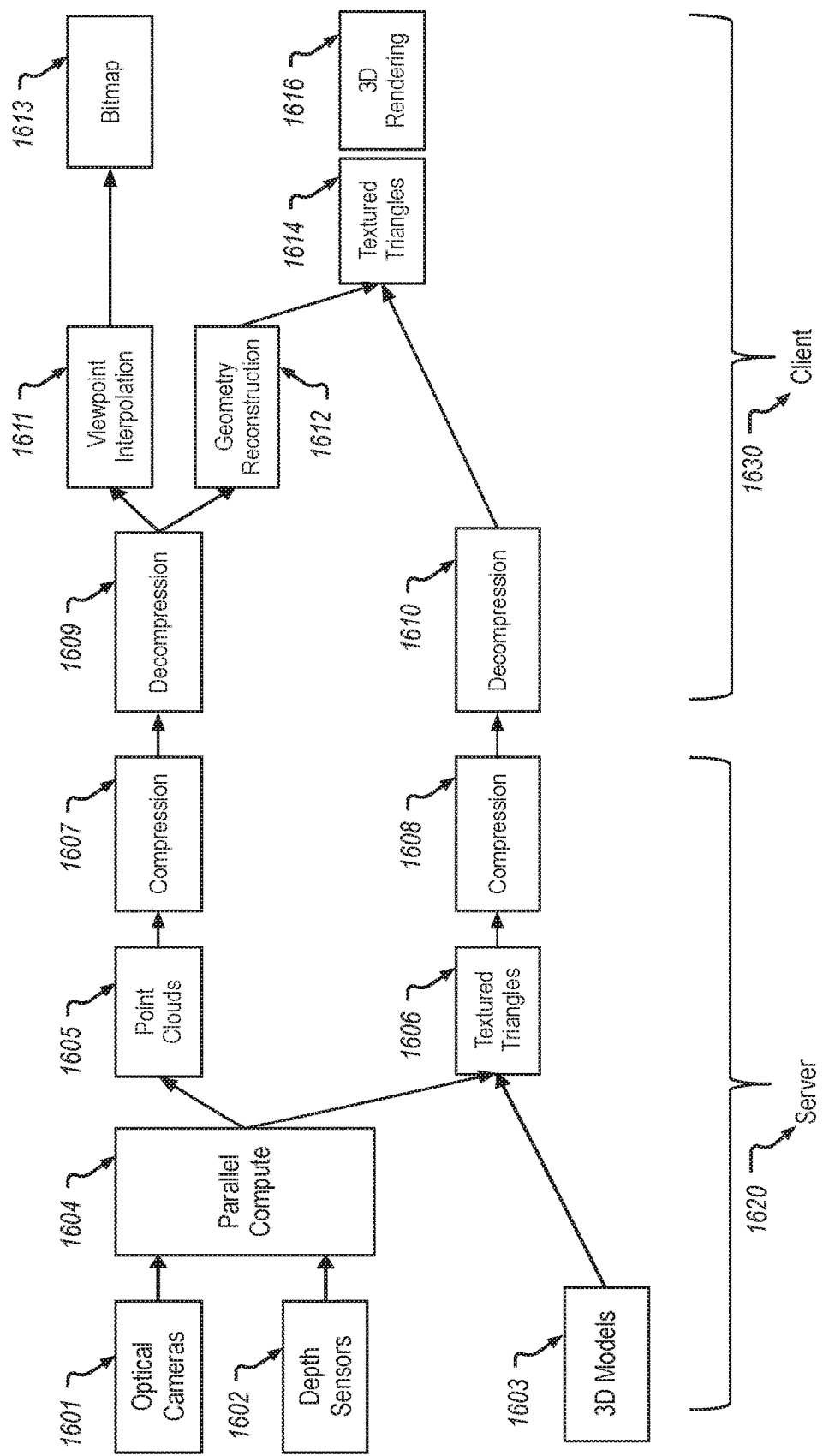
FIG. 16 illustrates a client-server system by which immersive video content can be generated and encoded by a server infrastructure for transmission to one or more client devices.

FIG. 16 illustrates a client-server system by which immersive video content can be generated and encoded by a server 1620 infrastructure for transmission to one or more client 1630 devices. The client 1630 devices can then decompress and render the immersive video content. In one embodiment, one or more server 1620 devices can include inputs from one or more optical cameras 1601 having depth sensors 1602. Parallel compute 1604 resources can decompose the video and depth data into point clouds 1605 and/or texture triangles 1606. Data to generate textured triangles 1606 can also be provided by pre-generated 3D models 1603 of a scene. The point clouds 1605 and/or textured triangles 1606 can be compressed for transmission to one or more client devices, which can locally render the content. In one embodiment, a variety of compression units 1607, 1608, using a variety of compression algorithms, can compressed generated content for transmission over a delivery medium from the server 1620 to one or more client 1630 devices. Decompression units 1609, 1610 on the client 1630 devices can decompress and decode incoming bitstreams into video/texture and geometry data. For example, decompression unit 1609 can decode compressed point cloud data and provide the decompressed point cloud data to a viewpoint interpolation unit 1611. The interpolated viewpoint data can be used to generate bitmap data 1613. The decompressed point cloud data can be provided to a geometry reconstruction unit 1612 to reconstruct geometry data for a scene. The reconstructed geometry data can be textured by decoded texture data (textured triangles 1614) to generate a 3D rendering 1616 for viewing by the client 1630.

Figure 17A:
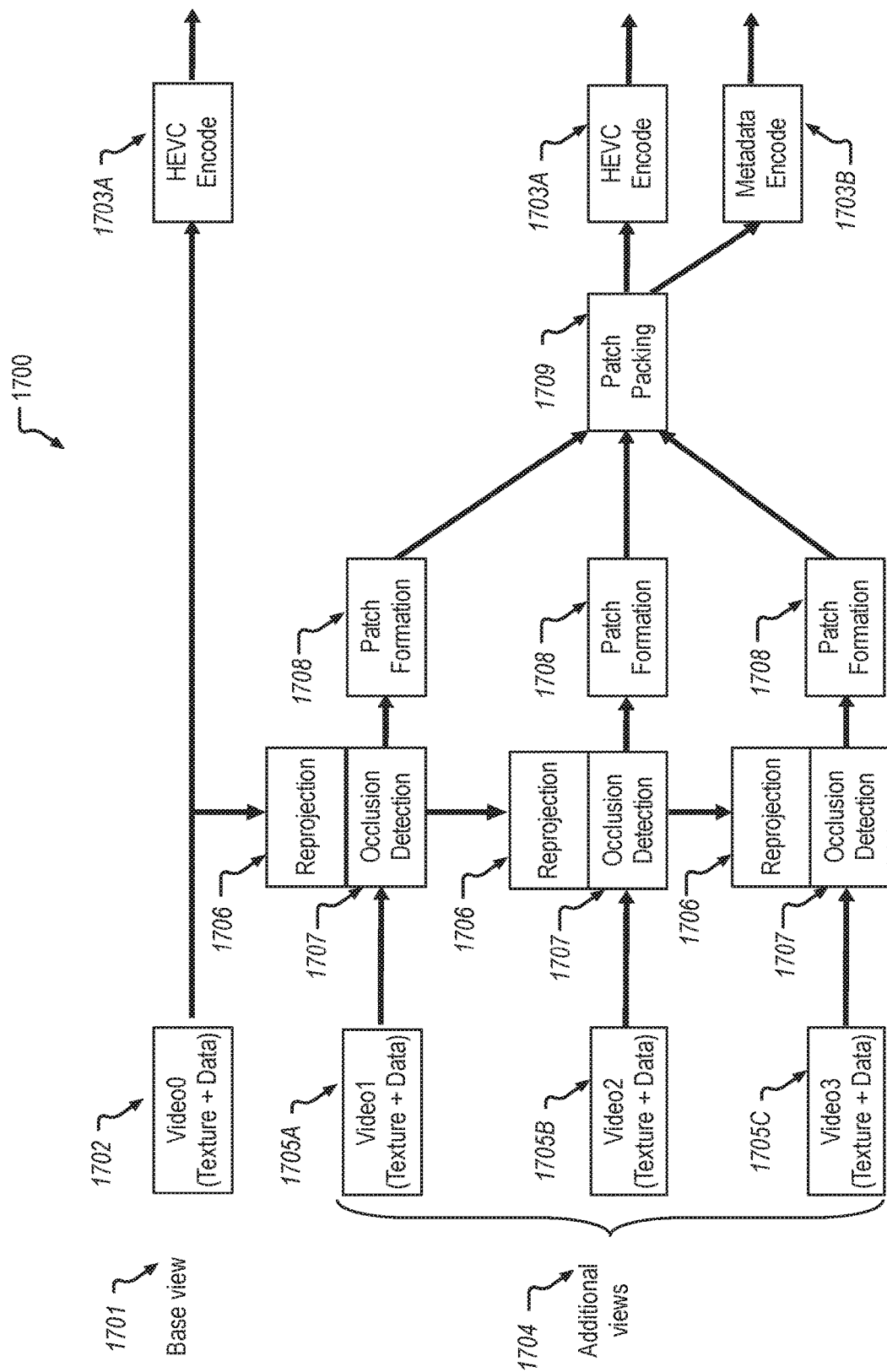
FIGS. 17A-17B illustrate a system for encoding and decoding 3DoF Plus content.
Figure 17B:
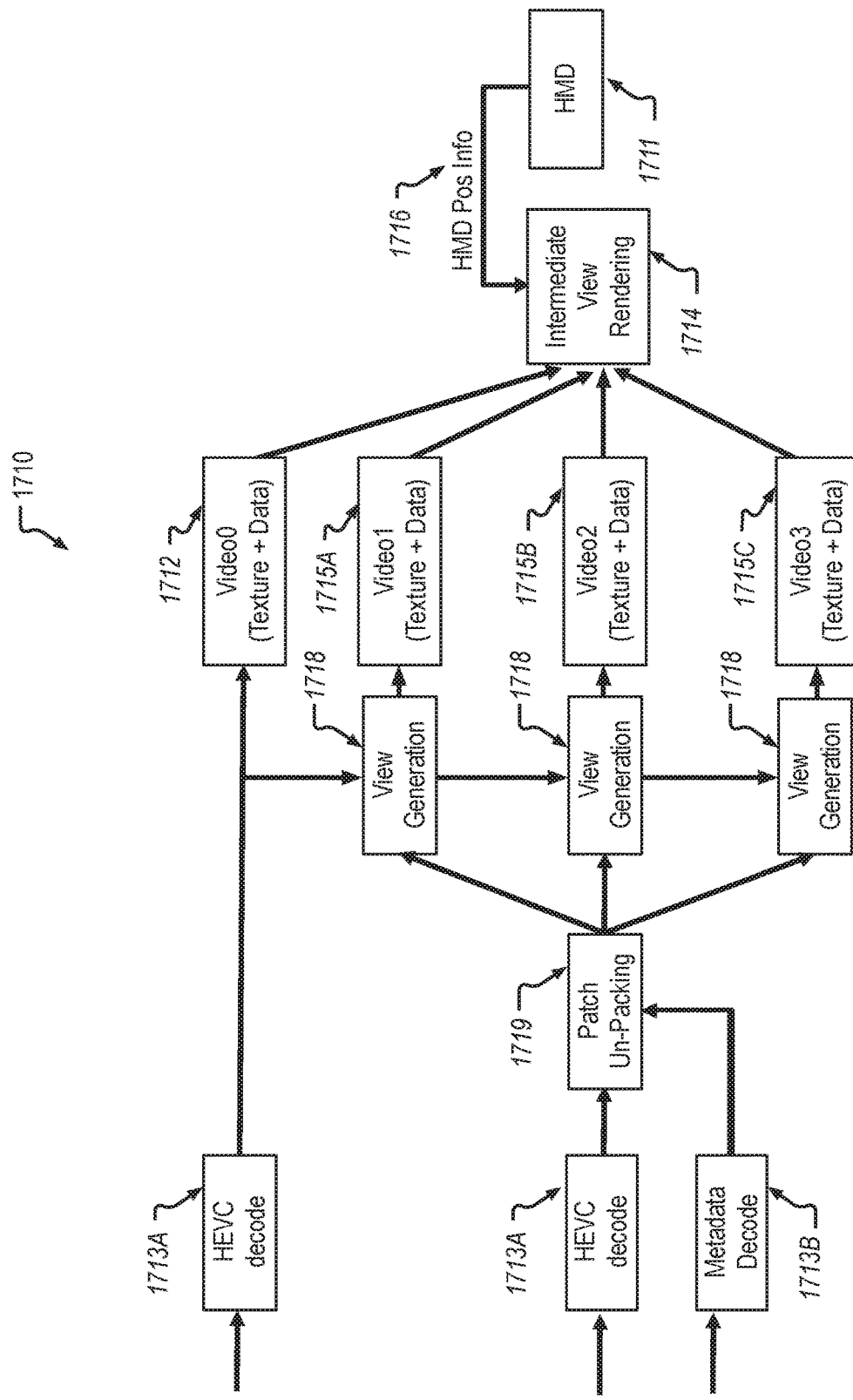

FIGS. 17A-17B illustrate systems 1700, 1710 for encoding and decoding 3DoF Plus content. System 1700 can be implemented by hardware and software of a server 1620 infrastructure, for example, as in FIG. 16. System 1710 can be implemented by hardware and software of a client 1630 as in FIG. 16.

As shown in FIG. 17A, a system 1700 can be used to encode video data 1702 for a base view 1701 and video data 1705A-1705C for additional views 1704. Multiple cameras can provide input data including video data and depth data, where each frame of video data can be converted into a texture. A set of reprojection 1706 and occlusion detection 1707 units can operate on received video data and output processed data to patch formation 1708 units. Patches formed by the patch formation 1708 units can be provided to a patch packing 1709 unit. Video data 1702 for the base view 1701 can be encoded, for example, via a high efficiency video coding (HEVC) encoder 1703A. A variant of the HEVC encoder 1703A can also be used to encode patch video data output from the patch packing 1709 unit. Metadata to reconstruct video from the encoded patches can be encoded by a metadata encode 1703B unit. Multiple encoded video and metadata streams can then be transmitted to a client device for viewing.

As shown in FIG. 17B, multiple streams of video data can be received, decoded, and reconstructed into immersive video by system 1710. The multiple streams of video include a stream for the base video, along with a stream containing packed data for the additional views. Encoded metadata is also received. The multiple video streams can be decoded, in one embodiment, via an HEVC 1713A decoder. Metadata can be decoded via a metadata 1713B decoder. The decoded metadata is then used to unpack the decoded additional views via patch un-packing 1719 logic. Decoded texture and depth data (video 0 1712, video 1-3 1714A-1715C) of the base view 1701 and the additional views 1704 are reconstructed by view generation logic 1718 on the client (e.g., client 1630 as in FIG. 16). The decoded video 1712, 1715A-1715C can be provided as texture and depth data to an intermediate view renderer 1714 that can be used to render intermediate views for a head mounted display 1711. Head mounted display position information 1716 is provided as feedback to the intermediate view renderer 1714, which can render updated views for the displayed viewport presented via the head mounted display 1711.

Figure 18A:
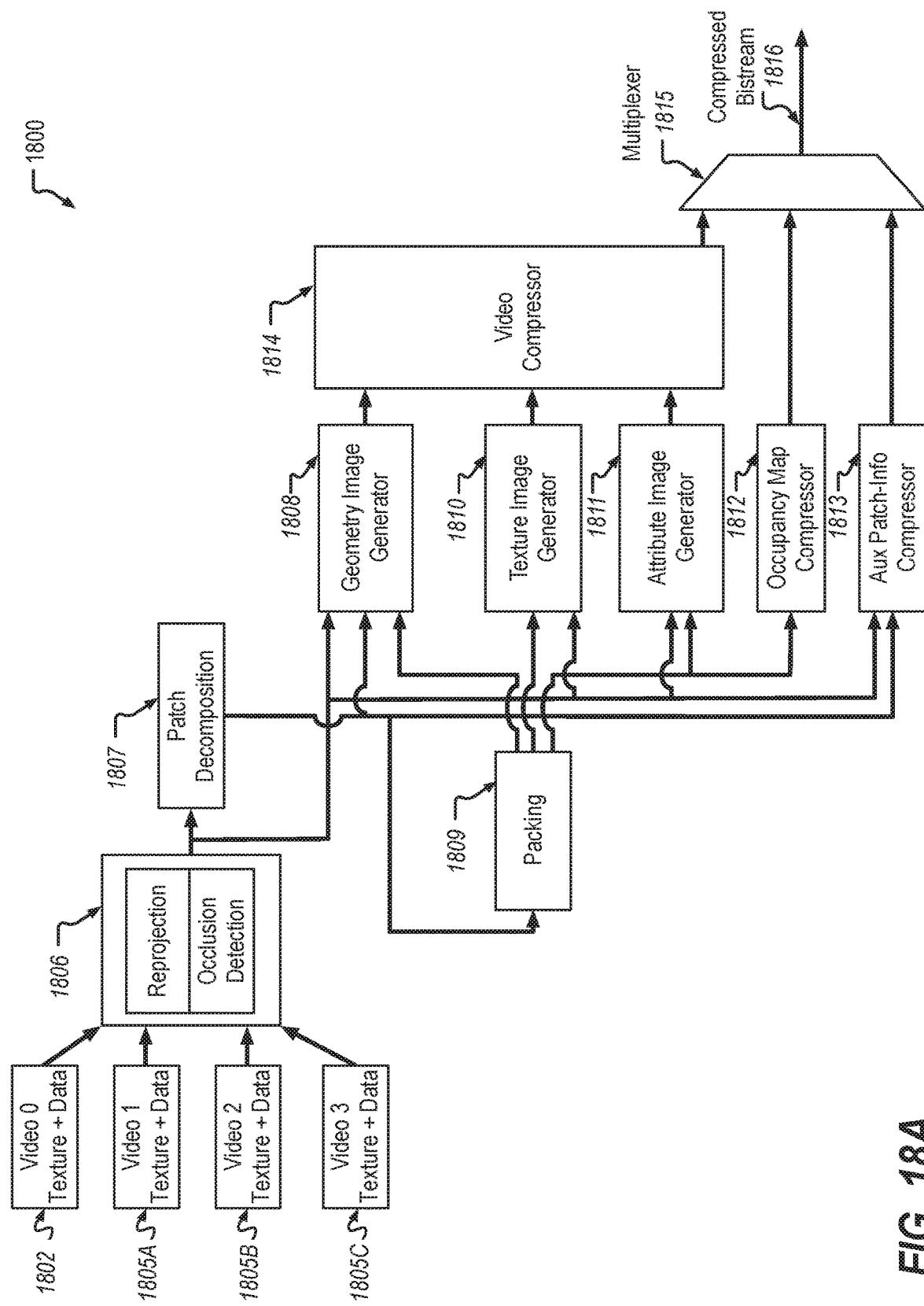
FIGS. 18A-18B illustrate a system for encoding and decoding 6DoF content using textured geometry data.
Figure 18B:
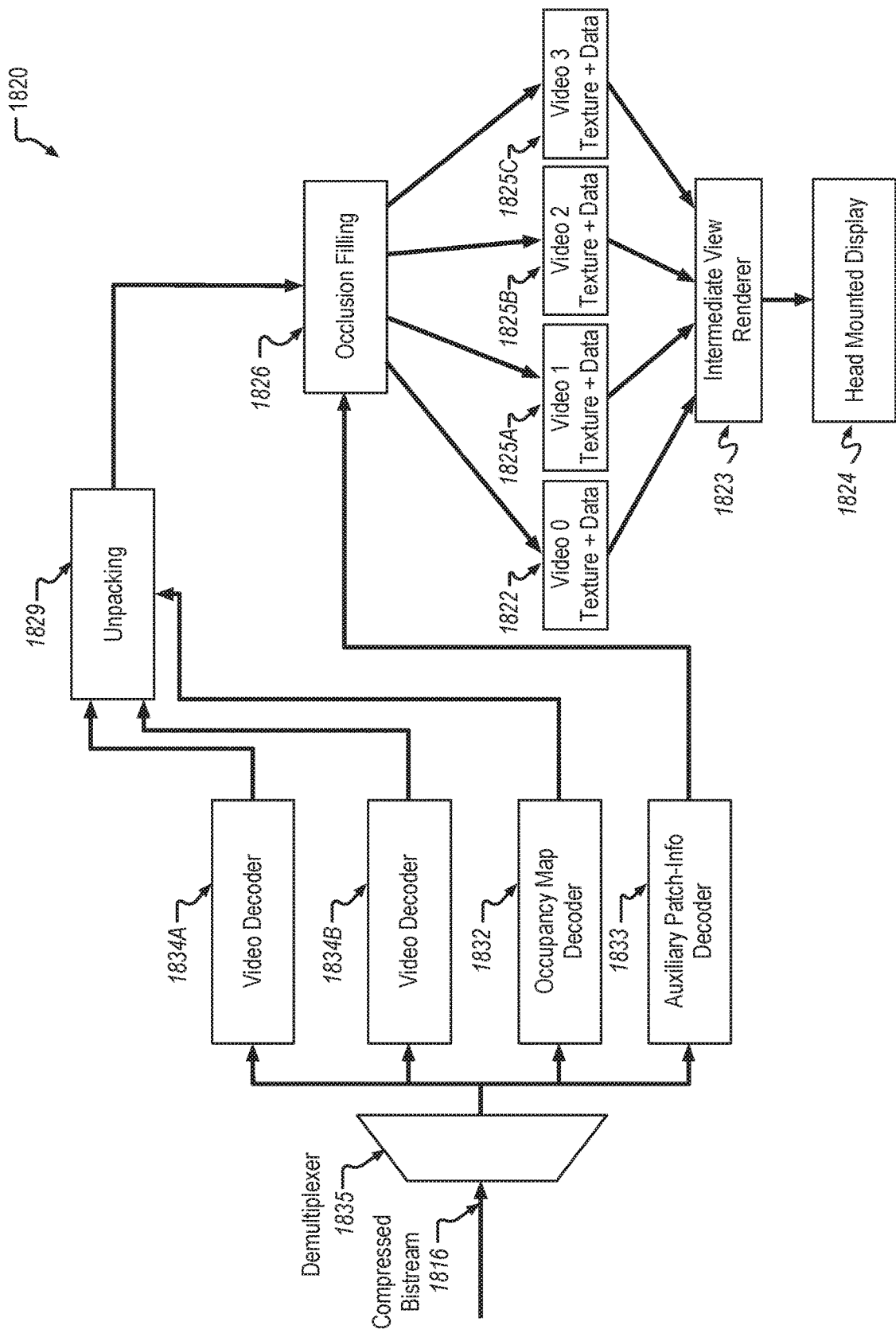

FIG. 18A-18B illustrate a system for encoding and decoding 6DoF textured geometry data. FIG. 18A shows a 6DoF textured geometry encoding system 1800. FIG. 18B shows a 6DoF textured geometry decoding system 1820. 6DoF textured geometry encoding and decoding can be used to enable a variant of 6DoF immersive video in which video data is applied as a texture to geometry data, allowing new intermediate views to be rendered based on the position and orientation of a head mounted display. Data recorded by multiple video cameras can be combined with 3D models, particularly for static objects.

As shown in FIG. 18A, a 6DoF textured geometry encoding system 1800 can receive video data 1802 for a base view and video data 1805A-1805C for additional views. The video data 1802, 1805A-1805C includes texture and depth data that can be processed by a reprojection and occlusion detection unit 1806. Output from the reprojection and occlusion detection unit 1806 can be provided to a patch decomposition unit 1807 and a geometry image generator 1808. Output from the patch decomposition unit 1807 is provided to a patch packing unit 1809 and an auxiliary patch information compressor 1813. The auxiliary patch information (patch-info) provides information used to reconstruct patches of video texture and depth data. The patch packing unit 1809 outputs packed patch data to the geometry image generator 1808, a texture image generator 1810, an attribute image generator 1811, and an occupancy map compressor 1812.

The geometry image generator 1808, texture image generator 1810, and attribute image generator 1811 output data to a video compressor 1814. The geometry image generator 1808 can receive input from the reprojection and occlusion detection unit 1806, patch decomposition unit 1807, and patch packing unit 1809 and generates geometry image data. The texture image generator 1810 can receive packed patch data from the patch packing unit 1809 and video texture and depth data from the reprojection and occlusion detection unit 1806. The attribute image generator 1811 generates an attribute image from video texture and depth data received from the reprojection and occlusion detection unit 1806 and patched patch data received from the patch packing unit 1809.

An occupancy map can be generated by an occupancy map compressor 1812 based on packed patch data output from the patch packing unit 1809. Auxiliary patch information can be generated by the auxiliary patch information compressor 1813. Compressed occupancy map and auxiliary patch information data can be multiplexed into a compressed bitstream 1816 by a multiplexer 1815 along with compressed and/or encoded video data output from the video compressor 1814. The compressed video data output from the video compressor 1814 includes compressed geometry image data, texture image data, and attribute image data. The compressed bitstream 1816 can be stored or provided to a client device for decompression and viewing.

As shown in FIG. 18B, a 6DoF textured geometry decoding system 1820 can be used to decode 6DoF content generated using the encoding system 1800 of FIG. 18A. The compressed bitstream 1816 is received and demultiplexed by a demultiplexer 1835 into multiple video decode streams, an occupancy map, and auxiliary patch information. The multiple video streams are decoded/decompressed by video decoders 1834A-1834B. Occupancy map data is decoded/decompressed by an occupancy map decoder 1832. The decoded video data and occupancy map data are output by the video decoders 1834A-1834B and the occupancy map decoder 1832 to an unpacking unit 1829. The unpacking unit unpacks video patch data that is packed by the patch packing unit 1809 of FIG. 18A. Auxiliary patch information from the auxiliary patch-info decoder 1833 is provided to an occlusion filling unit 1826, which can be used to fill in patches from occluded portions of an object that may be missing from a particular view of the video data. Respective video streams 1822, 1825A-1825C having texture and depth data are output from the occlusion filling unit 1826 and provided to an intermediate view renderer 1823, which can render a view for display on a head mounted display 1824 based on position and orientation information provided by the head mounted display 1824.

Figure 19A:
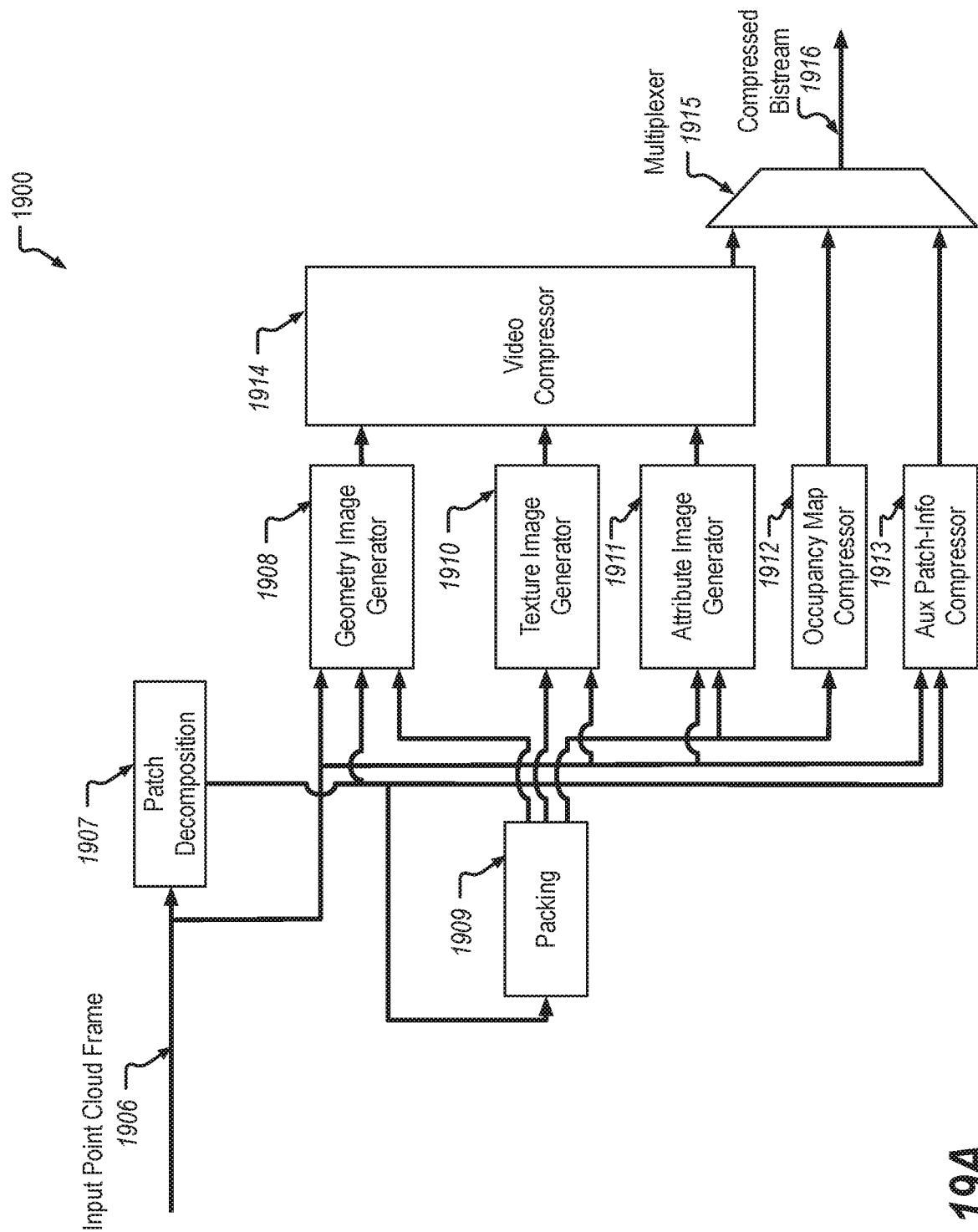
FIGS. 19A-19B illustrate a system for encoding and decoding 6DoF content via point cloud data.
Figure 19B:
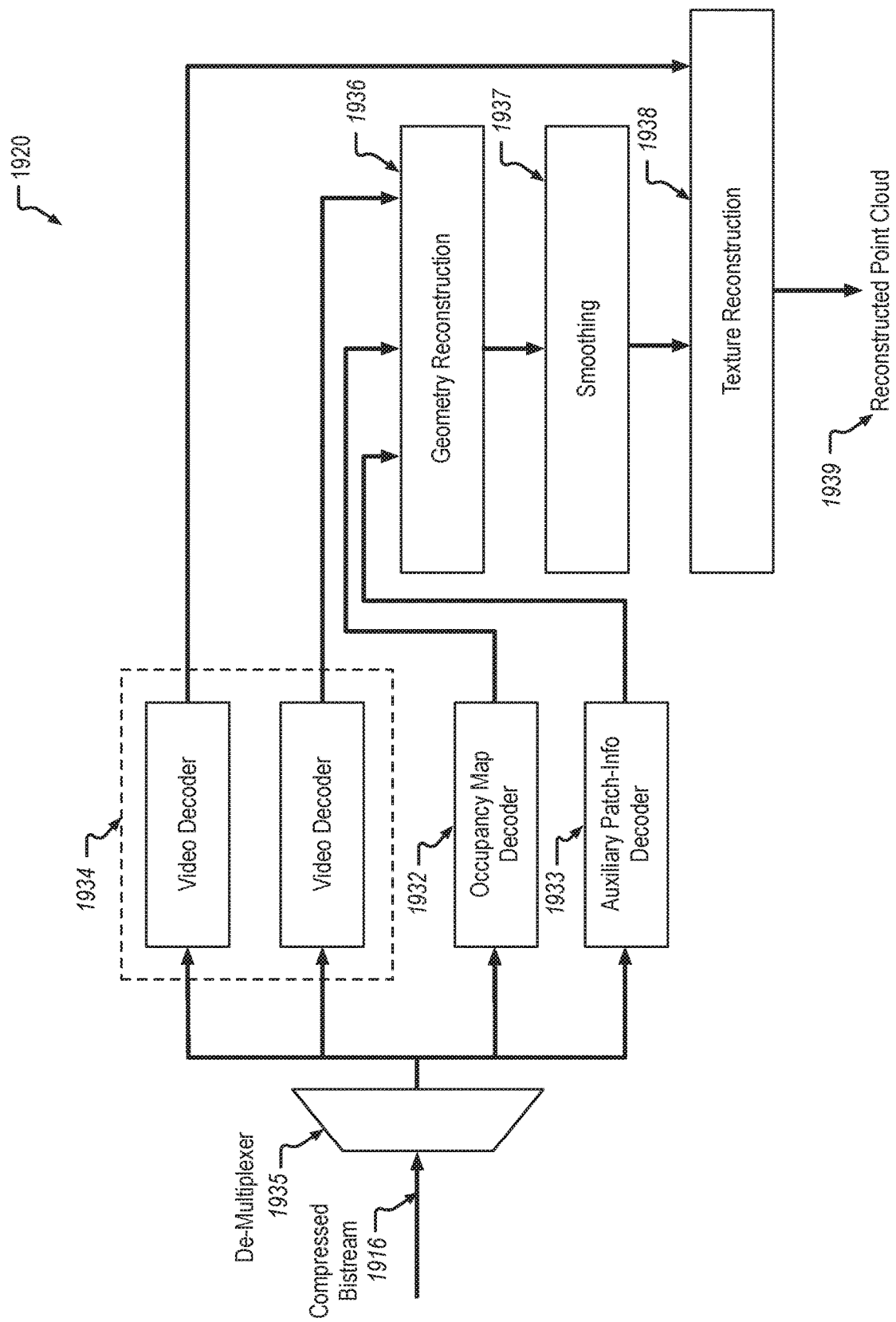

FIG. 19A-19B illustrate a system for encoding and decoding 6DoF point cloud data. FIG. 19A illustrates a 6DoF point cloud encoding system 1900. FIG. 19B illustrates a 6DoF point cloud decoding system 1920. 6DoF video can be represented using point clouds, where for a point cloud video sequence, at regular time intervals (e.g., 60 Hz) there is a new point cloud frame. Each point in the point cloud data frame is represented by six parameters: (X, Y, Z) geometry position and (R, G, B or Y, U, V) texture data. In the encoding system 1900 of FIG. 19A, a point cloud frame is projected onto several two-dimensional (2D) planes, each 2D plane corresponding to a projection angle. The projection planes can be similar to the projection planes 1512 of FIG. 15B. In some implementations, six projection angles are used in the PCC standard test model, with the projection angles corresponding to angles pointing to the centers of six faces of a rectangular solid that bound the object represented by the point cloud data. While six projection angles are described, other number of angles could possibly be used in different implementations.

Texture and depth 2D image patch representations are formed at each projection angle. The 2D patch image representations for a projection angle can be created by projecting only those points for which a projection angle has the closest normal. In other words, the 2D patch image representation is taken for the points that maximize the dot product of the point normal and the plane normal. Texture patches from the separate projections are combined into a single texture image, which is referred to as the geometry image. Metadata to represent the patches and how they were packed into a frame are described in the occupancy map and auxiliary patch info. The occupancy map metadata includes an indication of which image sample positions are empty (e.g., do not contain corresponding point cloud information). The auxiliary patch info indicates the projection plane to which a patch belongs and can be used to determine a projection plane associated with a given sample position. The texture images and depth images are encoded using a 2D conventional video encoder, such as a high efficiency video coding (HEVC) encoder. The metadata can be separately compressed using metadata encoding logic. In the test model decoder, the texture images and depth images are decoded using an HEVC video decoder. A point cloud is reconstructed, using the decoded texture and depth images, along with the occupancy map and auxiliary patch info metadata.

As shown in FIG. 19A, an input frame of point cloud data can be decomposed into patch data. The point cloud data and decomposed patch data can be encoded in a similar manner as video texture and depth data in FIG. 18A. Input data including a point cloud frame 1906 can be provided to a patch decomposition unit 1907. The input point cloud data and decomposed patches thereof can be processed by a packing unit 1909, geometry image generator 1908, texture image generator 1910, attribute image generator 1911, occupancy map compressor 1912, and auxiliary patch information compressor 1913 using techniques similar to the processing of texture depth and video data output by the reprojection and occlusion detection unit 1806 and patch decomposition unit 1807 of FIG. 18A. A video compressor 1914 can encode and/or compress geometry image, texture image, and attribute image data. The compressed and/or encoded video data from the video compressor 1914 can be multiplexed by a multiplexer 1915 with occupancy map and auxiliary patch information data into a compressed bitstream 1916, which can be stored or transmitted for display.

The compressed bitstream output by the system 1900 of FIG. 19A can be decoded by the point cloud decoding system 1920 shown in FIG. 19B. As shown in FIG. 19B, a compressed bitstream 1916 can be demultiplexed into multiple encoded/compressed video streams, occupancy map data, and auxiliary patch information. The video streams can be decoded/decompressed by a multi-stream video decoder 1934, which can output texture and geometry data. Occupancy map and auxiliary patch information can be decompressed/decoded by an occupancy map decoder 1932 and an auxiliary patch information decoder 1933.

Geometry reconstruction, smoothing, and texture reconstruction can then be performed to reconstruct the point cloud data provided to the 6DoF point cloud encoding system 1900 of FIG. 19A. A geometry reconstruction unit 1936 can reconstruct geometry information based on geometry data decoded from a video stream of the multi-stream video decoder 1934, as well as output of the occupancy map decoder 1932 and auxiliary patch information decoder 1933. Reconstructed geometry data can be smoothed by a smoothing unit 1937. Smoothed geometry and texture image data decoded from a video stream output by the multi-stream video decoder 1934 is provided to a texture reconstruction unit 1938. The texture reconstruction unit 1938 can output a reconstructed point cloud 1939, which is a variant of the input point cloud frame 1926 provided to the 6DoF point cloud encoding system 1900 of FIG. 19A

Figure 20:
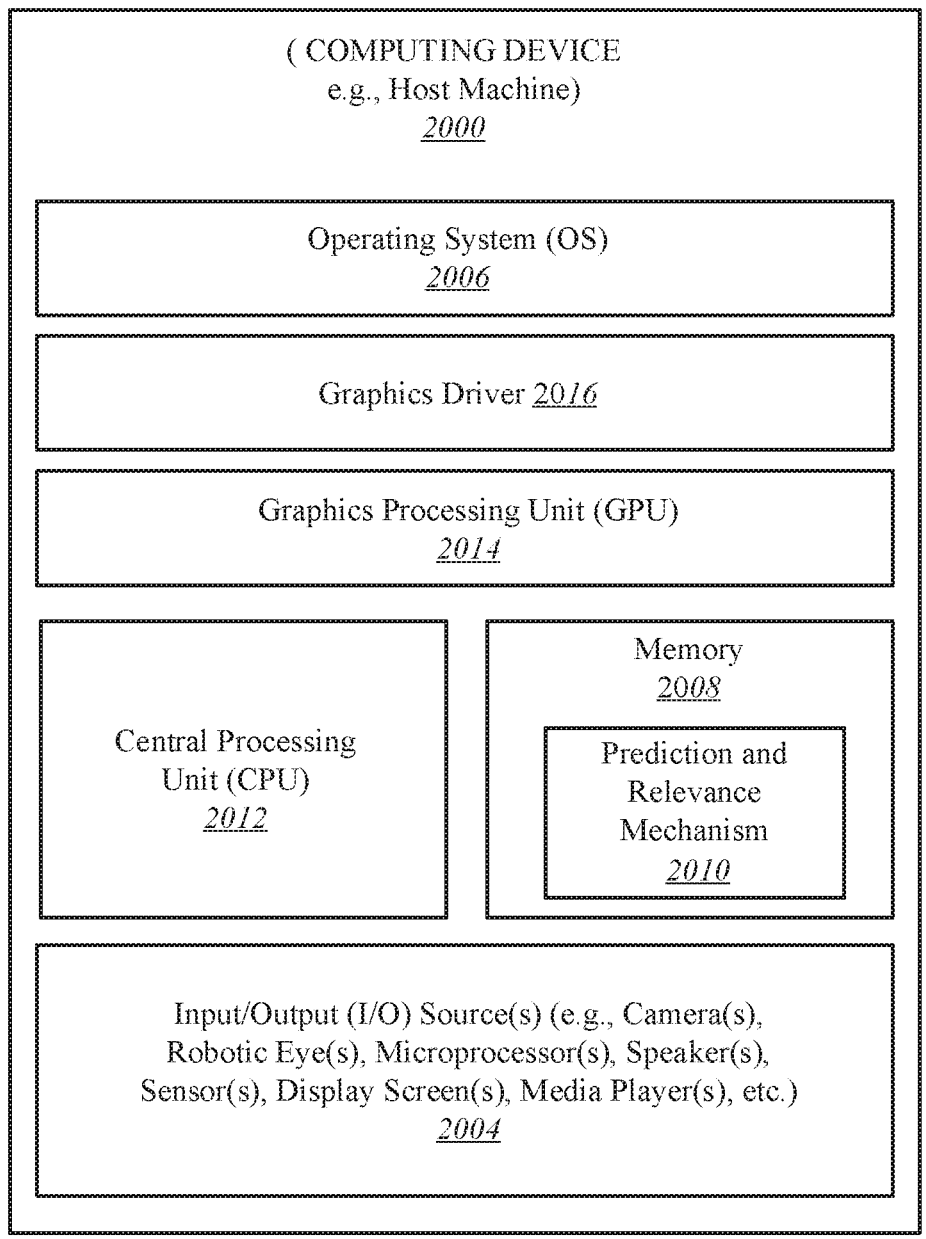
FIG. 20 illustrates a computing device hosting a prediction and relevance mechanism according to one embodiment.

FIG. 20 illustrates a computing device 2000 hosting a prediction and relevance mechanism 2010 according to one embodiment. Computing device 2000 represents a communication and data processing device including (but not limited to) smart wearable devices, smartphones, virtual reality (VR) devices, head-mounted display (HMDs), mobile computers, Internet of Things (IoT) devices, laptop computers, desktop computers, server computers, etc., and be similar to or the same as processing device 100 of FIG. 1; accordingly, for brevity, clarity, and ease of understanding, many of the details stated above with reference to FIGS. 1-19B are not further discussed or repeated hereafter.

Computing device 2000 may further include (without limitations) an autonomous machine or an artificially intelligent agent, such as a mechanical agent or machine, an electronics agent or machine, a virtual agent or machine, an electro-mechanical agent or machine, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Throughout this document, "computing device" may be interchangeably referred to as "autonomous machine" or "artificially intelligent agent" or simply "robot".

It contemplated that although "autonomous vehicle" and "autonomous driving" are referenced throughout this document, embodiments are not limited as such. For example, "autonomous vehicle" is not limed to an automobile but that it may include any number and type of autonomous machines, such as robots, autonomous equipment, household autonomous devices, and/or the like, and any one or more tasks or operations relating to such autonomous machines may be interchangeably referenced with autonomous driving.

Computing device 2000 may further include (without limitations) large computing systems, such as server computers, desktop computers, etc., and may further include set-top boxes (e.g., Internet-based cable television set-top boxes, etc.), global positioning system (GPS)-based devices, etc. Computing device 2000 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 600 may include a mobile computing device employing a computer platform hosting an integrated circuit ("IC"), such as system on a chip ("SoC" or "SOC"), integrating various hardware and/or software components of computing device 2000 on a single chip.

As illustrated, in one embodiment, computing device 2000 may include any number and type of hardware and/or software components, such as (without limitation) graphics processing unit ("GPU" or simply "graphics processor") 2014, graphics driver (also referred to as "GPU driver", "graphics driver logic", "driver logic", user-mode driver (UMD), UMD, user-mode driver framework (UMDF), UMDF, or simply "driver") 2016, central processing unit ("CPU" or simply "application processor") 2012, memory 2008, network devices, drivers, or the like, as well as input/output (I/O) source(s) 2004, such as touchscreens, touch panels, touch pads, virtual or regular keyboards, virtual or regular mice, ports, connectors, etc. Computing device 2000 may include operating system (OS) 2006 serving as an interface between hardware and/or physical resources of the computer device 2000 and a user. It is contemplated that graphics processor 2014 and application processor 2012 may be one or more of processor(s) 102 of FIG. 1.

It is to be appreciated that a lesser or more equipped system than the example described above may be preferred for certain implementations. Therefore, the configuration of computing device 2000 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "mechanism", "tool", "circuit", and "circuitry" are referenced interchangeably throughout this document and include, by way of example, software, hardware, firmware, or any combination thereof.

In one embodiment, as illustrated, prediction and relevance mechanism 2010 may be hosted by memory 2008 of computing device 2000. In another embodiment, prediction and relevance mechanism 2010 may be hosted by operating system 2006 or graphics driver 2016. In yet another embodiment, prediction and relevance mechanism 2010 may be hosted by or part of graphics processing unit ("GPU" or simply graphics processor") 2014 or firmware of graphics processor 2014. For example, prediction and relevance mechanism 2010 may be embedded in or implemented as part of the processing hardware of graphics processor 2014. Similarly, in yet another embodiment, prediction and relevance mechanism 2010 may be hosted by or part of central processing unit ("CPU" or simply "application processor") 2012. For example, prediction and relevance mechanism 2010 may be embedded in or implemented as part of the processing hardware of application processor 2012.

In yet another embodiment, prediction and relevance mechanism 2010 may be hosted by or part of any number and type of components of computing device 2000, such as a portion of prediction and relevance mechanism 2010 may be hosted by or part of operating system 2006, another portion may be hosted by or part of graphics processor 2014, another portion may be hosted by or part of application processor 2012, while one or more portions of prediction and relevance mechanism 2010 may be hosted by or part of operating system 2006 and/or any number and type of devices of computing device 2000. It is contemplated that embodiments are not limited to any implementation or hosting of prediction and relevance mechanism 2010 and that one or more portions or components of prediction and relevance mechanism 2010 may be employed or implemented as hardware, software, or any combination thereof, such as firmware.

Computing device 2000 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna (e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 21:
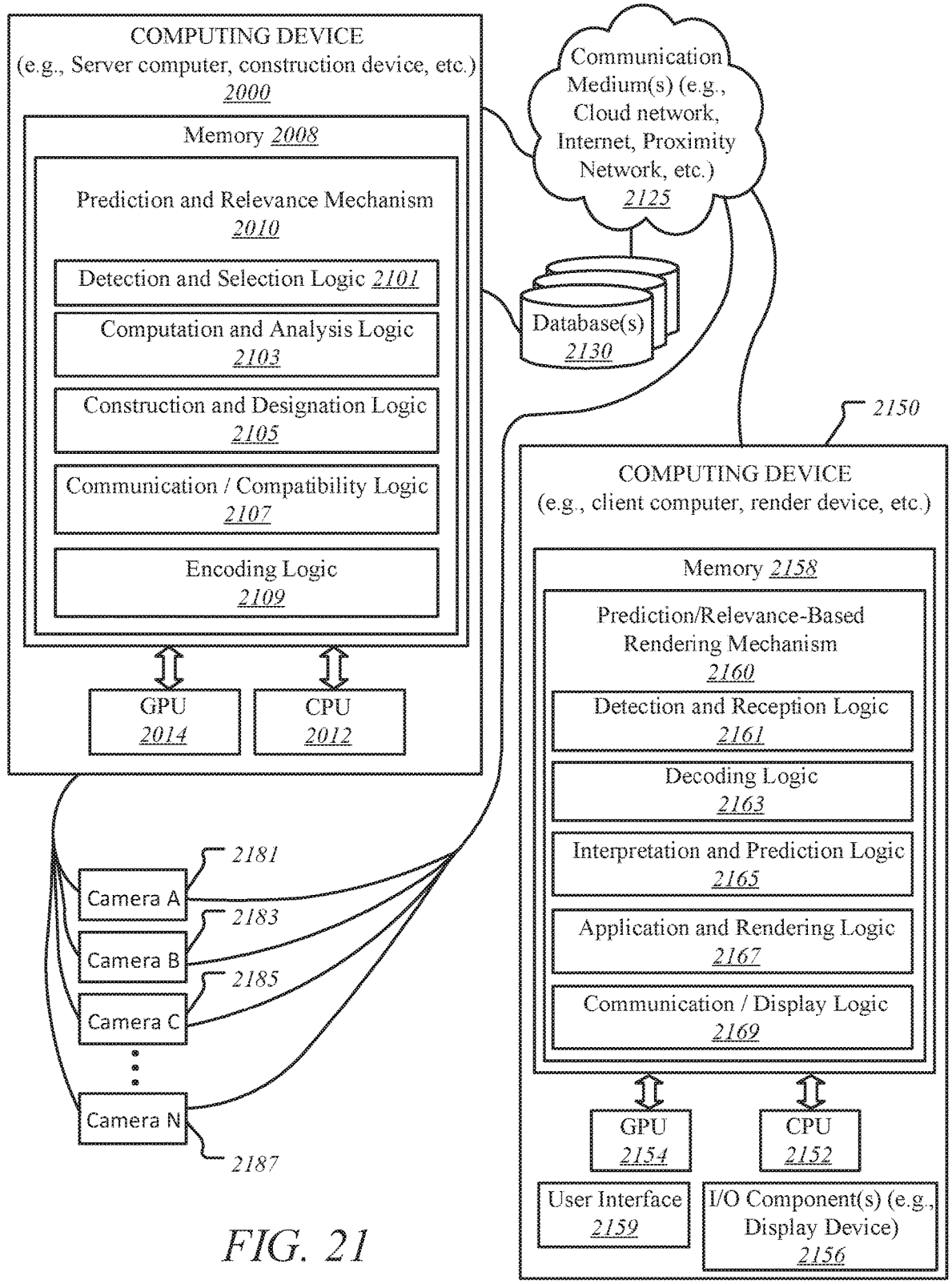
FIG. 21 illustrates a prediction and relevance mechanism according to one embodiment.

FIG. 21 illustrates prediction and relevance mechanism 2010 of FIG. 20 according to one embodiment. For brevity, many of the details already discussed with reference to FIGS. 1-20 are not repeated or discussed hereafter. In one embodiment, prediction and relevance mechanism 2010 may include any number and type of components, such as (but not limited to): detection and selection logic 2101; computation and analysis logic 2103; construction and designation logic 2105; communication/compatibility logic 2107; encoding logic 2109.

As illustrated, in one embodiment, server device 2000 (also referred to as "server computer" or "construction device") on the capture-side or construction-side is in communication with another computing device 2150 (also referred to as "client computer" or "render device") on the render-side, where client device 2150 includes memory 2158 hosting prediction/relevance-based rendering mechanism ("rendering mechanism") 2160 having any number and type of components, such as (but not limited to): detection and reception logic 2161; decoding logic 2163; interpretation and prediction logic 2165; application and rendering logic 2167; and communication/display logic 2169. Client device 2150 further includes graphics processor 2154 and application processor 2152 in communication with memory 2158 to execute rendering mechanism 2160, where client device 2150 further includes user interface 2159, and I/O component(s) 2156 including one or more display devices or screens for displaying immersive media, such as 3DoF+ video, 6DoF video, etc.

It is contemplated that although server device 2000 and client device 2150 are shown as two separate devices in communication with each other over communication medium(s) 2025, embodiments are not limited as such. For example, in some embodiment, server device 2000 and client device 2150 may not be two separate devices and instead be a single device having all the functionalities and components of the two computing devices 2000, 2150.

Similarly, embodiments are not limited to merely one or two computing devices and that there may be three or more devices performing one or more of the functionalities, such as camera(s) A 2181, B 2183, C 2185, D 2187 may be regarded as separate devices or be hosted on one or more computing devices in communication with server device 2000 and/or client device 2150.

Server device 2000 is further shown to be in communication with one or more repositories, datasets, and/or databases, such as database(s) 2130 (e.g., cloud storage, non-cloud storage, etc.), where database(s) 2130 may reside at a local storage or a remote storage over communication medium(s) 2025, such as one or more networks (e.g., cloud network, proximity network, mobile network, intranet, Internet, etc.).

It is contemplated that a software application running at server device 2000 may be responsible for performing or facilitating performance of any number and type of tasks using one or more components (e.g., GPU 2014, graphics driver 2016, CPU 2012, etc.) of computing device 2000. When performing such tasks, as defined by the software application, one or more components, such as GPU 2014, graphics driver 2016, CPU 2012, etc., may communicate with each other to ensure accurate and timely processing and completion of those tasks.

Adaptive Resolution

Embodiments provide for a novel technique for adaptive resolution of point cloud based on 1) object metadata, such as edges of large bodies or high detailed areas (e.g., human fingers, faces, etc.); 2) object location in scene, such as camera distance, field of view, and focal point, etc., while adapting the fidelity of the point cloud to prioritize execution times for objects or regions of objects that have or are expected to have the greatest impact on user perception of quality.

In one embodiment, prediction and relevant mechanism 2010 may be used to conservatively predict a viewpoint updates for each frame such that an adaptive multi-frequency shader pass to determine which texture data to send as facilitated by computation and prediction logic 2103 and construction and designation logic 2105. Further, for example, foveated rendering techniques may be applied. In one embodiment, viewport/user prediction is performed on server side, as facilitated by computation and prediction logic 2103, so that only the relevant data is separated and designated for rendering, as facilitated by construction and designation logic 2105, and sent over to client device 2150 over communication medium 2025, as facilitated by communication/compatibility logic 2107, where the transmitted data is then prepared and rendered on the render side by client device 2150 a facilitated by one or more of interpretation and prediction logic 2165, application and rendering logic 2167, and communication/display logic 2169.

It is contemplated that latency could be an issue to consider if, for example, every frame data relies on viewport and thus having occasional updates on viewport from client device 2150 to server device 2000 with the first and second order derivatives may be used so that prediction and relevance mechanism 2010 at server device 2000 may conservatively predict the viewport at and for each frame. Further, for example, detection and selection logic 2101 and computation and prediction logic 2103 may be used to perform adaptive multi-frequency shading (AMFS) rendering pass to determine which texture data to send to client device 2150 for rending, where, for example, AMFS is facilitated by computation and prediction logic 2103 to compute the coarse tile conservatively, while sending only those tiles that suffice as designated by construction and designation logic 2105). Further, this may be based on pin-cushioned cylindrical compress periphery that can be computed to reduce even more data.

Further with reference to adaptive resolution of point cloud, in one embodiment, detection and selection logic 2101 may be used to detect a scene captured by one or more of cameras A 2181, B 2183, C 2185, and N 2187, where the scene includes objects, where detection and selection logic 2101 is further to detect and select any metadata pertinent to or associated with the objects, such as metadata relating to edges of large bodies or high-detailed areas, such as human fingers, faces, etc. Further, in one embodiment, detection and selection logic 2101 is further to detect object locations in the scene, such as in terms of distance from one or more cameras A 2181, B 2183, C 2185, D 2187.

In one embodiment, database(s) 2130 may be used to store and maintain raw footages of scenes captured by one or more of cameras 2181, 2183, 2185, 2187, where having thes raw footages at database(s) 2130 allows prediction and relevant mechanism 2010 and rendering mechanism 2160 to perform their tasks or operations (e.g., generation of 3D models), as described throughout this document, offline and/or on-demand. For example, any of the raw footages from database(s) 2130 may be accessed and obtained through detection and selection logic 2101 and/or detection and reception logic 2161 even when the networks and/or systems, such as server device 2000 and/or client device 2150, are down or offline. Similarly, such raw footages may be accessed and obtained on-demand, as desired or necessitated, without having to wait for live streaming or communication of camera footage.

Using computation and prediction logic 2103, the fidelity of the point cloud is adapted to prioritize the execution for objects and/or regions of objects that have the greatest impact, highest importance, or most visibility on user perception of quality. Upon such prediction, construction and designation logic 2105 may be used to classify the information based on low-fidelity and high-fidelity of objects and/or regions of objects such that the information may then be encoded by encoding logic 2109. The encoded information is then transmitted over to client device 250 for rendering purposes, where the transmission is done over network 2125, as facilitated by communication/compatibility logic 2107 and communication/display logic 2169.

At client device 2150, on render side, the encoded information is received through detection and reception logic 2161 and then decoded by decoding logic 2163 for further processing by interpretation and prediction logic 2165. In one embodiment, the decoded information is interpreted for low-fidelity and high-fidelity classification and since the encoded information received from server device 2000 includes only the relevant information, where all of the information is reconstructed in rendering version for rendering purposes as facilitated by interpretation and prediction logic 2165. The rendering version of the information is then rendered by application and rendering logic 2167 and displayed using one or more display devices as facilitated by communication/display logic 2169, wherein the rendered information includes immersive media, such as 3DoF+ video, 6DoF video, etc.

Figure 22:
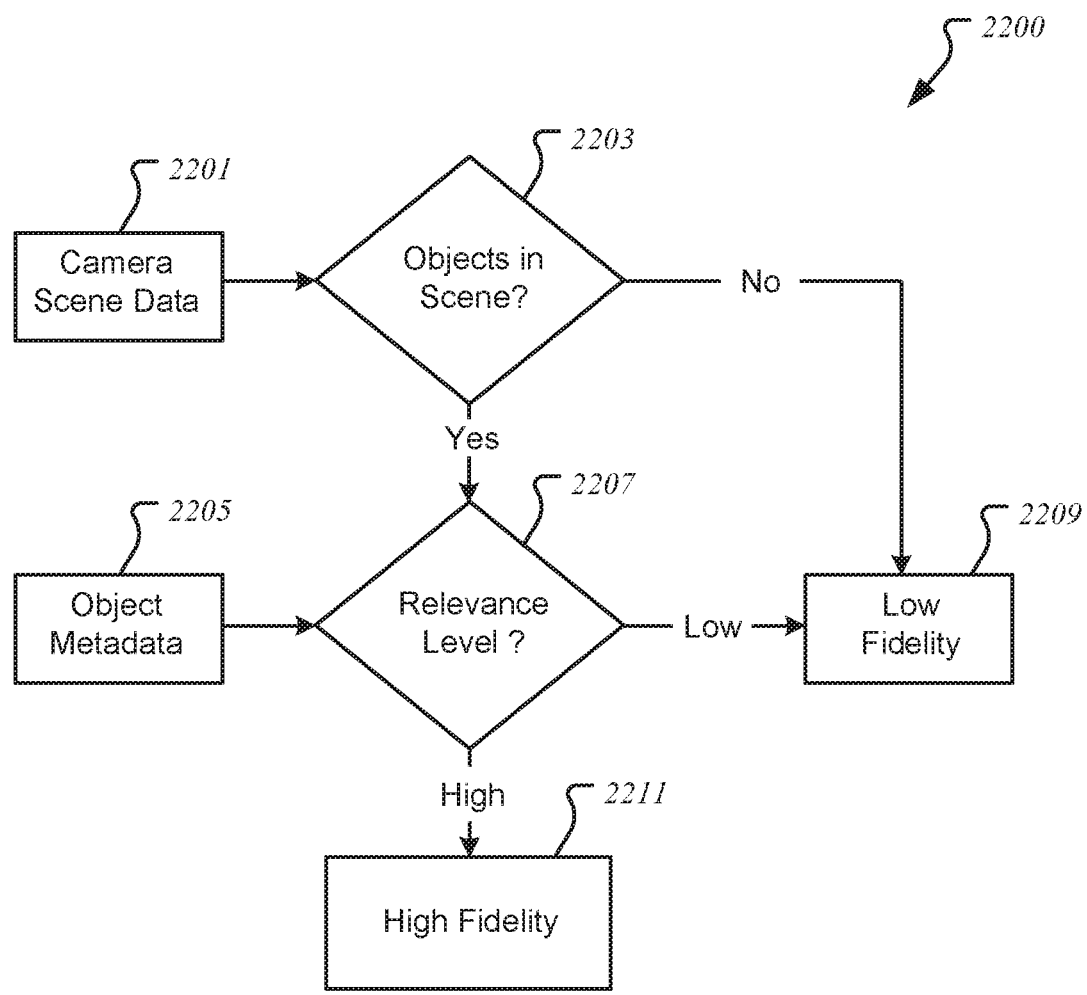
FIG. 22 illustrates a transaction sequence for adaptive resolution of point cloud according to one embodiment.

For example, referring to FIG. 22, it illustrates a transaction sequence 2200 for adaptive resolution of point cloud according to one embodiment. Any processes of transaction sequence 2200 may be performed by processing logic that may comprise hardware (e.g., circuitry, dedicated logic, programmable logic, etc.), software (such as instructions run on a processing device), or a combination thereof, as facilitated by prediction and relevance mechanism 2010 of FIG. 20 and rendering mechanism 2160 of FIG. 21. The processes associated with transaction sequence may be illustrated or recited in linear sequences for brevity and clarity in presentation; however, it is contemplated that any number of them can be performed in parallel, asynchronously, or in different orders.

As illustrated here in FIG. 22 and described above, any data captured through one or more cameras 2181, 2183 2187, 2189 may be referred to as camera feeds, corresponding to various cameras 2181, 2183, 2185, 2187, that include scenes that further include objects (e.g., living and/or non-living objects, such humans, human face, human hand, animals, plants, furniture, stars, mountains, cars, etc.). As illustrated in FIG. 22, transaction sequence 2200 starts with receiving camera scene data at 2201 and determining whether the camera scene data includes any objects at 2203 as detected by detection and selection logic 2101. If the absence of any objects, or at least any pertinent objects, in the scene, the scene is not regarded as having high relevance and thus transaction sequence 2200 continues with the scene and its contents being labeled and regarded as low fidelity at 2209.

If, however, objects are found in the scene, then, in one embodiment, at 2207, another determination is made as to whether the objects or any of the regions of the objects are of relevance, such as high relevant or low relevance, based on how likely or closely is the user to view one or more of the objects and/or one or more regions of the one or more objects as determined and analyzed by computation and prediction logic 2103. In one embodiment, this determination may be made based on object metadata at 2205, where object metadata may include any amount or type of information about the objects and/or their regions that can help determine the relevance of the objects and/or regions to the user, such as historical viewing patterns, known importance, distance from one or more cameras 2181, 2183, 2185, 2187, objects/regions in focus or out of focus in the view, objects/regions are peripheral or central in the view, etc., as facilitated by computation and prediction logic 2103.

In one embodiment, based on the metadata analysis, if one or more of the objects and/or regions are regarded as that of low relevance or importance, they are then labeled as low fidelity at 2209 as facilitated by construction and designation logic 2105. In contrast, if the objects and/or regions are regarded as that of high relevance or importance, they are then labeled as high fidelity at 2211 as facilitated by construction and designation logic 2105. Once the fidelity level is determined, prediction information relating to objects and/or regions with respect to the fidelity levels, such as low fidelity or high fidelity, is then encoded by an encoder as facilitated by encoding logic 2109 and communicated over to client device 2150, as facilitated by communication/compatibility logic 2107.

In one embodiment, fidelity predictions are then received by detection and reception logic 2161 at client device 2150, decoded by a decoder as facilitated by decoding logic 2163, and then interpreted by interpretation and prediction logic 2165. The interpreted data may then be prepared for rendering as facilitated by application and rendering logic 2167 and subsequently rendered and displayed at a display device or screen, such as that of a wearable device, such as an HMD, or a mobile device display screen, desktop monitor, etc., as facilitated by communication/display logic 2169.

Although in this embodiment, fidelity prediction is performed on the server side, such as through computation and prediction logic 2103 based on extraction and evaluation of object metadata, etc., it is contemplated and to be noted that embodiments are not limited as such that in some embodiments, fidelity prediction may be performed on the client side, such as through interpretation and prediction logic 2165 based on observation and evaluation of user and/or display movements, such as movement of HMD with respect to the user and/or objects in the environment, etc.

Further, as described with reference to this embodiment and other embodiments, the various components of prediction and relevance mechanism 2010 and rendering mechanism 2160 are not fixed in terms of their processes or locations, such as one or more of their components may be used for a different process or located elsewhere, such as on either or both of server device 2000 and client device 2150.

Prior to further discussion, it is contemplated and to be noted that embodiments, both discussed above and below, are not limited to only those objects or views in scenes that are fully visible. For example, in cases when certain objects may occlude parts of a constructed model (such as virtual objects a virtual tree occluding a viewpoint), prediction and relevant mechanism 2010 and/or rendering mechanism 2160 may be used to predict the occluded portions using any number of techniques, such as raw data or metadata from database(s) 2130, artificial intelligence through machine/deep-learning models, etc.

Similarly, it is contemplated and to be noted that although for brevity and clarity, the use of head pose based on head positions and movements, etc., is discussed throughout the document, embodiments are not limited as such. For example, in 6DoF view, predictions based on physical displacements of a person, such as the user, in real world may also be used and not just the pitch, yaw, and roll metrics of the user's head. In other words, for example, any relevant portion of the immersive media that is being predicted and used for rendering and displaying is not simply based on head poses but may also be based on other relevant factors, such as a person/user's physical displacement in real world. For example, based on the user's known or determined physical displacements with respect to the real world, future physical displacements or information may be calculated and predicted and subsequently used in selection of the relevant portions of immersive media to be rendered and displayed as facilitated by prediction and relevant mechanism 2010 and/or rendering mechanism 2160.

Viewport and/or User-Prediction

Embodiments further provide for a novel technique for viewport and/or user prediction on construction or server side at server device 2000 to transmit only the relevant data to the user on the render side using client device 2150. In one embodiment, predicting head motion and/or other physical motions are used to estimate subsequent frames in steaming of video frames. This novel technique can be performed by, in one embodiment, using motion vectors in 6DoF, sending motion vectors to server computer 2000 to estimate the next frame, and computing the next frame instant only a portion of entire 6DoF content.

As discussed about, conventional techniques fail to consider user's perspective and the content's relevance when streaming contents and thus all contents, such as entire cloud information including objects and/or scenes, are streamed to the user on the render side, which leads to inefficiencies and waste of resources, such as system and network bandwidth, time, etc.

Referring to one embodiment of viewport and/or user prediction on server device 2000 to send only the relevant data to client device 2150 for rendering purposes may include processing of all immersive media (e.g., 3DoF+ video, 6DoF video, etc.) on server side using server device 2000, while sending and rendering of only the relevant immersive media on the render side using client computer 2150. For example, the relevant media may be rendered using an HMD, display screens, etc., to provide for an enhanced viewing experience from the users. For example, the immersive media, such as a 6DoF video, may be a gaming video that is rendered or displayed on an HMD for the user to experience through viewing and playing.

As previously mentioned, current 180/360-degree videos as well as point clouds for immersive media content requires high bandwidth to transmit the entire scene over the network to the client/consumer from the server. Since, at any given instance, a user is viewing only a part of the scene and the remaining scene remains unviewed, sending and rendering of all data, without consideration for its relevance, can result in a network/bandwidth overhead.

Embodiments provide for transmitting the point cloud by sending only the preferred or relevant or required or slightly more than required scene to the user at client device 2150 and save on a significant amount of network and bandwidth overhead. This novel technique provides for reduction in bandwidth that is typically needed to transmit immersive media contents to the consumer by, in one embodiment, estimating or predicting the viewport for a subsequent frame that the user is expected or likely to look at and transmitting only the required portion of the scene. As mentioned above, this prediction of the viewport could be done either on the server side or the client side, such as using computation and prediction logic 2103 or interpretation and prediction logic 2165, respectively.

For example, if the prediction is performed on the client side, as facilitated by interpretation and prediction logic 2165, any metadata for the predicted viewport is sent to server device 2000 to compute the relevant data to be transmitted for that viewport as facilitated by computation and prediction logic 2103. Further, any additional data beyond the viewport may be transmitted in lower resolution or can be skipped altogether to save the bandwidth. For example, to reduce the delay of sending the predicted viewport from client device 2150 to server device 2000, the predicted viewport may be computed by computation and prediction logic 2103 on the service side as client device 2150 sends relevant head position info for previous frames as computed and interpreted by interpretation and prediction logic 2165. On the server side, in one embodiment, head position prediction may be performed, by computation and prediction logic 2103, based on first and second order derivative lazily updated from client device 2150 to server device 2000, such as periodically, but not necessarily every frame. For example, previous head positions may be used to calculate the viewport and in subsequent frames that predicted viewport/head position can be corrected if the calculated head position differs from the actual one.

Client-Side Viewport and/or User-Prediction

For example, as illustrated with reference to FIG. 23A, viewport prediction may be performed on the client side, such as one or more server devices 2301 (e.g., server device 2000 of FIG. 20) may be in communication with a wearable device/display 2303 (e.g., HMD, display at client device 2150), over communication medium 2125 (e.g., cloud network, Internet, etc.). As previously mentioned, in conventional techniques, full 360 videos for initial frames are transmitted between server and client computers. For brevity, many of the details previously discussed with reference to FIGS. 1-22 may not be discussed or repeated hereafter.

In the illustrated, transaction sequence 2300 of client-based viewport prediction, the initial frames of the entire 360-degree scene or the entire point cloud are encoded and sent at 2311 from the server side to the client side, where the initial frames are decoded at 2315, as facilitated by decoding logic 2163, and the decoded information is then used to detect and record current user head position for each frame of the initial frames obtained from the decoded information as facilitated by detection and reception logic 2161. This head position along with the previous frame head position are then used to predict future positions and based on the head position, viewport is predicted at 2317 as facilitated by interpretation and prediction logic 2165. In one embodiment, at 2319, this viewport prediction is then transmitted over to the server side as viewport prediction feedback as facilitated by communication/display logic 2169.

At this point, one or more server devices 2301 process this feedback received from the client side, as facilitated by computation and prediction logic 2103, and then, at 2313, send only the relevant data for the specific predicted viewport from the server side to the client side for further processing, such as rendering of specific immersive media (e.g., 3DoF+ video, 6DoF video, etc.) using one or more display devices, such as wearable device/display 2303, as facilitated by application and rendering logic 2167. It is contemplated that a user and/or broadcaster may choose to send slightly larger data than the predicted viewport and similarly, to conserve additional bandwidth, any data outside the viewport may either be sent in low resolution or need not be sent at all.

Server-Side Viewport and/or User-Prediction

Figure 23A:
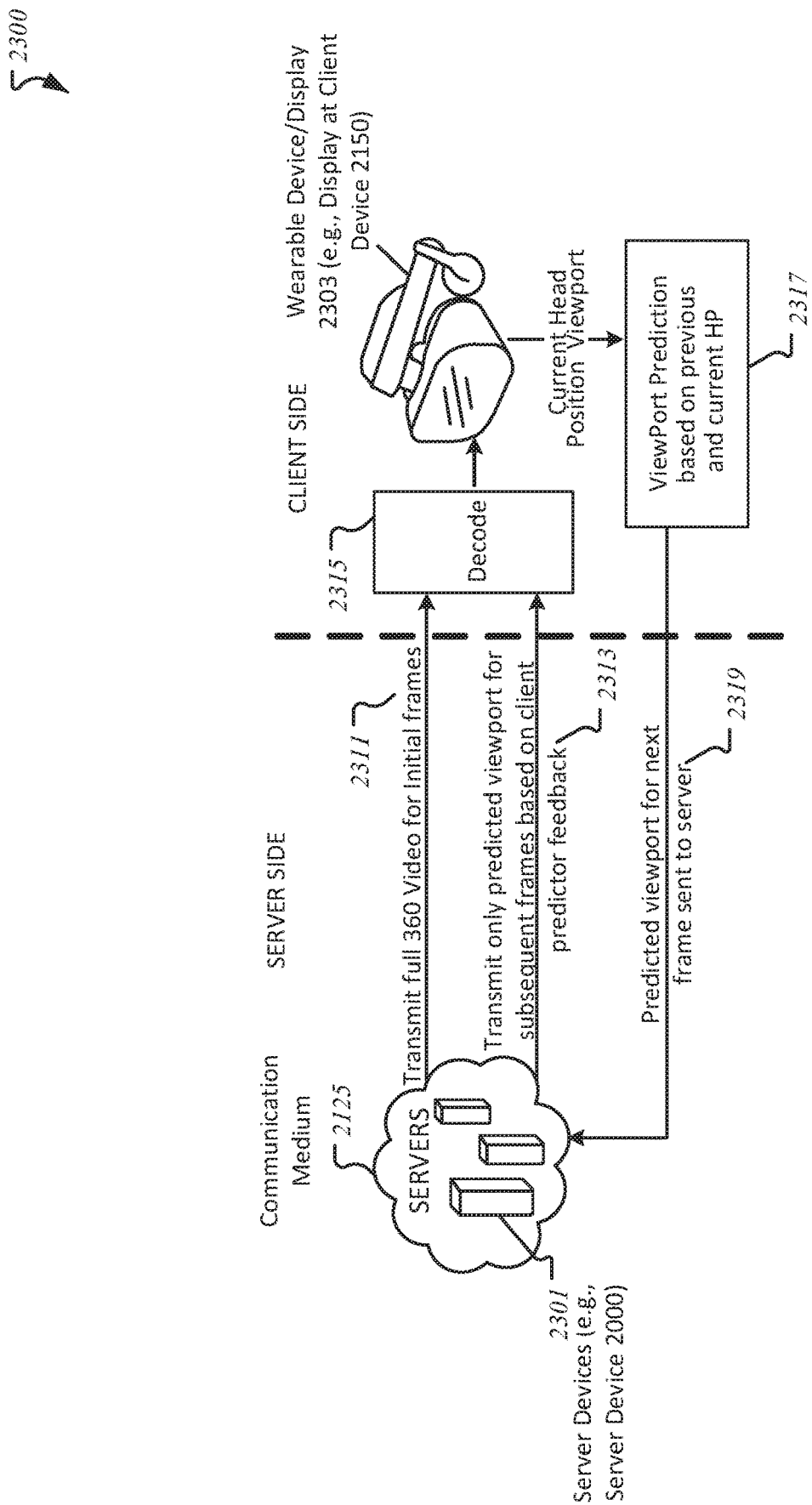
FIG. 23A illustrates a transaction sequence for performing client-side viewport prediction.
Figure 23B:
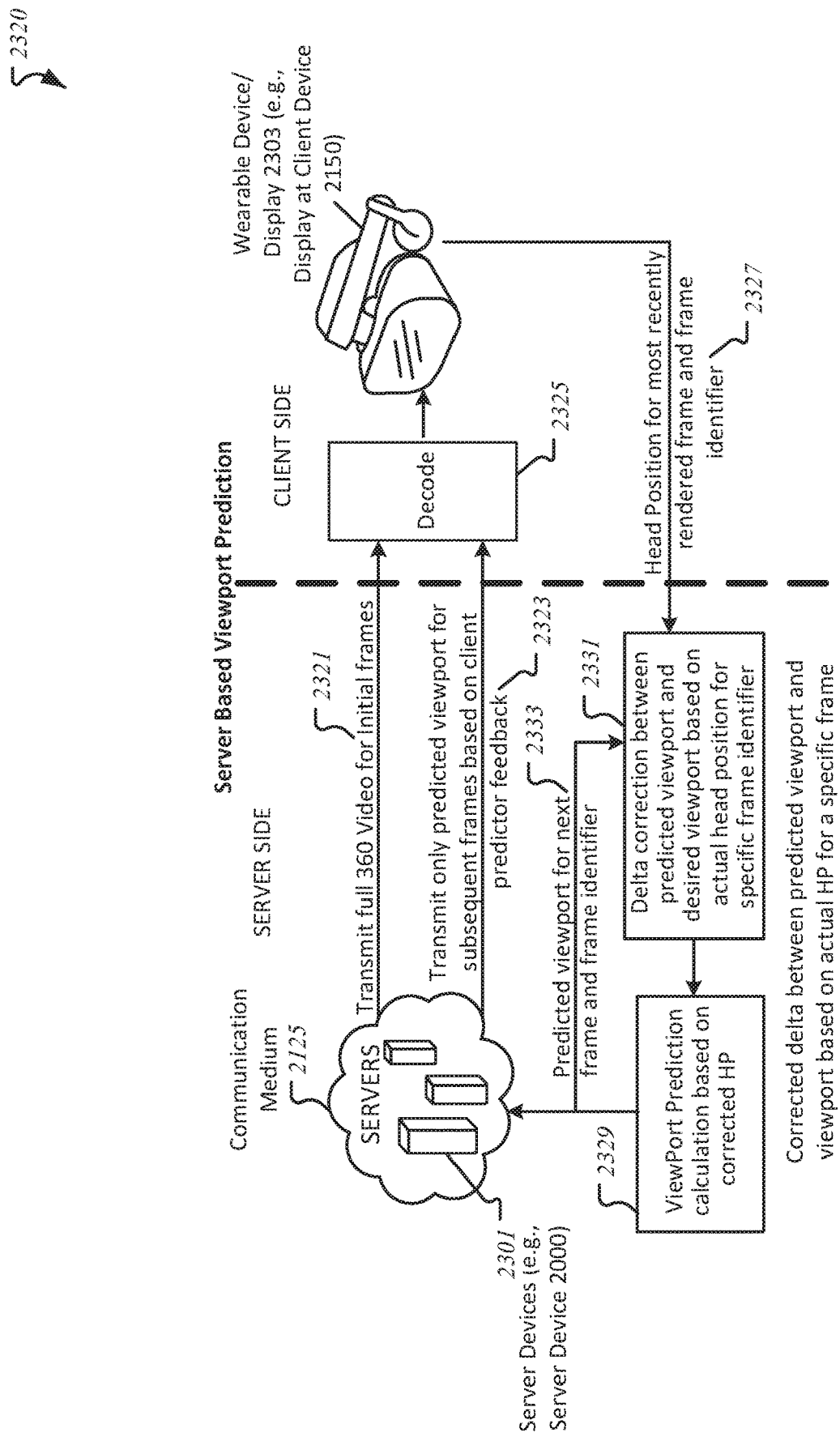
FIG. 23B illustrates a transaction sequence for performing server-side viewport prediction.

For example, now referring to FIG. 23B, it illustrates server side-based viewport prediction that is then sent over to the client side for rendering. For brevity, many of the details previously discussed with reference to FIGS. 1-23A may not be discussed or repeated hereafter. For example, transaction sequence 320 of FIG. 23B, in server-based viewport prediction system, the initial frames may include the entire 360-degree scene or the entire point cloud and, at 2321, these initial frames may be communicated over from the server side to the client side as facilitated by communication/compatibility logic 2107. In one embodiment, the current user head positions may be recorded for most-recently rendered frames along with their frame identifiers on the client side, as facilitated by interpretation and prediction logic 2165, and sent over to the server side at 2327 as facilitated by communication/display logic 2169.

On the server side, detection and selection logic 2101 receives the current head positions and the frame identifiers and subsequently, computation and prediction logic 2103 may be triggered to predict a viewport based on the deviation of each head position from a previous frame to the current frame using their frame identifiers at 2333. For example, this process may be based on viewport prediction calculation based on corrected head position at 2329, as facilitated by computation and prediction logic 2103, and delta correction between predicted viewport and desired viewport based on the actual head position for specific frame identifier at 2331, such as correcting delta between the predicted viewport and the viewport based on actual head position for a specific frame, as facilitated by computation and prediction logic 2103.

Once the prediction data is gathered and corrected, as necessary or desired, construction and designation logic 2105 is then triggered to classify and designate that prediction data as predicted viewport, while only this predicted viewport for subsequent frames based on client predictor feedback received from the client side is then transmitted, at 2323, from the server side to the client side as facilitated by communication/compatibility logic 2107 and over communication medium(s) 2125. In one embodiment, this predicted viewport is encoded by one or more encoders at the server side as facilitated by encoding logic 2109 and when received at the client side, the encoded predicted viewport is then decoded, at 2325, by one or more decoders as facilitated by decoding logic 2163.

Based on this short-term head position data, computation and prediction logic 2103 may continue to predict viewports, at 2333, and communication/compatibility logic 2107 may continue to send, at 2323, the predicted viewports, including only the relevant and/or necessary data, to the client side for rendering purposes, and while doing so, the server saves the viewport/predicted head positions along with the frame identifiers.

In one embodiment, once the head position feedback from the client side is received, at 2327, at the server side for a specific frame identifier, computation and prediction logic 2103 compares and calculates the delta between its predicted value and the actual expected value. If there is a delta or difference between the future prediction of a head position, then a corresponding viewport is updated by compensating for the delta value. Once the delta is minimal specific viewport, data can then be sent, at 2323, to the client side, which saves bandwidth by sending only the relevant and/or necessary data and not the entire content. In other words, server-based prediction ensures that a server device, such as server device 2000, need not rely on the feedback from a client device, such as client device 2150, for every single frame and may correct its prediction based on the feedback received from client device 2150.

In one embodiment, whether the predicted viewport be based on the server side or the client side, construction and designation logic 2105 at server device 2000 may be used to construct or recreate a texture by picking the right patches of a corresponding object based on one or more of texel space shading (TSS) technique, AMFS technique, etc. This novel technique identifies the exact texture blocks needed by application and rendering logic 2167 at client device 2150 to reconstruct a complete view of the object. Further, using computation and prediction logic 2103, this viewport may be computed conservatively (such as with guardband) and/or any texel blocks may be computed conservatively on, for example, 128B blocks or even larger, etc.).

Figure 23C:
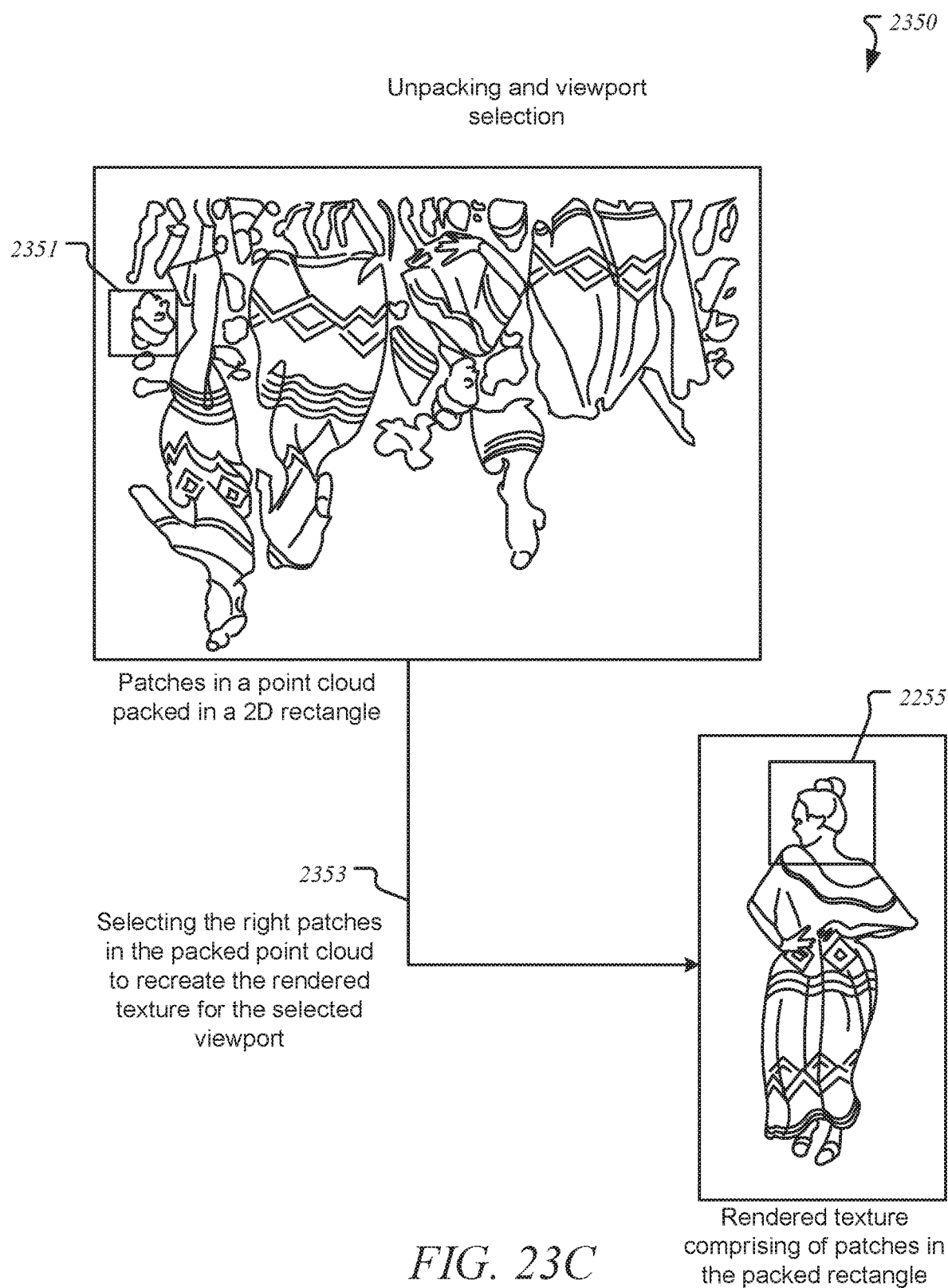
FIG. 23C illustrates a transaction sequence for unpacking and viewport selection.

This sparse texture may then be prepared by construction and designation logic 2105, encoded by encoding logic 2109, and then sent to client device 2150 by communication/compatibility logic 217 as opposed to sending the entire point cloud. Further, this sparse texture may be compressed using one or more compression techniques to populate the correct texture blocks at client device 2150. Further, AMFS may be used to choose the correct level of detail (LOD) for a given position (u,v) in object space so to further help reduce the bandwidth as illustrated with respect to transaction sequence 2350 for unpacking and viewport selection as shown in FIG. 23C. As illustrated with reference to FIG. 23C, patches in point cloud are packed in a 2D rectangle at 2351 and then, at 2353, the right patches are selected in the packed point cloud to recreate the rendered texture for the selected viewport. Finally, at 2355, the texture comprising of patches is rendered in the packed rectangle.

Any processes of FIGS. 23A, 23B and 23C may be performed by processing logic that may comprise hardware (e.g., circuitry, dedicated logic, programmable logic, etc.), software (such as instructions run on a processing device), or a combination thereof, as facilitated by prediction and relevance mechanism 2010 of FIG. 20 and rendering mechanism 2160 of FIG. 21. The processes associated with transaction sequence may be illustrated or recited in linear sequences for brevity and clarity in presentation; however, it is contemplated that any number of them can be performed in parallel, asynchronously, or in different orders.

Viewport-Dependent Immersive Video Streaming

Embodiments further provide for a novel technique for viewport-dependent 6DoF video streaming. For example, as described above, a user's head pose information and/or physical displacement information may be obtained through detection and reception logic 2161 at client device 2150 and communicated over to server device 2000, where the head pose information and/or physical displacement information is analyzed by computation and prediction logic 2103 and the results are then used to obtain relevant information, such as only the information that is relevant from the user's perspective, as facilitated by construction and designation logic 2105. The analysis by computation and prediction logic 2103 may include reviewing video quality and throughput, frame-grabbing to determine which portion of the content is being streamed, etc.

This pertinent viewport-dependent video is then encoded through encoding logic 2109 and communicated, as facilitated by communication/compatibility logic 2107, over to client device 2150 over communication medium 2125. This novel technique for sending only the relevant information based on the user's perspective allows for efficient streaming of immersive media that reduces the use of bandwidth, while achieving highest possible fidelity content, based on throughput restrictions, for rendering purposes at client device 2150.

Video-Based Approach to Immersive Media User Viewports

Figure 24A:
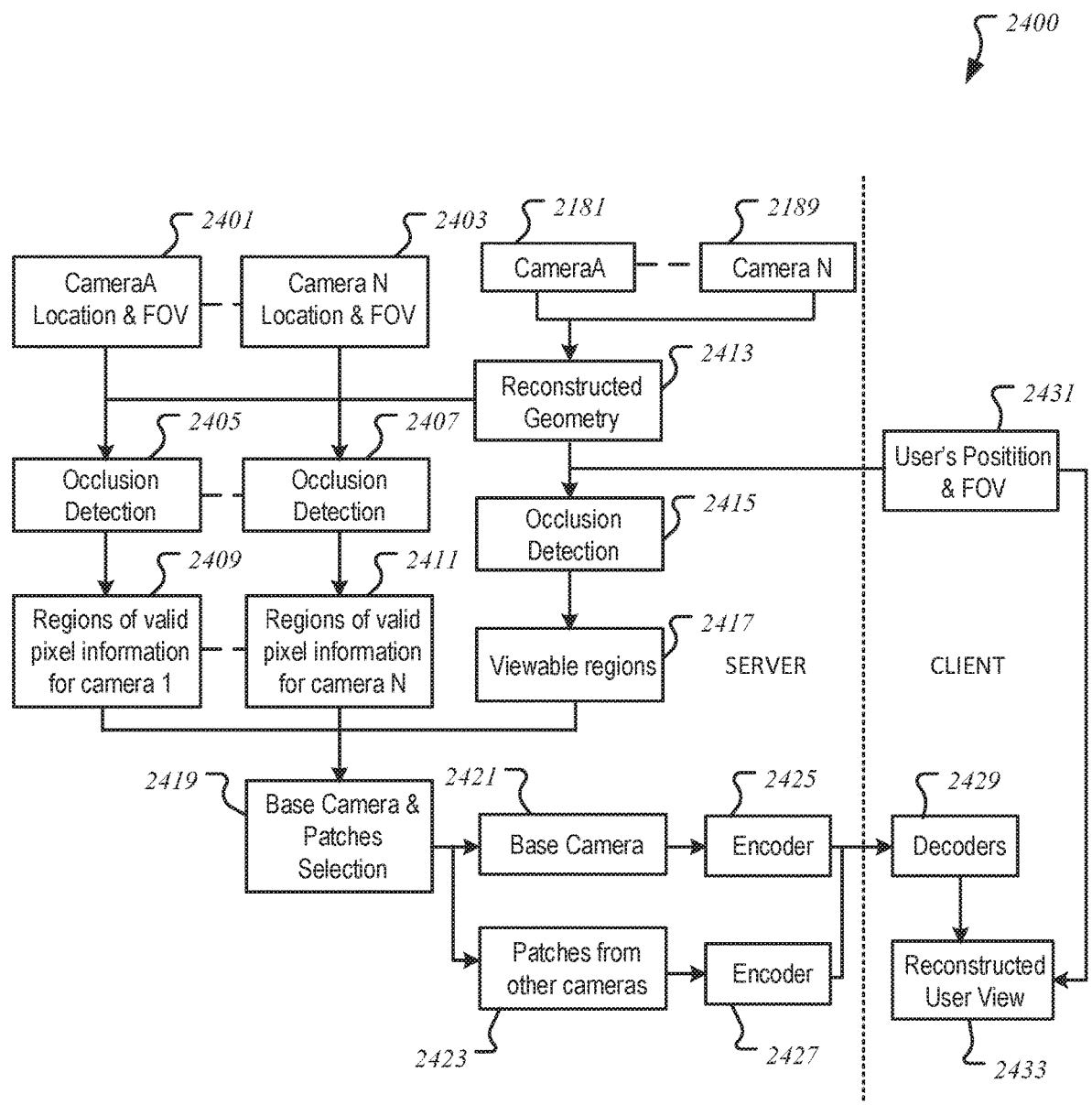
FIG. 24A illustrates a transaction sequence for video-based approach to immersive media user viewports according to one embodiment.

For example, now referring to FIG. 24A, it illustrates video-based approach to immersive media (e.g., 3DoF+ video, 6DoF video) user viewports according to one embodiment. For brevity, many of the details previously discussed with reference to FIGS. 1-23C may not be discussed or repeated hereafter. As illustrated in FIG. 24A, one or more cameras, such as the illustrated camera A 2181, camera N 2189 may be used to capture a scene of objects, where these camera feeds of the scene may be used to reconstruct geometry of the captured scenes and the corresponding position or location and field of view (FOV) 2401, 2403 at blocks 2401, 2403, respectively. This reconstructed geometry may be achieved using one or more occlusion detection techniques at blocks 2405, 2407 for the camera fees obtained from the corresponding cameras A 2181, N 2189, respectively, as facilitated by computation and prediction logic 2103.

Further, mappings of 3D regions are created for each camera 2181, 2189 using the valid pixel information associated the corresponding cameras 2181, 2189 (as opposed to where the cameras' views are occluded) at blocks 2409, 2411, respectively. Similarly, occlusion detection techniques are used at block 2415 and user viewable objects or regions of the objects are created at block 2417. Further, in one embodiment, any information relating to or including the user's FOV and position with respect to cameras 2181, 2189 is sent from the client side, such as from client device 2150, to the server side, such as server device 2000, at block 2431.

In one embodiment, base camera and patches are selected at block 2419, where a base camera of cameras 2181, 2189 is selected at block 2421 for matching up to be closest to the user's position and/or direction or, in another embodiment, the base camera is selected for having the highest matches in terms of overlapping area volume with the user's viewable region from block 2417. Further, in one embodiment, patches from other cameras of cameras 2181, 2189 are selected at block 2423, where other cameras' patches are selected to fill in the rest of the user viewable regions of block 2417 as facilitated by construction and designation logic 2105. This addition of patches may continue until a maximum number of camera views is reached for a threshold for amount of coverage of the user's area is reached.

Further, a practical matching approach using video encoders may be used by having multiple independent scanlines or independent tiles encoded so that a mix and match of patches may be performed to form a new stream for encoding through encoders at blocks 2425, 2427 as facilitated by encoding logic 2109. This technique may be used to facilitate a 1:N encoding to users process by having an encoded stream that can be formed from different lines or tiles instead of entirely different streams per user.

After communicating the encoded data from the server side, such as server device 2000, to the client side, such as client device 2150, the information is then received and decoded using decoders at block 2429 as facilitated by decoding logic 2163. In one embodiment, a view for the user may then be created at block 2433 using the decoded information and the existing view interpolation for the user's current positions and FOVs from block 2431 as facilitated by interpretation and prediction logic 2165. This view may then be rendered to the user as facilitated by application and rendering logic 2167 and display using a display screen.

Figure 24B:
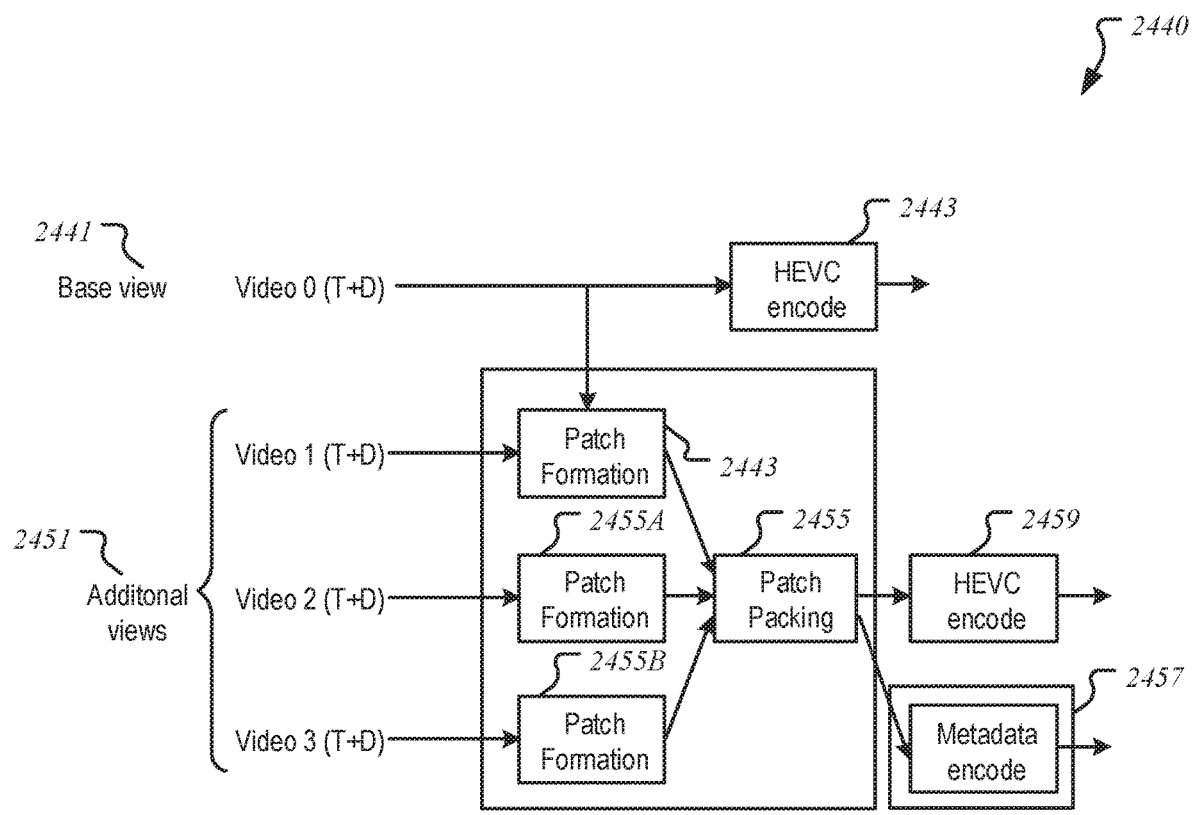
FIG. 24B illustrates an encoding system for video-based approach to immersive media user viewports according to one embodiment.

Referring now to FIG. 24B, it illustrates an encoding system 2440 for video-based approach to immersive media (e.g., 3DoF+ video, 6DoF video) user viewports according to one embodiment. For brevity, many of the details previously discussed with reference to FIGS. 1-24A may not be discussed or repeated hereafter. As illustrated, this encoding system 2440 is equipped to received base view 2441 from base camera resulting in HEVC encode 2443. In one embodiment, additional view 2441 of videos (e.g., 3DoF+ videos) are also received, but put through a patch packing process, where patch information 2453A, 2453B, 2453B corresponding to the videos providing additional views 2441 is used to patch process the videos and combining them into patch packing 2455. In the patch packing 2455 then provides not only the HEVC encode 2459 (similar or identical to HEVC encode 2443) but also the corresponding metadata encode 2457 (driven from patch information 2453A, 2453, 2453B.

Figure 24C:
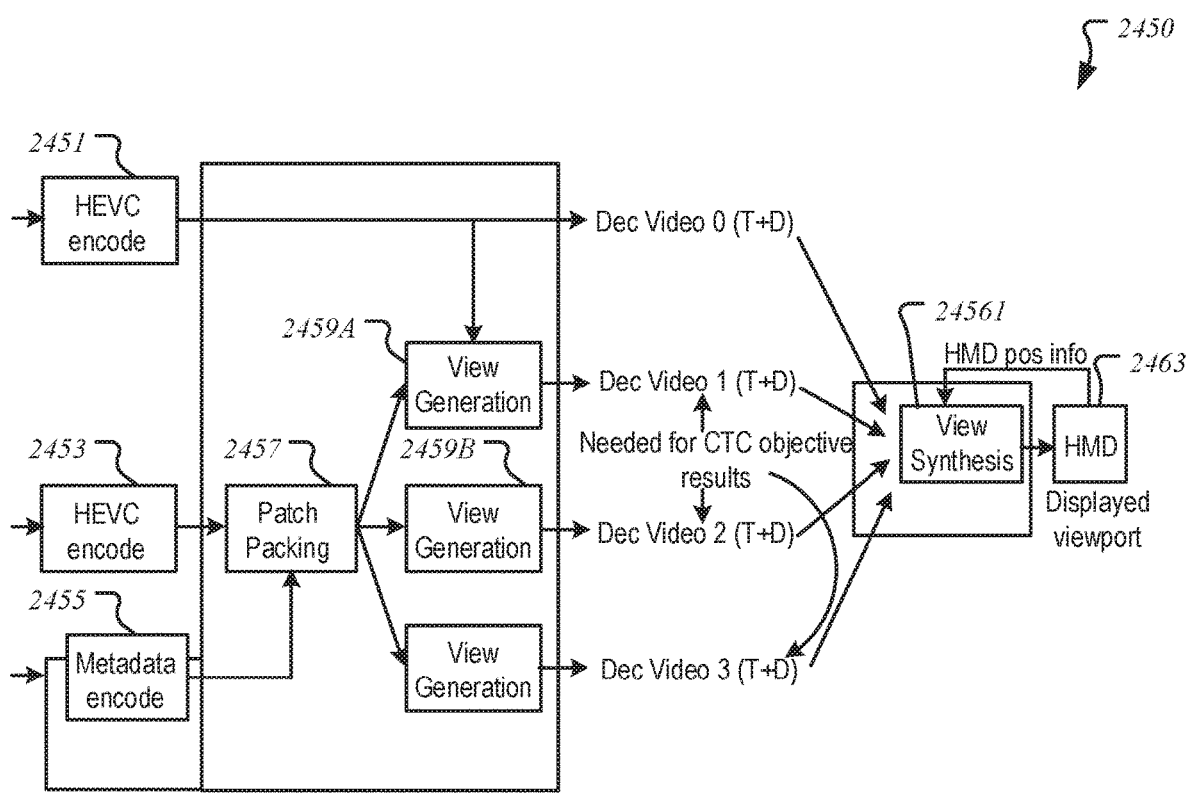
FIG. 24C illustrated a decoding system for video-based approach to immersive media user viewports according to one embodiment.

Referring now to FIG. 24C, it illustrates a decoding system 2450 for video-based approach to immersive media (e.g., 3DoF+ video, 6DoF video) user viewports according to one embodiment. For brevity, many of the details previously discussed with reference to FIGS. 1-24B may not be discussed or repeated hereafter. As illustrated, this decoding system 2450 provides for decoding of incoming decoded information, such as HEVC encode 2443, HEVC encode 2459, and metadata encode 2457 of FIG. 24B are set to be decoded as HEVC decode 2451, HEVC decode 2453, and metadata decode 2455, respectively. In one embodiment, any information associated with or obtained through HEVC decode 2453 and metadata decode 2455 is then set for patch unpacking 2457 resulting in view generations 2459A, 2459B, and 2459C corresponding to and based on the videos of FIG. 24B. These view generations 2459A, 2459B, and 2459C are the put through view synthesis 2461, where the output viewport of view synthesis 261 is then rendered and displayed at a display device, such as HMD 2463.

Any processes of FIGS. 24A, 24B and 24C may be performed by processing logic that may comprise hardware (e.g., circuitry, dedicated logic, programmable logic, etc.), software (such as instructions run on a processing device), or a combination thereof, as facilitated by prediction and relevance mechanism 2010 of FIG. 20 and rendering mechanism 2160 of FIG. 21. The processes associated with transaction sequence may be illustrated or recited in linear sequences for brevity and clarity in presentation; however, it is contemplated that any number of them can be performed in parallel, asynchronously, or in different orders.

Point Cloud-Based Approach to Immersive Media User Viewports

Figure 25:
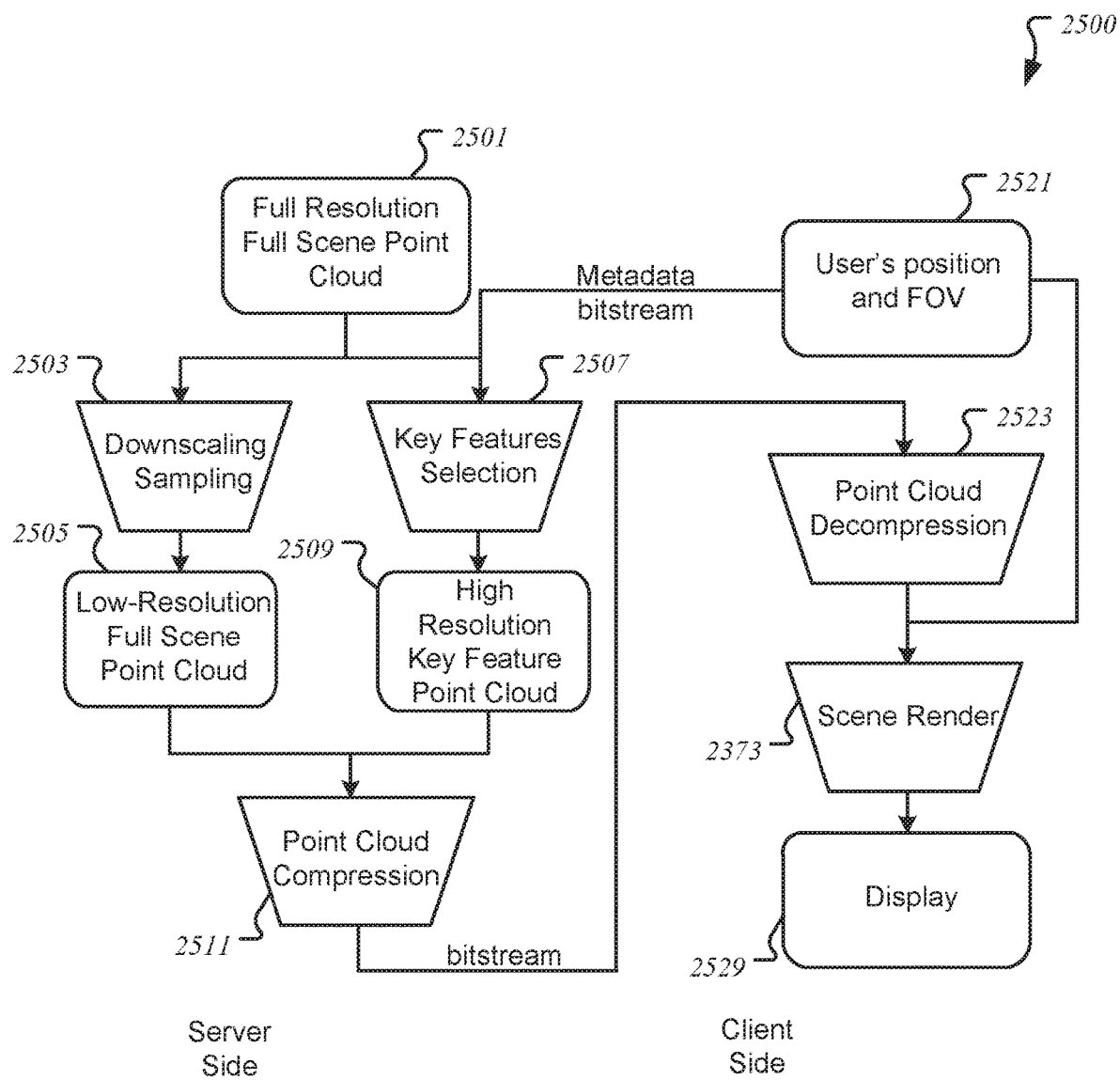
FIG. 25 illustrates a transaction sequence for point cloud-based approach to immersive media user viewports according to one embodiment.

Now referring to FIG. 25, it illustrates a transaction sequence 2500 for point cloud-based approach to immersive media (e.g., 3DoF+ video, 6DoF video) user viewports according to one embodiment. For brevity, many of the details previously discussed with reference to FIGS. 1-24C may not be discussed or repeated hereafter. Any processes relating to transaction sequence 2500 may be performed by processing logic that may comprise hardware (e.g., circuitry, dedicated logic, programmable logic, etc.), software (such as instructions run on a processing device), or a combination thereof, as facilitated by prediction and relevance mechanism 2010 of FIG. 20 and rendering mechanism 2160 of FIG. 21. The processes associated with transaction sequence may be illustrated or recited in linear sequences for brevity and clarity in presentation; however, it is contemplated that any number of them can be performed in parallel, asynchronously, or in different orders.

In the illustrated embodiment, user's position and FOV are generated or obtained at block 2521 on the client side using one or more client devices, such as client device 2150, where this position and FOV (FOV limits, occlusion detection, etc.) are based on what the user can see on or through a display device, such as a display screen, HMD, etc. Embodiments also provide for novel technique to consider those areas or regions that may be occluded for one reason or another, such as virtual objects occluding parts of a constructed model, which may then be covered or detected through occlusion detection techniques as facilitated by detection and selection logic 2101 and/or detection and reception logic 2161 of FIG. 21. In one embodiment, some of the features used for collection of user's position and FOV include one or more of distance of objects from cameras (e.g., closer objects need full details), objects in the center of the FOV, pre-defined objects of interest (e.g., people, important objects as opposed to simply background objects, etc.), more details around edges of objects or where a higher resolution is desired (e.g., person's face), and/or the like.

This position and FOV associated with the user are converted into a metadata bitstream and transmitted over to a server device, such as server device 2000, over a network, such as a cloud network, the Internet, etc. On the server side, point cloud-based full resolution full scene is received at block 2501, along with receiving of the metadata bitstream from the client side. In one embodiment, the bitstream is then used with the contents of the scene to provide for downscaling/sampling at block 2503 and key features selection at block 2507, where downscaling/sampling at block 2503 and key feature selection at block 2507 lead to low-resolution full scene point cloud at block 2505 and high-resolution key feature point cloud at block 2509, respectively.

At block 2511, point cloud information including low-resolution full screen point cloud 2505 and high-resolution key features at block 2509 is then compressed at block 2511. This point cloud compressed information is then communicated back to the client side where point cloud decompression is performed at block 2423. In one embodiment, data sets from point cloud decompression at block 2523 and user position and FOV of block 2521 are used obtain a scene that is rendered at block 2527 and displayed at a display device at block 2529.

It is contemplated that embodiments are not limited to simply low-resolution and high-resolution, but that any number of varying levels of point cloud resolution based on feature importance may be used. Similarly, varying levels of point cloud compression (such as lossy compression) may be used for different feature interest levels.

Viewport-Dependent Immersive Video Streaming

Figure 26:
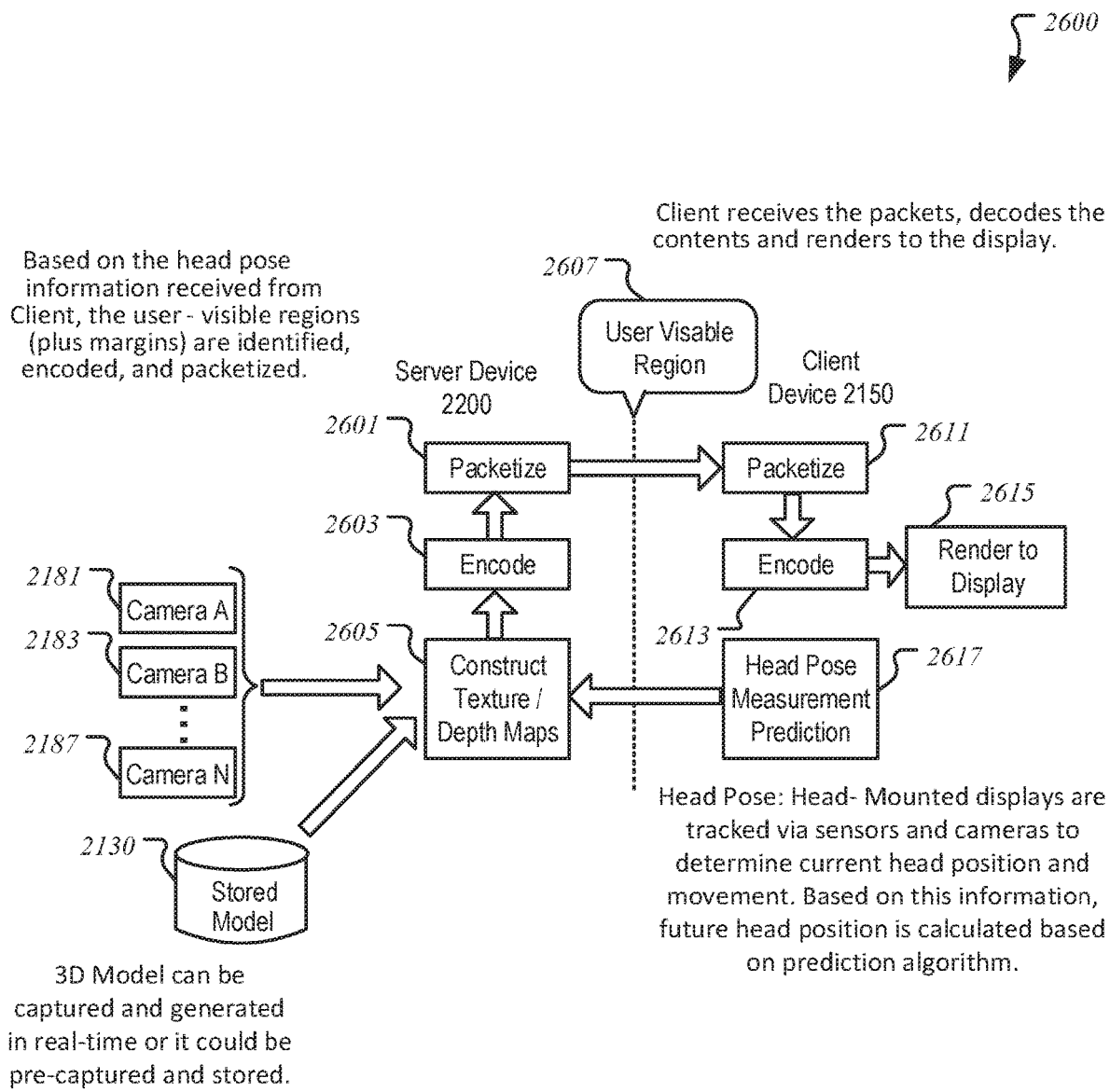
FIG. 26 illustrates system for viewport-dependent immersive media streaming according to one embodiment.

Referring now to FIG. 26A, it illustrates system 2600 for viewport-dependent immersive media (e.g., 3DoF+ video, 6DoF video, etc.) streaming according to one embodiment. For brevity, many of the details previously discussed with reference to FIGS. 1-25 may not be discussed or repeated hereafter. Any processes relating to system 2600 may be performed by processing logic that may comprise hardware (e.g., circuitry, dedicated logic, programmable logic, etc.), software (such as instructions run on a processing device), or a combination thereof, as facilitated by construction pipeline mechanism 2010 of FIG. 20 and render pipeline mechanism 2160 of FIG. 21. The processes associated with transaction sequence may be illustrated or recited in linear sequences for brevity and clarity in presentation; however, it is contemplated that any number of them can be performed in parallel, asynchronously, or in different orders As illustrated, this embodiment of system 2600 for viewport-dependent video streaming includes server or construction device 2000 and client or render device 2150, where server device 2000 receives head pose measurement and prediction (and/or user's physical displacement measurement and prediction with respect to real world) 2617 from client device 2150. In one embodiment, head pose measurement and prediction (and/or physical displacement measurement and prediction) may be computed at client device 2150 (e.g., HMD) through tracking of HMD using sensors, cameras, etc., of I/O components 2156 and as facilitated by detection and reception logic 2161. Based on this collected information, future head positions (and/or physical displacements) are calculated as facilitated by interpretation and prediction logic 2165. Upon receiving head pose measurement and prediction (and/or physical displacement measurement and prediction) 2617, texture and/or depth maps 2605 are computed, as facilitated by computation and analysis logic 2103, for videos captured by one or more of camera A 2181, camera B 2183, camera N 2187, etc. Further, texture and/or depth maps 2605 may be based on a 3D model of videos that is generated in real-time or pre-generated and stored at database 2130.

In one embodiment, based on head pose measurement and prediction (and/or physical displacement measurement and prediction) 2167, the user-visible regions (and, for example, margins) are identified by computation and analysis logic 2103 and then encoded by encoding logic 2109 and packetized by construction and designation logic 2105. Further, in one embodiment, packets including only user-visible regions 2607 are sent to client device 2150, which reduces the consumption of resources, such as bandwidth, computational resources, power, time, etc. As previously discussed, it is contemplated and to be noted that embodiments are merely limited to head pose measurement and prediction, but that the user's physical displacement with respect to the real world may also be tracked, analyzed, considered, and used to obtain and render relevant portions of immersive media.

Client device 2150 receives and depacketizes 2611 the packets, as facilitated by detection and reception logic 2161 and interpretation and prediction logic 2165, respectively, and decodes 2613 them, as facilitated by decoding logic 2163, and then renders 2615 the decoded information to a display device, as facilitated by application and rendering logic 2167, for viewing by the user.

Referring back to FIG. 21, communication/compatibility logic 2107 may be used to facilitate the needed communication and compatibility between any number of devices of server device 2000 and various components of prediction and relevant mechanism 2010. Similarly, communication/display logic 2169 may be used to facilitated communication and compatibility between the various components of client device 2150 and rendering mechanism 2160.

Communication/compatibility logic 2107 may be used to facilitate dynamic communication and compatibility between server device 2000 and any number and type of other computing devices (such as mobile computing device, desktop computer, server computing device, etc.); processing devices or components (such as CPUs, GPUs, etc.); capturing/sensing/detecting devices (such as capturing/sensing components including cameras, depth sensing cameras, camera sensors, red green blue (RGB) sensors, microphones, etc.); display devices (such as output components including display screens, display areas, display projectors, etc.); user/context-awareness components and/or identification/verification sensors/devices (such as biometric sensors/detectors, scanners, etc.); database(s) 2130, such as memory or storage devices, databases, and/or data sources (such as data storage devices, hard drives, solid-state drives, hard disks, memory cards or devices, memory circuits, etc.); communication medium(s) 2125, such as one or more communication channels or networks (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.); wireless or wired communications and relevant protocols (e.g., Wi-Fi®, WiMAX, Ethernet, etc.); connectivity and location management techniques; software applications/websites (e.g., social and/or business networking websites, etc., business applications, games and other entertainment applications, etc.); and programming languages, etc., while ensuring compatibility with changing technologies, parameters, protocols, standards, etc.

Throughout this document, terms like "logic", "component", "module", "framework", "engine", "mechanism", "circuit", and "circuitry", and/or the like, are referenced interchangeably and may include, by way of example, software, hardware, firmware, or any combination thereof. In one example, "logic" may refer to or include a software component that works with one or more of an operating system (e.g., operating system 2006), a graphics driver (e.g., graphics driver 2016), etc., of a computing device, such as server device 2000. In another example, "logic" may refer to or include a hardware component that is capable of being physically installed along with or as part of one or more system hardware elements, such as an application processor (e.g., CPU 2012), a graphics processor (e.g., GPU 2014), etc., of a computing device, such as server device 2000. In yet another embodiment, "logic" may refer to or include a firmware component that is capable of being part of system firmware, such as firmware of an application processor (e.g., CPU 2012) or a graphics processor (e.g., GPU 2014), etc., of a computing device, such as server device 2000. In other words, "logic" may itself be or include the circuitry or hardware component to perform certain tasks or facilitate certain circuitry or hardware components to perform certain tasks or be executed by one or more processors, such as graphics processor 2014, application processor 2012, etc., to perform certain tasks.

Further, any use of a particular brand, word, term, phrase, name, and/or acronym, such as "viewport", "viewpoint/user prediction", "adaptive resolution", "point cloud", "immersive media", "3DoF+", "6DoF", "GPU", "GPU domain", "GPGPU", "CPU", "CPU domain", "graphics driver", "workload", "application", "graphics pipeline", "pipeline processes", "register", "register file", "RF", "extended register file", "ERF", "execution unit", "EU", "instruction", "API", "3D API", "OpenGL®", "DirectX®", "fragment shader", "YUV texture", "shader execution", "existing UAV capabilities", "existing backend", "hardware", "software", "agent", "graphics driver", "kernel mode graphics driver", "user-mode driver", "user-mode driver framework", "buffer", "graphics buffer", "task", "process", "operation", "software application", "game", etc., should not be read to limit embodiments to software or devices that carry that label in products or in literature external to this document.

It is contemplated that any number and type of components may be added to and/or removed from prediction and relevance mechanism 2010 and/or rendering mechanism 2160 to facilitate various embodiments including adding, removing, and/or enhancing certain features. For brevity, clarity, and ease of understanding of prediction and relevance mechanism 2010, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate adaptive resolution and viewpoint-prediction for immersive media in computing environments, the apparatus comprising: one or more processors to: receive viewing positions associated with a user with respect to a display; analyze relevance of media contents based on the viewing positions, wherein the media content includes immersive videos of scenes captured by one or more cameras; and predict portions of the media contents as relevant portions based on the viewing positions; and transmit the relevant portions to be rendered and displayed.

Example 2 includes the subject matter of Example 1, wherein the one or more processors are further to analyze the relevance of the media contents by evaluating position information associated with the viewing positions, wherein the position information includes one or more of head pose information and physical displacement information, wherein the head pose information is based on movements or positions of a head of the user with respect to the display, and wherein the physical displacement information is based on physical displacements of the user in real world.

Example 3 includes the subject matter of Examples 1-2, wherein the one or more processors are further to predict the relevant portions by identifying one or more of future pose information of the head with respect to the display based on the head pose information, and future physical displacements of the user with respect to the real world based on the physical displacement information, wherein the future head pose information includes one or more of future head positions or movements of the head with respect to the display, future user-visible objects or regions of the media contents, and future user-interested objects or regions of the media contents.

Example 4 includes the subject matter of Examples 1-3, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions.

Example 5 includes the subject matter of Examples 1-4, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions.

Example 6 includes the subject matter of Examples 1-5, wherein the one or more processors are further to encode the relevant portions of the media contents prior to transmitting the relevant portions, wherein the immersive video includes one or more of three degree-of-freedom+(3DoF+) video and six degree-of-freedom (6DoF) video, wherein the one or more processors comprise a graphics processor, wherein the graphics processor is co-located with an application processor on a common semiconductor package.

Some embodiments pertain to Example 7 that includes an apparatus to facilitate adaptive resolution and viewpoint-prediction for immersive media in computing environments, the apparatus comprising: one or more processors to: track head positions and movements of a head of a user with respect to a display; generate head pose information associated with the user based on the tracked head positions and movements of the head; transmit the head pose information to be evaluated for estimating future pose information; and receive relevant portions of media contents to be rendered by the display, wherein the relevant portions are based on the future pose information.

Example 8 includes the subject matter of Example 7, wherein the one or more processors are further to: track physical displacements of the user with respect to real world; generate physical displacement information associated with the user based on the tracked physical displacements of the user; transmit the physical displacement information to be evaluated for estimating future physical displacements of the user; and receive the relevant portions of media contents to be rendered by the display, wherein the relevant portions are further based on the future physical displacements.

Example 9 includes the subject matter of Examples 7-8, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein the future pose information comprises one or more of future head positions or movements of the head with respect to the display, future user-visible objects or regions of the media contents, and future user-interested objects or regions of the media contents.

Example 10 includes the subject matter of Examples 7-9, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the one or more processor comprise a graphics processor, wherein the graphics processor is co-located with an application on a common semiconductor package.

Some embodiments pertain to Example 11 that includes a method for facilitating adaptive resolution and viewpoint-prediction for immersive media in computing environments, the method comprising: receiving viewing positions associated with a user with respect to a display; analyzing relevance of media contents based on the viewing positions, wherein the media content includes immersive videos of scenes captured by one or more cameras; predicting portions of the media contents as relevant portions based on the viewing positions; and transmitting the relevant portions to be rendered and displayed.

Example 12 includes the subject matter of Example 11, further comprising analyzing the relevance of the media contents by evaluating position information associated with the viewing positions, wherein the position information includes one or more of head pose information and physical displacement information, wherein the head pose information is based on movements or positions of a head of the user with respect to the display, and wherein the physical displacement information is based on physical displacements of the user in real world.

Example 13 includes the subject matter of Examples 11-12, further comprising predicting the relevant portions by identifying one or more of future pose information of the head with respect to the display based on the head pose information, and future physical displacements of the user with respect to the real world based on the physical displacement information, wherein the future head pose information includes one or more of future head positions or movements of the head with respect to the display, future user-visible objects or regions of the media contents, and future user-interested objects or regions of the media contents.

Example 14 includes the subject matter of Examples 11-13, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions.

Example 15 includes the subject matter of Examples 11-14, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions.

Example 16 includes the subject matter of Examples 11-15, wherein the immersive video includes one or more of three degree-of-freedom+ (3DoF+) video and six degree-of-freedom (6DoF) video, wherein the method is facilitated by a computing device comprises one or more processors including one or more of a graphics processor and an application processor, wherein the graphics and application processors are co-located on a common semiconductor package.

Some embodiments pertain to Example 17 that includes a method for facilitating adaptive resolution and viewpoint-prediction for immersive media in computing environments, the method comprising: tracking head positions and movements of a head of a user with respect to a display; generating head pose information associated with the user based on the tracked head positions and movements of the head; transmitting the head pose information to be evaluated for estimating future pose information; and receiving relevant portions of media contents to be rendered by the display, wherein the relevant portions are based on the future pose information.

Example 18 includes the subject matter of Example 17, further comprising tracking physical displacements of the user with respect to real world; generate physical displacement information associated with the user based on the tracked physical displacements of the user; transmit the physical displacement information to be evaluated for estimating future physical displacements of the user; and receive the relevant portions of media contents to be rendered by the display, wherein the relevant portions are further based on the future physical displacements.

Example 19 includes the subject matter of Examples 17-18, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein the future pose information comprises one or more of future head positions or movements of the head with respect to the display, future user-visible objects or regions of the media contents, and future user-interested objects or regions of the media contents.

Example 20 includes the subject matter of Examples 17-19, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the method is facilitated by a computing device comprising one or more processors including one or more of a graphics processor and an application processor, wherein the graphics and application processors are co-located on a common semiconductor package of the computing device.

Some embodiments pertain to Example 21 that includes a data processing system comprising a processing device to: receive viewing positions associated with a user with respect to a display; analyze relevance of media contents based on the viewing positions, wherein the media content includes immersive videos of scenes captured by one or more cameras; and predict portions of the media contents as relevant portions based on the viewing positions; and transmit the relevant portions to be rendered and displayed; and a memory communicatively coupled to the processing device.

Example 22 includes the subject matter of Example 21, wherein the processing device is further to analyze the relevance of the media contents by evaluating position information associated with the viewing positions, wherein the position information includes one or more of head pose information and physical displacement information, wherein the head pose information is based on movements or positions of a head of the user with respect to the display, and wherein the physical displacement information is based on physical displacements of the user in real world.

Example 23 includes the subject matter of Examples 21-22, wherein the processing device is further to predict the relevant portions by identifying one or more of future pose information of the head with respect to the display based on the head pose information, and future physical displacements of the user with respect to the real world based on the physical displacement information, wherein the future head pose information includes one or more of future head positions or movements of the head with respect to the display, future user-visible objects or regions of the media contents, and future user-interested objects or regions of the media contents.

Example 24 includes the subject matter of Examples 21-23, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions.

Example 25 includes the subject matter of Examples 21-24, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions.

Example 26 includes the subject matter of Examples 21-25, wherein the processing device is further to encode the relevant portions of the media contents prior to transmitting the relevant portions, wherein the immersive video includes one or more of three degree-of-freedom+(3DoF+) video and six degree-of-freedom (6DoF) video, wherein the processing device includes a graphics processing unit co-located with a central processing unit on a common semiconductor package of the data processing system.

Some embodiments pertain to Example 27 that includes a data processing system comprising a processing device to: track head positions and movements of a head of a user with respect to a display; generate head pose information associated with the user based on the tracked head positions and movements of the head; transmit the head pose information to be evaluated for estimating future pose information; and receive relevant portions of media contents to be rendered by the display, wherein the relevant portions are based on the future pose information; and a memory communicatively coupled to the processing device.

Example 28 includes the subject matter of Example 27, wherein the processing device is further to: track physical displacements of the user with respect to real world; generate physical displacement information associated with the user based on the tracked physical displacements of the user; transmit the physical displacement information to be evaluated for estimating future physical displacements of the user; and receive the relevant portions of media contents to be rendered by the display, wherein the relevant portions are further based on the future physical displacements.

Example 29 includes the subject matter of Examples 26-28, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein the future pose information comprises one or more of future head positions or movements of the head with respect to the display, future user-visible objects or regions of the media contents, and future user-interested objects or regions of the media contents.

Example 30 includes the subject matter of Examples 26-29, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the processing device includes a graphics processing unit co-located with a central processing unit on a common semiconductor package of the data processing system.

Some embodiments pertain to Example 31 that includes an apparatus to facilitate adaptive resolution and viewpoint-prediction for immersive media in computing environments, the apparatus comprising: means for receiving viewing positions associated with a user with respect to a display; means for analyzing relevance of media contents based on the viewing positions, wherein the media content includes immersive videos of scenes captured by one or more cameras; means for predicting portions of the media contents as relevant portions based on the viewing positions; and means for transmitting the relevant portions to be rendered and displayed.

Example 32 includes the subject matter of Example 31, further comprising means for analyzing the relevance of the media contents by evaluating position information associated with the viewing positions, wherein the position information includes one or more of head pose information and physical displacement information, wherein the head pose information is based on movements or positions of a head of the user with respect to the display, and wherein the physical displacement information is based on physical displacements of the user in real world.

Example 33 includes the subject matter of Examples 31-32, further comprising means for predicting the relevant portions by identifying one or more of future pose information of the head with respect to the display based on the head pose information, and future physical displacements of the user with respect to the real world based on the physical displacement information, wherein the future head pose information includes one or more of future head positions or movements of the head with respect to the display, future user-visible objects or regions of the media contents, and future user-interested objects or regions of the media contents.

Example 34 includes the subject matter of Examples 31-33, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions.

Example 35 includes the subject matter of Examples 31-34, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the one or more processors are further to encode the relevant portions of the media contents prior to transmitting the relevant portions, Example 36 includes the subject matter of Examples 31-35, wherein the immersive video includes one or more of three degree-of-freedom+ (3DoF+) video and six degree-of-freedom (6DoF) video, wherein the apparatus comprises one or more processors including one or more of a graphics processor and an application processor, wherein the graphics and application processors are co-located on a common semiconductor package of the apparatus.

Some embodiments pertain to Example 37 that includes an apparatus to facilitate adaptive resolution and viewpoint-prediction for immersive media in computing environments, the apparatus comprising: means for tracking head positions and movements of a head of a user with respect to a display; means for generating head pose information associated with the user based on the tracked head positions and movements of the head; means for transmitting the head pose information to be evaluated for estimating future pose information;

and means for receiving relevant portions of media contents to be rendered by the display, wherein the relevant portions are based on the future pose information.

Example 38 includes the subject matter of Example 37, further comprising means for tracking physical displacements of the user with respect to real world; generate physical displacement information associated with the user based on the tracked physical displacements of the user; transmit the physical displacement information to be evaluated for estimating future physical displacements of the user; and receive the relevant portions of media contents to be rendered by the display, wherein the relevant portions are further based on the future physical displacements.

Example 39 includes the subject matter of Examples 37-38, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein the future pose information comprises one or more of future head positions or movements of the head with respect to the display, future user-visible objects or regions of the media contents, and future user-interested objects or regions of the media contents.

Example 40 includes the subject matter of Examples 37-39, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the apparatus comprises one or more processors including one or more of a graphics processor and an application processor, wherein the graphics and application processors are co-located on a common semiconductor package of the apparatus.

Example 41 includes at least one non-transitory or tangible machine-readable medium comprising a plurality of instructions, when executed on a computing device, to implement or perform one or more methods as claimed in any of claims or examples 11-20.

Example 42 includes at least one machine-readable medium comprising a plurality of instructions, when executed on a computing device, to implement or perform one or more methods as claimed in any of claims or examples 11-20.

Example 43 includes a system comprising a mechanism to implement or perform one or more methods as claimed in any of claims or examples 11-20.

Example 44 includes an apparatus comprising means for performing one or more methods as claimed in any of claims or examples 11-20.

Example 45 includes a computing device arranged to implement or perform one or more methods as claimed in any of claims or examples 11-20.

Example 46 includes a communications device arranged to implement or perform one or more methods as claimed in any of claims or examples 11-20.

Example 47 includes at least one machine-readable medium comprising a plurality of instructions, when executed on a computing device, to implement or perform a method or realize an apparatus as claimed in any preceding claims.

Example 48 includes at least one non-transitory or tangible machine-readable medium comprising a plurality of instructions, when executed on a computing device, to implement or perform a method or realize an apparatus as claimed in any preceding claims.

Example 49 includes a system comprising a mechanism to implement or perform a method or realize an apparatus as claimed in any preceding claims.

Example 50 includes an apparatus comprising means to perform a method as claimed in any preceding claims.

Example 51 includes a computing device arranged to implement or perform a method or realize an apparatus as claimed in any preceding claims.

Example 52 includes a communications device arranged to implement or perform a method or realize an apparatus as claimed in any preceding claims.

Example 53 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more processors to:
receive viewing positions associated with a user with respect to a display;
analyze relevance of media contents based on the viewing positions, wherein the media content includes immersive videos of scenes captured by one or more cameras;
predict portions of the media contents as relevant portions based on the viewing positions, wherein the relevant portions are predicted by identifying one or more of future pose information relating to a head of the user with respect to the display based on the real-time pose information relating to the head of the user, and future physical displacement information of the user with respect to a real-time physical displacement of the user with respect to a real environment surrounding the user, wherein the future pose information includes one or more of future head positions or movements of the head with respect to the display, future user-visible objects or regions of the media contents, and future user-interested objects or regions of the media contents; and
transmit the relevant portions to be rendered and displayed.

2. The apparatus of claim 1, wherein the one or more processors are further to analyze the relevance of the media contents by evaluating position information associated with the viewing positions, wherein the position information includes one or more of head pose information and physical displacement information, wherein the head pose information is based on movements or positions of the head of the user with respect to the display, and wherein the physical displacement information is based on physical displacements of the user in the real environment.

3. The apparatus of claim 1, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions.

4. The apparatus of claim 1, wherein the one or more processors are further to encode the relevant portions of the media contents prior to transmitting the relevant portions, wherein the immersive video includes one or more of three degree-of-freedom+(3DoF+) video and six degree-of-freedom (6DoF) video, wherein the one or more processors comprise a graphics processor, wherein the graphics processor is co-located with an application processor on a common semiconductor package.

5. A method comprising:
receiving viewing positions associated with a user with respect to a display;
analyzing relevance of media contents based on the viewing positions, wherein the media content includes immersive videos of scenes captured by one or more cameras;
predicting portions of the media contents as relevant portions based on the viewing positions, wherein the relevant portions are predicted by identifying one or more of future pose information relating to a head of the user with respect to the display based on the real-time pose information relating to the head of the user, and future physical displacement information of the user with respect to a real-time physical displacement of the user with respect to a real environment surrounding the user, wherein the future head pose information includes one or more of future positions or movements of the head with respect to the display, future user-visible objects or regions of the media contents, and future user-interested objects or regions of the media contents; and
transmitting the relevant portions to be rendered and displayed.

6. The method of claim 5, further comprising analyzing the relevance of the media contents by evaluating position information associated with the viewing positions, wherein the position information includes one or more of head pose information and physical displacement information, wherein the head pose information is based on movements or positions of the head of the user with respect to the display, and wherein the physical displacement information is based on physical displacements of the user in the real environment.

7. The method of claim 5, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the one or more processors are further to encode the relevant portions of the media contents prior to transmitting the relevant portions, wherein the immersive video includes one or more of three degree-of-freedom+(3DoF+) video and six degree-of-freedom (6DoF) video, wherein the method is facilitated by one or more processors comprising a graphics processor coupled to an application processor and a memory, wherein the graphics processor is co-located with the application processor on a common semiconductor package.

8. At least one non-transitory computer-readable medium comprising instructions which, when executed, cause a computing device to perform operations comprising:
receiving viewing positions associated with a user with respect to a display;
analyzing relevance of media contents based on the viewing positions, wherein the media content includes immersive videos of scenes captured by one or more cameras;
predicting portions of the media contents as relevant portions based on the viewing positions, wherein the relevant portions are predicted by identifying one or more of future pose information relating to a head of the user with respect to the display based on the real-time pose information relating to the head of the user, and future physical displacement information of the user with respect to a real-time physical displacement of the user with respect to a real environment surrounding the user, wherein the future pose information includes one or more of future head positions or movements of the head with respect to the display, future user-visible objects or regions of the media contents, and future user-interested objects or regions of the media contents; and
transmitting the relevant portions to be rendered and displayed.

9. The non-transitory computer-readable medium of claim 8, wherein the operations further comprise analyzing the relevance of the media contents by evaluating position information associated with the viewing positions, wherein the position information includes one or more of head pose information and physical displacement information, wherein the head pose information is based on movements or positions of a head of the user with respect to the display, and wherein the physical displacement information is based on physical displacements of the user in the real environment.

10. The non-transitory computer-readable medium of claim 8, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions, wherein the one or more processors are further to encode the relevant portions of the media contents prior to transmitting the relevant portions, wherein the immersive video includes one or more of three degree-of-freedom+(3DoF+) video and six degree-of-freedom (6DoF) video, wherein the computing device includes one or more processors having a graphics processor coupled to an application processor and a memory, wherein the graphics processor is co-located with the application processor on a common semiconductor package.

11. A system comprising:
memory; and
one or more processors coupled to the memory, the one or more processors to:
receive viewing positions associated with a user with respect to a display;
analyze relevance of media contents based on the viewing positions, wherein the media content includes immersive videos of scenes captured by one or more cameras;
predict portions of the media contents as relevant portions based on the viewing positions, wherein the relevant portions are predicted by identifying one or more of future pose information relating to a head of the user with respect to the display based on the real-time pose information relating to the head of the user, and future physical displacement information of the user with respect to a real-time physical displacement of the user with respect to a real environment surrounding the user, wherein the future pose information includes one or more of future head positions or movements of the head with respect to the display, future user-visible objects or regions of the media contents, and future user- interested objects or regions of the media contents; and
transmit the relevant portions to be rendered and displayed.

12. The system of claim 11, wherein the one or more processors are further to analyze the relevance of the media contents by evaluating position information associated with the viewing positions, wherein the position information includes one or more of head pose information and physical displacement information, wherein the head pose information is based on movements or positions of the head of the user with respect to the display, and wherein the physical displacement information is based on physical displacements of the user in the real environment.

13. The system of claim 11, wherein the relevant portions of the media contents are predicted to be more likely to be viewed by the user based on one or more of the future head pose information and the future physical displacements, wherein the relevant portions include one or more of central objects or regions in a scene, distinct objects or regions, focused object or regions, and subject matter-pertinent objects or regions, wherein other portions of the media contents are predicted as irrelevant portions that are less likely to be viewed by the user based on one or more of the future head pose information and the future physical displacements, wherein the irrelevant portions include one or more of peripheral objects or regions in a scene, out-of-focus objects or regions, indistinct objects or regions, and subject matter-impertinent objects or regions.

14. The system of claim 11, wherein the one or more processors are further to encode the relevant portions of the media contents prior to transmitting the relevant portions, wherein the immersive video includes one or more of three degree-of-freedom+(3DoF+) video and six degree-of-freedom (6DoF) video, wherein the one or more processors comprise a graphics processor, wherein the graphics processor is co-located with an application processor on a common semiconductor package.

* * * * *